(12) United States Patent
Ring, III et al.

(10) Patent No.: US 12,458,165 B1
(45) Date of Patent: Nov. 4, 2025

(54) SYSTEMS AND METHODS FOR ADJUSTING CONTENT OF A BEVERAGE

(71) Applicant: Cirkul, Inc., Tampa, FL (US)

(72) Inventors: Raymond John Ring, III, Alexandria, VA (US); Abraham MacLean, Arlington, VA (US); Giacomo Fornasini, Bethesda, MD (US); Heather Roach, Fairfax, VA (US); Mark Lyons, Ashburn, VA (US)

(73) Assignee: Cirkul, Inc., Tampa, FL (US)

( * ) Notice: Subject to any disclaimer, the term of this patent is extended or adjusted under 35 U.S.C. 154(b) by 959 days.

(21) Appl. No.: 17/504,360

(22) Filed: Oct. 18, 2021

Related U.S. Application Data

(60) Provisional application No. 63/093,090, filed on Oct. 16, 2020.

(51) Int. Cl.
*A47J 31/40* (2006.01)
*A47J 31/44* (2006.01)
*A47J 31/52* (2006.01)

(52) U.S. Cl.
CPC ......... *A47J 31/407* (2013.01); *A47J 31/4403* (2013.01); *A47J 31/4492* (2013.01); *A47J 31/52* (2013.01)

(58) Field of Classification Search
CPC .. A47J 31/407; A47J 31/4403; A47J 31/4492; A47J 31/52
USPC .......................................................... 99/295
See application file for complete search history.

(56) References Cited

U.S. PATENT DOCUMENTS

| D95,559 S | 5/1935 | Vogel |
| D97,347 S | 10/1935 | Gambell |
| 2,071,399 A | 2/1937 | Gambell |
| D157,486 S | 2/1950 | Glowacki |

(Continued)

FOREIGN PATENT DOCUMENTS

| CN | 1942392 | 4/2007 |
| CN | 100575206 | 12/2009 |

(Continued)

OTHER PUBLICATIONS

Space Linear Acceleration Mass Measurement Device (SLAMMD); NASA Life Sciences Data Archive; https://lsda.jsc.nasa.gov/Hardware/hardw/963? / Date Jul. 15, 2004. (1 page).

(Continued)

*Primary Examiner* — Chris Q Liu
*Assistant Examiner* — James F Sims, III
(74) *Attorney, Agent, or Firm* — Wolf, Greenfield & Sacks, P.C.

(57) ABSTRACT

A beverage apparatus, hand-holdable by a user of the beverage apparatus to be portable, can include a chamber housing that includes a chamber for storing a consumable liquid. The beverage apparatus can include a dispensing assembly. The dispensing assembly can retain a vessel or pod. The dispensing assembly can be operatively controllable by a controller to output the additive from the vessel into the consumable liquid. The beverage apparatus can include a receptacle member that is provided in the shape of a volcano or cylinder. The receptacle member can serve to house a pod. A skirt structure can be mounted to a lower portion of the beverage apparatus. The skirt can be flexible so as to accommodate for reciprocal movement of the pod, in a dispense event. Related features are disclosed.

18 Claims, 51 Drawing Sheets

(56) References Cited

U.S. PATENT DOCUMENTS

| | | |
|---|---|---|
| 2,682,355 A | 6/1954 | Robbins |
| 2,876,113 A | 3/1959 | Barton |
| D192,814 S | 5/1962 | Edwin |
| 3,319,637 A | 5/1967 | Gore |
| 3,533,807 A | 10/1970 | Wakefield |
| 3,548,657 A | 12/1970 | Panerai |
| D225,364 S | 12/1972 | Antoni |
| 3,727,803 A | 4/1973 | Cobb |
| D242,132 S | 11/1976 | Hasegawa |
| 4,051,726 A | 10/1977 | Hastbacka |
| 4,087,024 A | 5/1978 | Martin |
| 4,125,187 A | 11/1978 | Vecchiotti |
| 4,133,457 A | 1/1979 | Klassen |
| 4,252,253 A | 2/1981 | Shannon |
| 4,278,186 A | 7/1981 | Williamson |
| 4,316,409 A | 2/1982 | Adams |
| 4,450,722 A | 5/1984 | Keyes, IV |
| 4,481,986 A | 11/1984 | Meyers |
| D279,621 S | 7/1985 | Richer |
| 4,610,282 A | 9/1986 | Brooks |
| 4,688,701 A | 8/1987 | Sedam |
| 4,728,006 A | 3/1988 | Drobish |
| D295,954 S | 5/1988 | Kirchhoff |
| D296,302 S | 6/1988 | Weber |
| 4,800,492 A | 1/1989 | Johnson |
| 4,827,426 A | 5/1989 | Patton |
| 4,840,291 A | 6/1989 | Merlin |
| 4,898,306 A | 2/1990 | Pardes |
| 4,938,387 A | 7/1990 | Kervefors |
| 4,964,541 A | 10/1990 | Gueret |
| 5,080,260 A | 1/1992 | Doring |
| 5,119,279 A | 6/1992 | Makowsky |
| 5,139,169 A | 8/1992 | Boyer |
| 5,174,458 A | 12/1992 | Segati |
| 5,182,084 A | 1/1993 | Plester |
| D336,216 S | 6/1993 | Rohrbeck |
| 5,282,131 A | 1/1994 | Rudd |
| 5,325,765 A | 7/1994 | Sylvan |
| 5,344,034 A | 9/1994 | Eagan |
| D352,204 S | 11/1994 | Hayes |
| 5,377,877 A | 1/1995 | Brown et al. |
| 5,379,916 A | 1/1995 | Martindale |
| 5,398,853 A | 3/1995 | Latham |
| 5,474,211 A | 12/1995 | Hellenberg |
| 5,531,254 A | 7/1996 | Rosenbach |
| D372,867 S | 8/1996 | Lambelet |
| 5,588,557 A | 12/1996 | Topar |
| D382,808 S | 8/1997 | Fenton |
| D383,383 S | 9/1997 | Prestia |
| D387,992 S | 12/1997 | Kotoucek |
| 5,725,125 A | 3/1998 | Bessette |
| 5,747,824 A | 5/1998 | Jung |
| D396,603 S | 8/1998 | Gasser |
| 5,810,062 A | 9/1998 | Bonora |
| D399,098 S | 10/1998 | Yang |
| D400,050 S | 10/1998 | Littmann |
| D404,253 S | 1/1999 | Littmann |
| 5,938,080 A | 8/1999 | Haaser |
| 5,960,701 A | 10/1999 | Reese |
| 5,967,367 A | 10/1999 | Orsborn |
| 6,077,579 A | 6/2000 | De Laforcade |
| 6,140,932 A | 10/2000 | Frank |
| 6,142,063 A | 11/2000 | Beaulieu |
| 6,170,712 B1 | 1/2001 | Kasboske |
| 6,230,884 B1 | 5/2001 | Coory |
| 6,372,270 B1 | 4/2002 | Denny |
| 6,422,422 B1 | 7/2002 | Forbes |
| 6,424,884 B1 | 7/2002 | Brooke, Jr. |
| 6,446,049 B1 | 9/2002 | Janning |
| 6,504,481 B2 | 1/2003 | Teller |
| 6,517,878 B2 | 2/2003 | Heczko |
| 6,520,070 B1 | 2/2003 | Heczko |
| 6,529,446 B1 | 3/2003 | de la Huerga |
| 6,574,575 B2 | 6/2003 | Deng |
| D477,791 S | 7/2003 | Wells |
| D478,073 S | 8/2003 | Topinka |
| 6,615,881 B2 | 9/2003 | Bartholomew |
| 6,644,471 B1 | 11/2003 | Anderson |
| 6,703,935 B1 | 3/2004 | Chung |
| 6,722,530 B1 | 4/2004 | King |
| 6,761,318 B2 | 7/2004 | Dudek |
| D499,603 S | 12/2004 | Nikkhah |
| D500,936 S | 1/2005 | Nikkhah |
| 6,889,872 B2 | 5/2005 | Herman |
| 6,921,911 B2 | 7/2005 | Siepmann |
| 6,925,871 B2 | 8/2005 | Frank |
| 6,935,493 B2 | 8/2005 | Cho |
| D514,385 S | 2/2006 | Smith |
| 7,004,213 B2 | 2/2006 | Hansen |
| D517,852 S | 3/2006 | Jalet |
| 7,009,519 B2 | 3/2006 | Leonard |
| 7,032,818 B2 | 4/2006 | Thomas |
| D522,860 S | 6/2006 | LaFortune |
| D523,332 S | 6/2006 | McEldowney |
| D525,135 S | 7/2006 | Bakic |
| 7,104,184 B2 | 9/2006 | Biderman |
| 7,107,838 B2 | 9/2006 | Chai |
| D529,340 S | 10/2006 | Laib |
| D530,968 S | 10/2006 | Bodum |
| D533,018 S | 12/2006 | Berg |
| 7,172,095 B2 | 2/2007 | Marshall |
| 7,196,624 B2 | 3/2007 | Teller |
| D541,106 S | 4/2007 | Spiegel |
| D541,596 S | 5/2007 | Hicks |
| 7,228,879 B2 | 6/2007 | Miller |
| 7,319,523 B2 | 1/2008 | Chiarello |
| D565,350 S | 4/2008 | Gauger |
| 7,387,239 B2 | 6/2008 | Thomas |
| D572,588 S | 7/2008 | Osborn |
| D573,464 S | 7/2008 | Kogure |
| 7,439,859 B2 | 10/2008 | Humphrey |
| D582,767 S | 12/2008 | Batton |
| 7,464,811 B2 | 12/2008 | Patterson |
| 7,501,933 B2 | 3/2009 | Rousso |
| D591,599 S | 5/2009 | Okin |
| D593,411 S | 6/2009 | Bizzell |
| D596,487 S | 7/2009 | Batton |
| 7,612,675 B2 | 11/2009 | Miller |
| 7,614,496 B2 | 11/2009 | Dvorak |
| D608,637 S | 1/2010 | Getsy |
| D611,298 S | 3/2010 | Freeman |
| D613,183 S | 4/2010 | Overgaard |
| 7,710,567 B1 | 5/2010 | Mentzer |
| 7,715,277 B2 | 5/2010 | de la Huerga |
| D618,963 S | 7/2010 | Freeman |
| 7,762,181 B2 | 7/2010 | Boland |
| D621,283 S | 8/2010 | Overgaard |
| 7,798,373 B1 | 9/2010 | Wroblewski |
| 7,825,804 B2 | 11/2010 | Malik |
| D634,157 S | 3/2011 | Hoff |
| D635,823 S | 4/2011 | Mauffette |
| D635,864 S | 4/2011 | Lee |
| D639,607 S | 6/2011 | Bracq |
| RE42,937 E | 11/2011 | Lasher |
| 8,083,055 B2 | 12/2011 | Simonian |
| D651,474 S | 1/2012 | Gut |
| 8,091,735 B2 | 1/2012 | Girard |
| 8,141,700 B2 | 3/2012 | Simonian |
| D658,982 S | 5/2012 | Pauser |
| D659,472 S | 5/2012 | D'Amato |
| 8,196,776 B2 | 6/2012 | Doglioni Majer |
| 8,210,396 B2 | 7/2012 | Girard |
| 8,240,508 B2 | 8/2012 | Wegelin |
| 8,302,795 B2 | 11/2012 | Van den Broek |
| 8,361,527 B2 | 1/2013 | Winkler |
| 8,378,830 B2 | 2/2013 | Moran |
| 8,397,519 B2 | 3/2013 | Loibl |
| 8,417,377 B2 | 4/2013 | Rothchild |
| 8,442,674 B2 | 5/2013 | Tilton |
| 8,463,447 B2 | 6/2013 | Newman |
| 8,464,633 B2 | 6/2013 | Anson |
| 8,485,359 B2 | 7/2013 | Anderson |
| D688,531 S | 8/2013 | Ceder |
| 8,515,574 B2 | 8/2013 | Studor |

(56) References Cited

U.S. PATENT DOCUMENTS

| | | |
|---|---|---|
| 8,519,824 B1 | 8/2013 | Rankin |
| 8,522,968 B2 | 9/2013 | Middleman |
| 8,523,837 B2 | 9/2013 | Wiggins |
| D690,990 S | 10/2013 | Boggs |
| D690,991 S | 10/2013 | Boggs |
| 8,556,127 B2 | 10/2013 | Olson |
| 8,584,691 B2 | 11/2013 | Hammonds |
| 8,584,840 B2 | 11/2013 | Kim |
| 8,590,753 B2 | 11/2013 | Marina |
| D699,106 S | 2/2014 | Glaser |
| D699,996 S | 2/2014 | De Leo |
| D700,008 S | 2/2014 | Ehrenhaus |
| 8,678,183 B2 | 3/2014 | Jones |
| D702,474 S | 4/2014 | Scherer |
| 8,684,231 B2 | 4/2014 | Lane |
| 8,695,420 B1 | 4/2014 | Korman |
| 8,701,906 B1 | 4/2014 | Anderson |
| 8,717,182 B1 | 5/2014 | Brashears |
| 8,718,819 B2 | 5/2014 | Hyde |
| 8,751,037 B2 | 6/2014 | Peters |
| 8,754,769 B2 | 6/2014 | Stein |
| 8,757,227 B2 | 6/2014 | Girard |
| D709,387 S | 7/2014 | Marina |
| 8,794,485 B2 | 8/2014 | Lunn |
| 8,801,688 B2 | 8/2014 | Wiggins |
| 8,808,775 B2 | 8/2014 | Novak |
| 8,833,607 B2 | 9/2014 | Wegelin |
| 8,851,740 B1 | 10/2014 | Mills |
| 8,863,649 B1 | 10/2014 | Rao |
| 8,919,613 B2 | 12/2014 | Mileti |
| 8,940,163 B1 | 1/2015 | Bassett |
| 8,945,374 B2 | 2/2015 | Chase |
| 8,977,389 B2 | 3/2015 | Witchell |
| 8,979,539 B1 | 3/2015 | Snyder |
| 8,985,395 B2 | 3/2015 | Tansey |
| 8,989,673 B2 | 3/2015 | Sandy |
| 8,991,648 B2 | 3/2015 | Smith |
| D727,171 S | 4/2015 | Marina |
| 9,014,846 B2 | 4/2015 | Newman |
| 9,020,635 B2 | 4/2015 | Hortin |
| D729,571 S | 5/2015 | Wilson |
| 9,031,689 B1 | 5/2015 | Fink |
| 9,035,222 B2 | 5/2015 | Alexander |
| 9,035,765 B2 | 5/2015 | Engelhard |
| D731,242 S | 6/2015 | Machovina |
| D731,243 S | 6/2015 | Machovina |
| 9,051,162 B2 | 6/2015 | Peters |
| 9,102,441 B1 | 8/2015 | Orvik |
| 9,111,324 B2 | 8/2015 | Hyde |
| 9,126,738 B2 | 9/2015 | Boggs |
| 9,134,020 B1 | 9/2015 | Wells |
| 9,138,091 B2 | 9/2015 | Zhao |
| 9,151,605 B1 | 10/2015 | Sweeney |
| 9,161,654 B2 | 10/2015 | Belmont |
| 9,169,112 B2 | 10/2015 | Chase |
| D742,691 S | 11/2015 | Zhang |
| D746,046 S | 12/2015 | Lee |
| D748,955 S | 2/2016 | Oliver |
| 9,254,250 B1 | 2/2016 | Orofino |
| D751,865 S | 3/2016 | Harris |
| D752,391 S | 3/2016 | Hatherell |
| D752,396 S | 3/2016 | Tu |
| 9,290,309 B1 | 3/2016 | Pabon |
| D758,868 S | 6/2016 | Bretschneider |
| 9,357,887 B2 | 6/2016 | Wegelin |
| D760,537 S | 7/2016 | Hertaus |
| D768,507 S | 10/2016 | Hotell |
| 9,499,385 B1 | 11/2016 | Studor |
| 9,506,798 B2 | 11/2016 | Saltzgiver |
| 9,511,987 B2 | 12/2016 | Hayakawa |
| D779,881 S | 2/2017 | Lee |
| D813,049 S | 3/2018 | Richmond |
| 9,932,217 B2 | 4/2018 | Perrelli |
| D826,052 S | 8/2018 | Harris |
| 10,095,972 B2 | 10/2018 | Bhatia |
| 10,112,752 B2 | 10/2018 | Tonn |
| D836,385 S | 12/2018 | Arzunyan |
| D837,594 S | 1/2019 | Palese |
| 10,178,925 B2 | 1/2019 | Rithener |
| 10,231,567 B2 | 3/2019 | Perrelli |
| 10,314,320 B2 | 6/2019 | Roberts |
| 10,328,402 B2 | 6/2019 | Kolar |
| 10,363,530 B2 | 7/2019 | Kolar |
| D856,083 S | 8/2019 | Lawson-Shanks |
| 10,413,131 B2 | 9/2019 | Kolar |
| 10,489,868 B2 | 11/2019 | Long |
| 10,512,358 B1 | 12/2019 | Perrelli |
| 10,513,424 B2 | 12/2019 | Tansey, Jr. |
| D878,864 S | 3/2020 | Lawson-Shanks |
| 10,621,850 B2 | 4/2020 | Laidlaw |
| D887,769 S | 6/2020 | Lyons |
| 10,674,857 B2 | 6/2020 | Lyons |
| 10,758,077 B1 | 9/2020 | Wilkie |
| 10,765,252 B2 | 9/2020 | Perrelli |
| 10,863,852 B1 | 12/2020 | Lyons |
| 10,881,239 B2 | 1/2021 | Perrelli |
| 10,888,191 B1 | 1/2021 | Lyons |
| 10,889,424 B1 | 1/2021 | Lyons |
| 10,889,425 B1 | 1/2021 | Lyons |
| 10,889,481 B2 | 1/2021 | Perrelli |
| 10,889,482 B1 | 1/2021 | MacLean |
| 10,913,647 B2 | 2/2021 | Lyons |
| 10,934,150 B1 | 3/2021 | MacLean |
| 10,941,030 B1 | 3/2021 | Lyons |
| 10,947,102 B1 | 3/2021 | Lyons |
| 10,981,769 B2 | 4/2021 | Lyons |
| 10,981,772 B1 | 4/2021 | Lyons |
| 10,994,979 B1 | 5/2021 | Lyons |
| 11,001,487 B2 | 5/2021 | Lyons |
| 11,059,711 B1 | 7/2021 | Lyons |
| 11,337,533 B1 | 5/2022 | Perrelli |
| 2001/0032036 A1 | 10/2001 | Sudolcan |
| 2001/0054083 A1 | 12/2001 | Defosse |
| 2002/0070861 A1 | 6/2002 | Teller |
| 2002/0090426 A1 | 7/2002 | Denny |
| 2002/0129663 A1 | 9/2002 | Hoyt |
| 2003/0090892 A1 | 5/2003 | Su |
| 2003/0121937 A1 | 7/2003 | Black |
| 2003/0191558 A1 | 10/2003 | Arellano |
| 2004/0112070 A1 | 6/2004 | Schanin |
| 2005/0284302 A1 | 12/2005 | Levin |
| 2006/0061985 A1 | 3/2006 | Elkins |
| 2006/0081653 A1 | 4/2006 | Boland |
| 2006/0115570 A1 | 6/2006 | Guerrero |
| 2006/0191824 A1 | 8/2006 | Arett |
| 2006/0219858 A1 | 10/2006 | Iacovino |
| 2007/0024465 A1 | 2/2007 | Howell |
| 2007/0095859 A1 | 5/2007 | Maser |
| 2007/0114244 A1 | 5/2007 | Gatipon |
| 2007/0137643 A1 | 6/2007 | Bonney |
| 2007/0157576 A1 | 7/2007 | Till |
| 2007/0203587 A1 | 8/2007 | Erlandsson |
| 2007/0214055 A1 | 9/2007 | Temko |
| 2008/0023488 A1 | 1/2008 | Guerreroe |
| 2008/0178749 A1 | 7/2008 | Stutman |
| 2008/0190958 A1 | 8/2008 | Wyner |
| 2009/0069930 A1 | 3/2009 | Peters |
| 2009/0069934 A1 | 3/2009 | Newman |
| 2009/0069947 A1 | 3/2009 | Newman |
| 2009/0069949 A1 | 3/2009 | Carpenter |
| 2009/0120815 A1 | 5/2009 | Mitchell |
| 2009/0205506 A1 | 8/2009 | Lin |
| 2009/0206084 A1 | 8/2009 | Woolf |
| 2009/0228367 A1 | 9/2009 | Hughes |
| 2009/0272274 A1 | 11/2009 | De Graaff |
| 2010/0024660 A1 | 2/2010 | Wallace |
| 2010/0040743 A1 | 2/2010 | Drost |
| 2010/0055252 A1 | 3/2010 | Marina |
| 2010/0125362 A1 | 5/2010 | Canora |
| 2010/0133222 A1 | 6/2010 | Mathiu |
| 2010/0145522 A1 | 6/2010 | Claesson |
| 2010/0163567 A1 | 7/2010 | Chiang |
| 2010/0183776 A1 | 7/2010 | Gruenwald |
| 2010/0219151 A1 | 9/2010 | Risheq |

(56) References Cited

U.S. PATENT DOCUMENTS

| | | |
|---|---|---|
| 2010/0242497 A1 | 9/2010 | Bertone |
| 2010/0316434 A1 | 12/2010 | Maxwell |
| 2010/0318221 A1 | 12/2010 | Wiemer |
| 2011/0006071 A1 | 1/2011 | Koumans |
| 2011/0024537 A1 | 2/2011 | Gonzalez |
| 2011/0036803 A1 | 2/2011 | Mejia |
| 2011/0049161 A1 | 3/2011 | Savinsky |
| 2011/0049195 A1 | 3/2011 | Russell |
| 2011/0050431 A1 | 3/2011 | Hood |
| 2011/0052764 A1 | 3/2011 | Bulgin |
| 2011/0060457 A1 | 3/2011 | De Vrught |
| 2011/0166910 A1 | 7/2011 | Marina |
| 2011/0180563 A1 | 7/2011 | Fitchett |
| 2011/0220106 A1 | 9/2011 | Ganem |
| 2011/0301768 A1 | 12/2011 | Hammonds |
| 2012/0017766 A1 | 1/2012 | Anson |
| 2012/0035761 A1 | 2/2012 | Tilton |
| 2012/0088022 A1 | 4/2012 | Carbone |
| 2012/0094261 A1 | 4/2012 | Hayn |
| 2012/0097567 A1 | 4/2012 | Zhao |
| 2012/0100275 A1 | 4/2012 | Bishop |
| 2012/0104023 A1 | 5/2012 | Anselmino |
| 2012/0156337 A1 | 6/2012 | Studor |
| 2012/0173164 A1 | 7/2012 | Steuerwald |
| 2012/0230149 A1 | 9/2012 | Martin |
| 2012/0234183 A1 | 9/2012 | Edwards |
| 2012/0267320 A1 | 10/2012 | Baccigalopi |
| 2012/0285985 A1 | 11/2012 | Jones |
| 2012/0298532 A1 | 11/2012 | Woolf |
| 2013/0001244 A1 | 1/2013 | Wegelin |
| 2013/0037506 A1 | 2/2013 | Wahlstrom |
| 2013/0043304 A1 | 2/2013 | Agan |
| 2013/0068772 A1 | 3/2013 | Durden |
| 2013/0082022 A1 | 4/2013 | Cronin |
| 2013/0085599 A1 | 4/2013 | Nicol |
| 2013/0089645 A1 | 4/2013 | Leung |
| 2013/0092567 A1 | 4/2013 | Lok |
| 2013/0127748 A1 | 5/2013 | Vertegaal |
| 2013/0139703 A1 | 6/2013 | Hogarth |
| 2013/0156903 A1 | 6/2013 | Bambeck |
| 2013/0156904 A1 | 6/2013 | Nosler |
| 2013/0186779 A1 | 7/2013 | Kambouris |
| 2013/0226337 A1 | 8/2013 | Leech |
| 2013/0240079 A1 | 9/2013 | Petrini |
| 2013/0247770 A1 | 9/2013 | Wilder |
| 2013/0319915 A1 | 12/2013 | Gellibolian |
| 2013/0325174 A1 | 12/2013 | Crisp, III |
| 2013/0340453 A1 | 12/2013 | Chan |
| 2013/0341395 A1 | 12/2013 | Chan |
| 2014/0034183 A1 | 2/2014 | Gross |
| 2014/0044837 A1 | 2/2014 | Weisman |
| 2014/0079856 A1 | 3/2014 | Hatherell |
| 2014/0110476 A1 | 4/2014 | Sheehan |
| 2014/0114469 A1 | 4/2014 | Givens |
| 2014/0150670 A1 | 6/2014 | Green |
| 2014/0154382 A1 | 6/2014 | Green |
| 2014/0166694 A1 | 6/2014 | Otto |
| 2014/0170279 A1 | 6/2014 | Kolls |
| 2014/0269154 A1 | 9/2014 | Kolar |
| 2014/0272019 A1 | 9/2014 | Schuh |
| 2014/0273925 A1 | 9/2014 | Burgett |
| 2014/0277707 A1 | 9/2014 | Akdogan |
| 2014/0303790 A1 | 10/2014 | Huang |
| 2014/0305952 A1 | 10/2014 | Harris |
| 2014/0312247 A1 | 10/2014 | McKee |
| 2014/0324585 A1 | 10/2014 | Mederos |
| 2014/0335490 A1 | 11/2014 | Baarman |
| 2014/0346063 A1 | 11/2014 | Woolf |
| 2014/0352843 A1 | 12/2014 | Solera et al. |
| 2014/0354438 A1 | 12/2014 | Hazen |
| 2014/0372045 A1 | 12/2014 | Keski-Pukkila |
| 2014/0374438 A1 | 12/2014 | Carpenter |
| 2015/0014369 A1 | 1/2015 | Hatton |
| 2015/0024349 A1 | 1/2015 | Bischoff |
| 2015/0060481 A1 | 3/2015 | Murray |
| 2015/0060482 A1 | 3/2015 | Murray |
| 2015/0088304 A1 | 3/2015 | Ameye |
| 2015/0115158 A1 | 4/2015 | Fu |
| 2015/0122688 A1 | 5/2015 | Dias |
| 2015/0173488 A1 | 6/2015 | Witchell |
| 2015/0175400 A1 | 6/2015 | Newman |
| 2015/0182797 A1 | 7/2015 | Wernow |
| 2015/0183627 A1 | 7/2015 | Tansey, Jr. |
| 2015/0223623 A1 | 8/2015 | Davis |
| 2015/0271582 A1 | 9/2015 | Cheng |
| 2015/0272394 A1 | 10/2015 | Lin |
| 2015/0284163 A1 | 10/2015 | Manwani |
| 2016/0055599 A1 | 2/2016 | Illy |
| 2016/0123786 A1 | 5/2016 | Hanna |
| 2016/0143474 A1 | 5/2016 | Wessels |
| 2016/0159632 A1 | 6/2016 | Wheatley |
| 2016/0174470 A1 | 6/2016 | Shaffer |
| 2016/0175785 A1 | 6/2016 | Li |
| 2016/0176696 A1 | 6/2016 | Hecht |
| 2016/0220973 A1 | 8/2016 | Kolar |
| 2016/0251234 A1 | 9/2016 | Hayslett |
| 2016/0257554 A1 | 9/2016 | Manwani |
| 2016/0286993 A1 | 10/2016 | Pau |
| 2016/0317985 A1 | 11/2016 | Mutschler |
| 2016/0325980 A1 | 11/2016 | Sawhney |
| 2016/0364814 A1 | 12/2016 | Yekutiely |
| 2016/0367072 A1 | 12/2016 | Boone |
| 2016/0376140 A1 | 12/2016 | Tansey |
| 2017/0000295 A1 | 1/2017 | Hanna |
| 2017/0066638 A1 | 3/2017 | Gatipon |
| 2017/0087524 A1 | 3/2017 | Deshpande |
| 2017/0088410 A1 | 3/2017 | Wing |
| 2017/0101298 A1 | 4/2017 | Renzi |
| 2017/0121165 A1 | 5/2017 | Gabrieli |
| 2017/0156540 A1 | 6/2017 | Wheatley |
| 2017/0186110 A1 | 6/2017 | Carpenter |
| 2017/0303744 A1 | 10/2017 | Sutton |
| 2017/0332829 A1 | 11/2017 | Kim |
| 2017/0335256 A1 | 11/2017 | Park |
| 2017/0347690 A1 | 12/2017 | Benedetti |
| 2017/0353820 A1 | 12/2017 | Chiang |
| 2017/0361984 A1 | 12/2017 | Fouad |
| 2017/0367522 A1 | 12/2017 | Ackel |
| 2018/0020875 A1 | 1/2018 | Kolar |
| 2018/0029859 A1 | 2/2018 | Hevia |
| 2018/0042258 A1 | 2/2018 | Roberts |
| 2018/0044157 A1 | 2/2018 | Cohen |
| 2018/0049582 A1 | 2/2018 | Rehfuss |
| 2018/0059790 A1 | 3/2018 | Kolar |
| 2018/0072460 A1 | 3/2018 | Wolfson |
| 2018/0072553 A1 | 3/2018 | Lyons |
| 2018/0099850 A1 | 4/2018 | Lyons |
| 2018/0129360 A1 | 5/2018 | Suh |
| 2018/0129379 A1 | 5/2018 | Suh |
| 2018/0129380 A1 | 5/2018 | Suh |
| 2018/0132507 A1 | 5/2018 | Siegel |
| 2018/0168385 A1 | 6/2018 | Boone |
| 2018/0177325 A1 | 6/2018 | Lyons |
| 2018/0186528 A1 | 7/2018 | Tonn |
| 2018/0208447 A1 | 7/2018 | Perrelli |
| 2018/0344070 A1 | 12/2018 | Perrelli |
| 2019/0001288 A1 | 1/2019 | Ciepiel |
| 2019/0015803 A1 | 1/2019 | Goodson |
| 2019/0060849 A1 | 2/2019 | Waggoner |
| 2019/0185311 A1 | 6/2019 | Karol |
| 2019/0208948 A1 | 7/2019 | Perrelli |
| 2019/0254465 A1 | 8/2019 | Di Maria |
| 2019/0300355 A1 | 10/2019 | Pappas |
| 2020/0010257 A1 | 1/2020 | Lubbe |
| 2020/0031654 A1 | 1/2020 | Wing |
| 2020/0031656 A1 | 1/2020 | Rudick |
| 2020/0079637 A1 | 3/2020 | Kaplita |
| 2020/0095108 A1 | 3/2020 | Cook |
| 2020/0113374 A1 | 4/2020 | Perrelli |
| 2020/0115122 A1 | 4/2020 | Golden |
| 2020/0122992 A1 | 4/2020 | Lyons |
| 2020/0156922 A1 | 5/2020 | Lee |
| 2020/0165550 A1 | 5/2020 | Lee |
| 2020/0181559 A1 | 6/2020 | Kim |

(56) References Cited

U.S. PATENT DOCUMENTS

| | | |
|---|---|---|
| 2020/0205615 A1 | 7/2020 | Pamplin |
| 2020/0242910 A1 | 7/2020 | Laidlaw |
| 2020/0247661 A1 | 8/2020 | Rao |
| 2021/0007533 A1 | 1/2021 | Lyons |
| 2021/0316978 A1 | 10/2021 | Lyons |
| 2021/0340000 A1 | 11/2021 | Lyons |
| 2021/0347627 A1 | 11/2021 | Maclean |
| 2022/0039586 A1 | 2/2022 | Lyons |
| 2022/0259034 A1 | 8/2022 | Mullenaux |

FOREIGN PATENT DOCUMENTS

| | | |
|---|---|---|
| DE | 3428178 | 2/1986 |
| EP | 0258057 | 3/1988 |
| EP | 1793326 | 6/2007 |
| EP | 1671568 | 1/2008 |
| GB | 860987 | 2/1961 |
| KR | 20110007327 | 1/2011 |
| WO | WO 2008/111072 | 9/2008 |
| WO | WO 2016/081387 | 5/2016 |
| WO | WO 2016/090235 | 6/2016 |
| WO | WO 2016201305 | 12/2016 |
| WO | WO 2017/085073 | 5/2017 |
| WO | WO 2020/077137 | 4/2020 |

OTHER PUBLICATIONS

Low-Cost Seltzer Fanatics Hack Their SodaStream Machines, Grind, Kirsten, et al., The Wall Street Journal, Dow Jones Institutional News ; New York [New York] Sep. 21, 2018, (3 pages).

Physiology of nutritive sucking in newborns and infants; Mario Enrique Rendon Macias et al.; Bol Med Hosp Infant Mex 2011;68(4)—pp. 296-303; vol. 68, Jul.-Aug. 2011 (8 pages).

Sucking pressure and its relationship to milk transfer during breastfeeding in humans (Abstract); C R Prieto et al.; https://pubmed.ncbi.nlm.nih.gov/8958830; Sep. 1996 (1 page).

A method of measuring sucking behavior of newborn infants; Reuben E. Kron et al. (John Lacey—editor); Psychosomatic Medicine: Journal of Biobehavioral Medicine—vol. XXV, No. 2, 1963, pp. 181-191 (11 pages).

Voltage—Confused with diodes and conventional vs real current flow; Stack Exchange Network: Electrical Engineering; https://electronics.stackexchange.com/questions/483777/confused-with-diodes-and-conventional-vs-real-current-flow ; Post date: Feb. 29, 2020 (8 pages).

Diode Bridge—Wikipedia; https://en.wikipedia.org/wiki/Diode_bridge ; Edit date: Jul. 26, 2020 (6 pages).

Fig. 15A
Fig. 15B
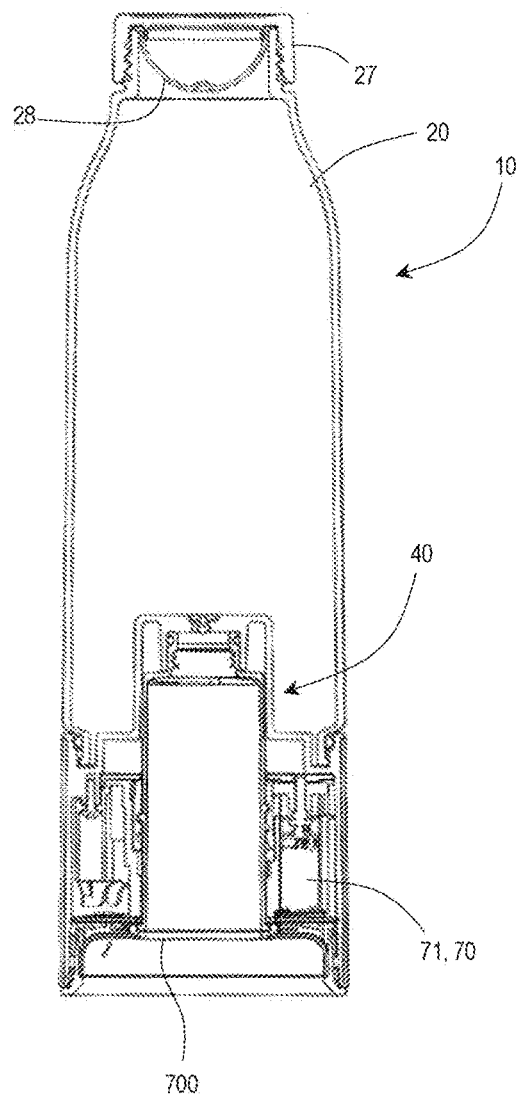
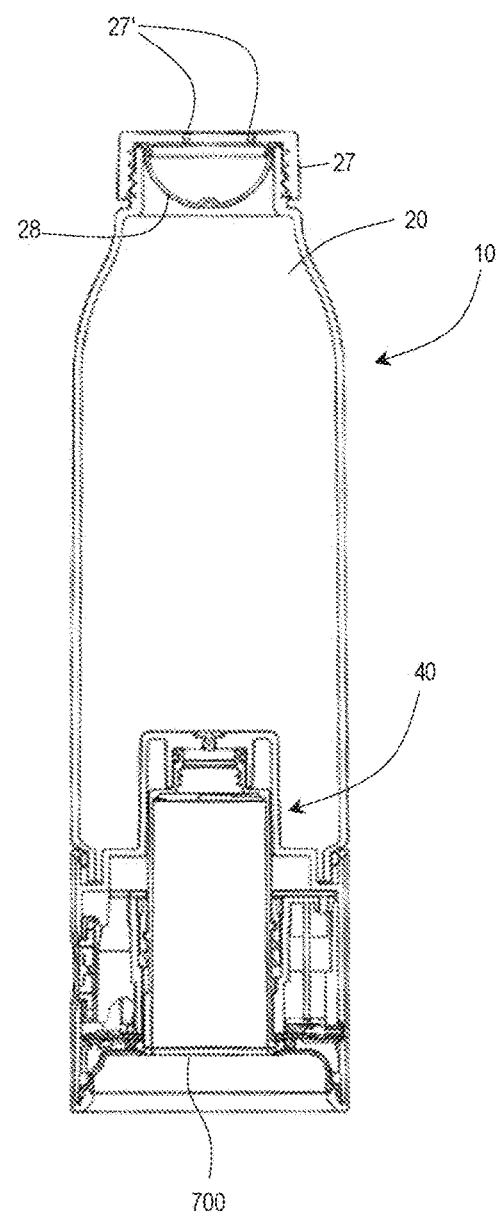

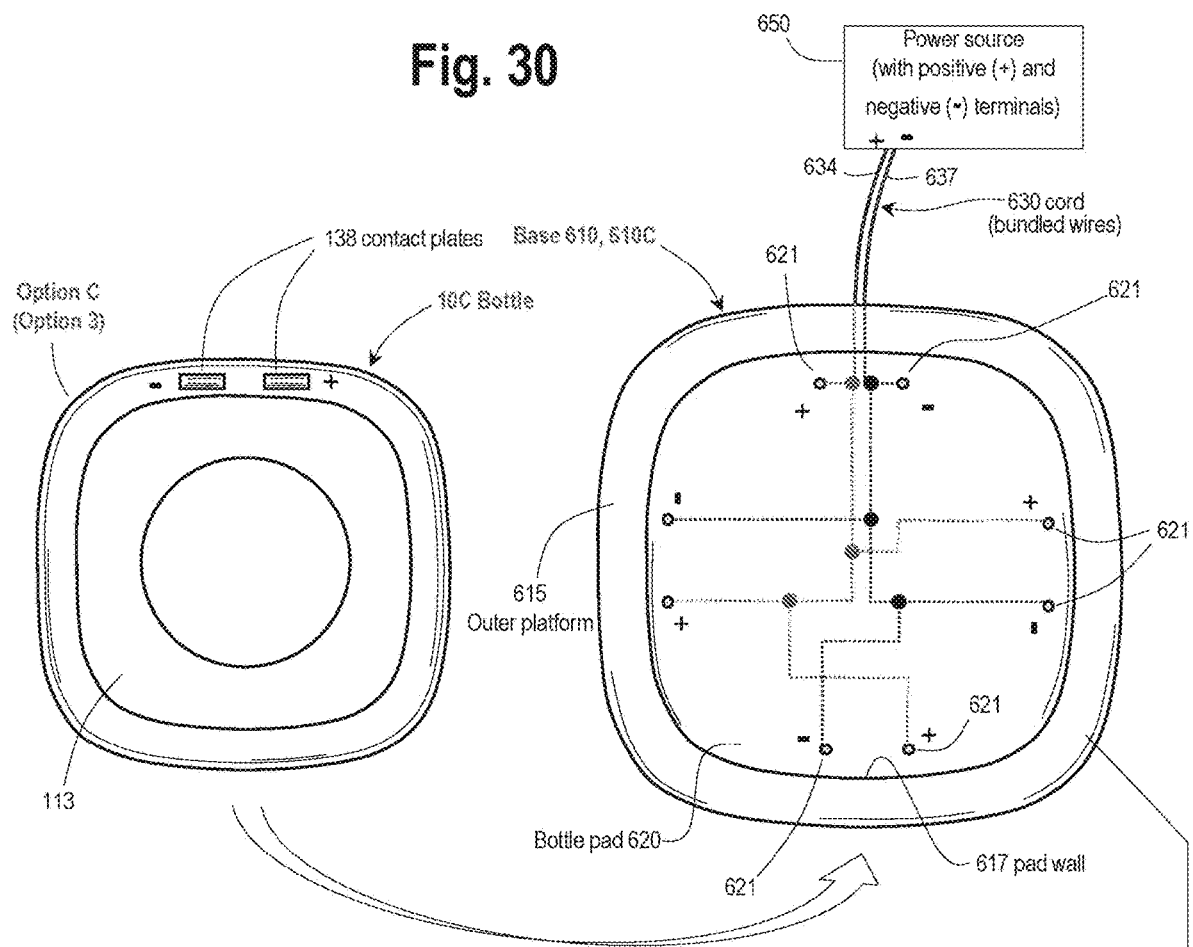
Fig. 30
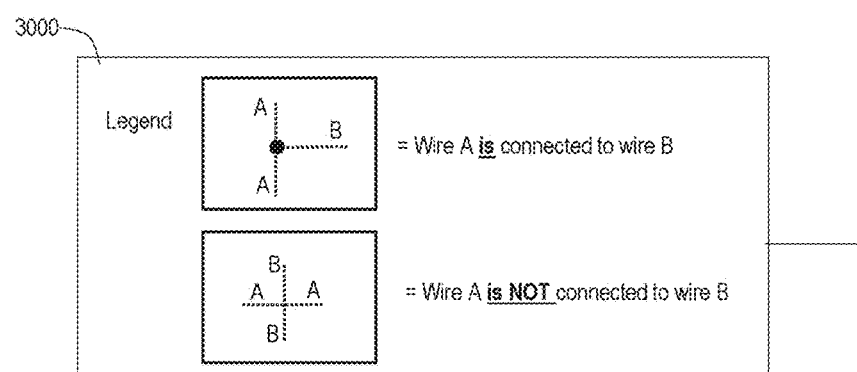

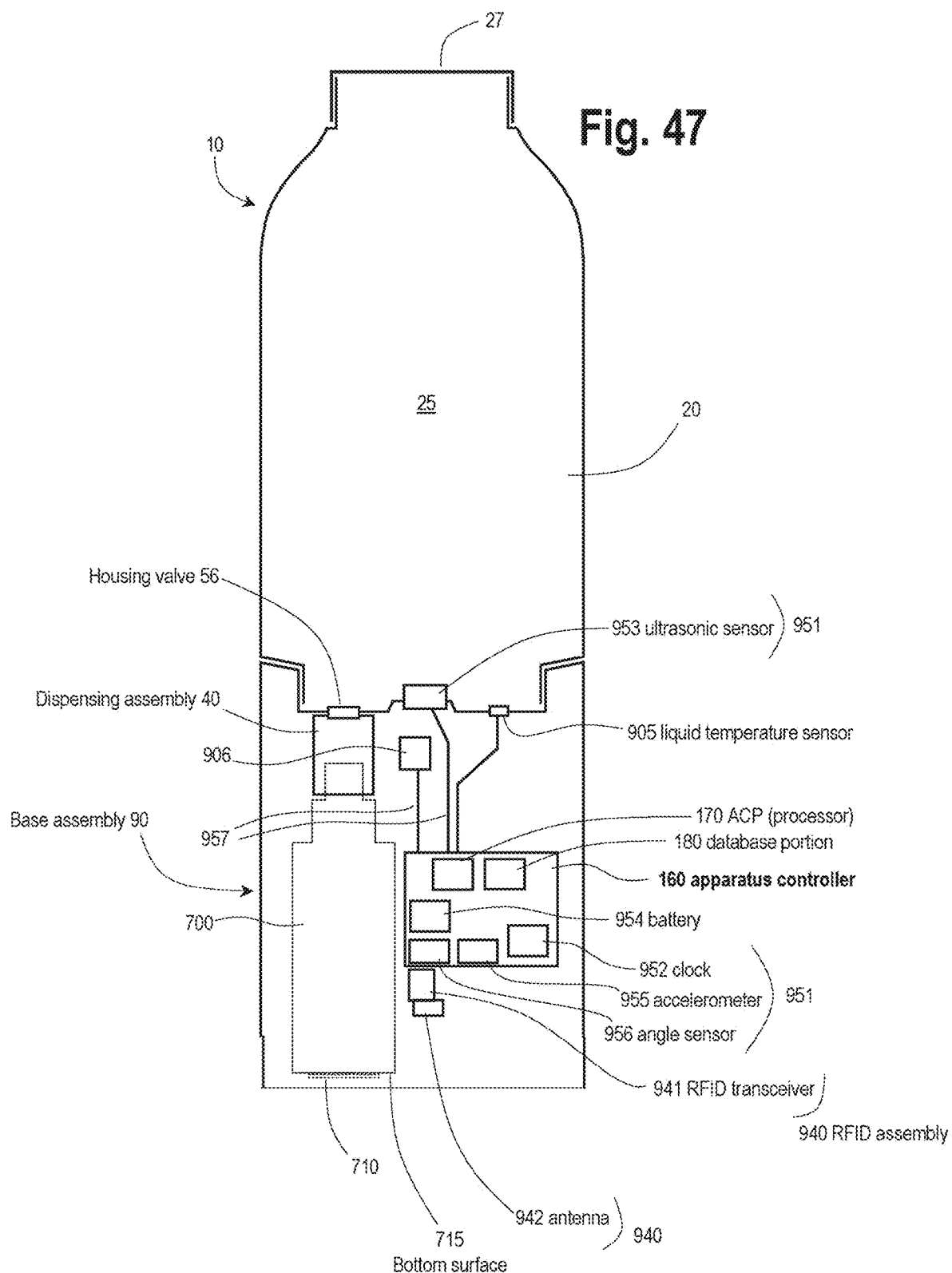

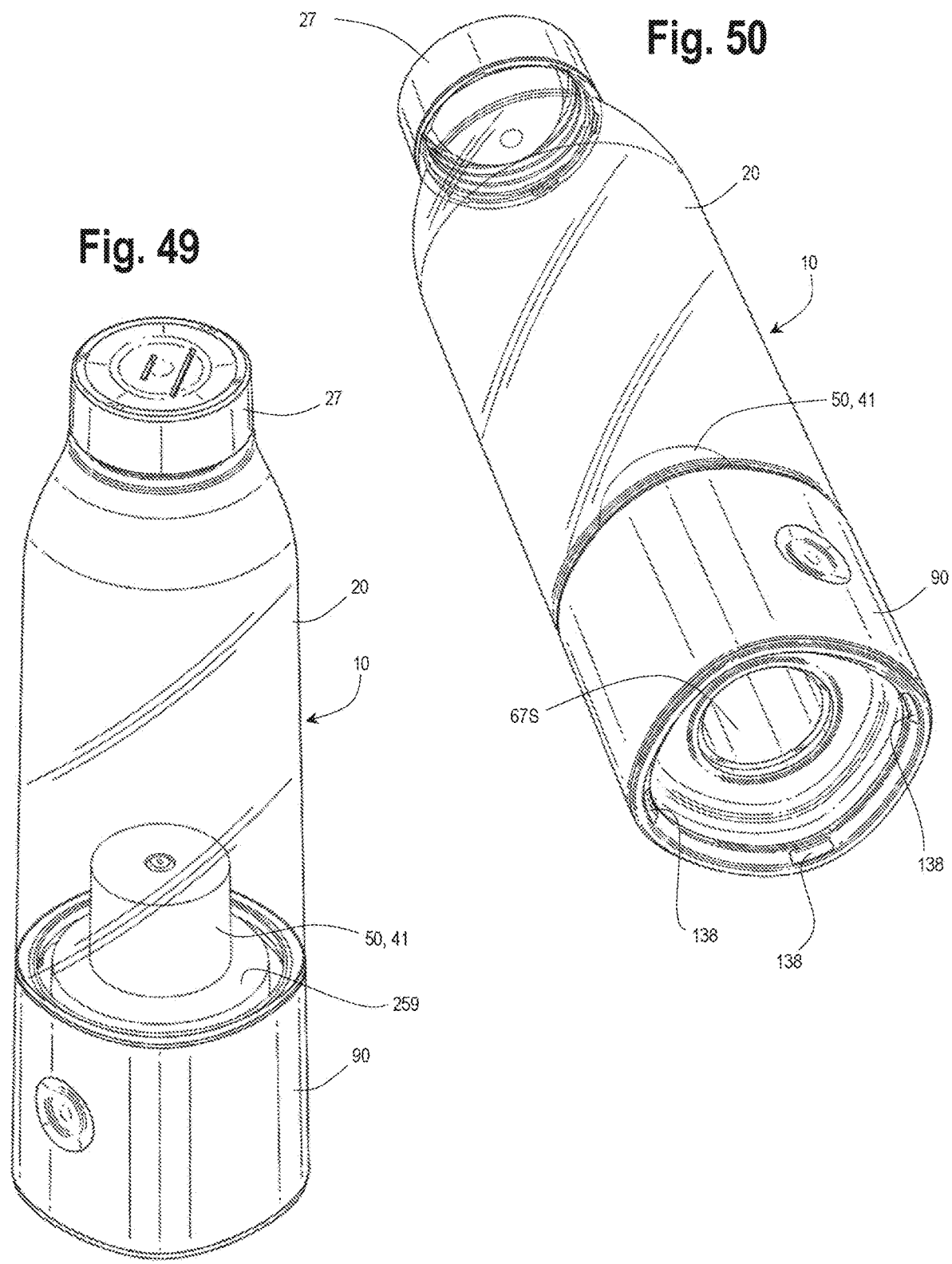

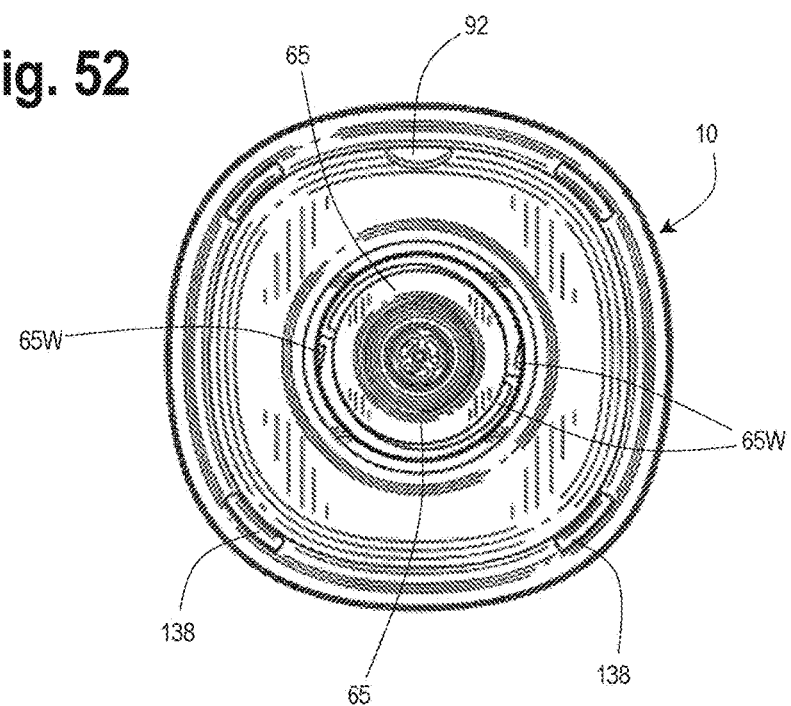
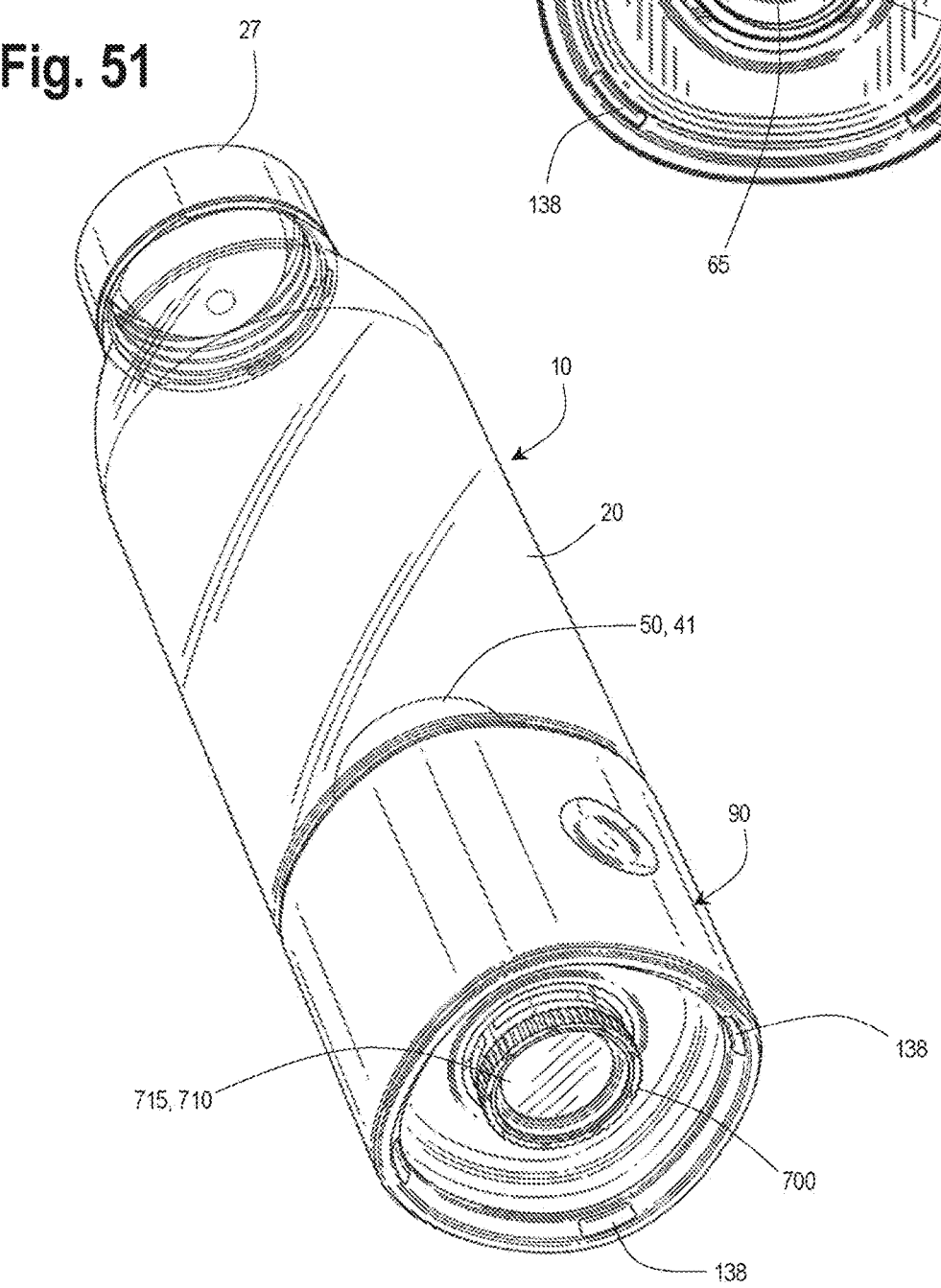

SYSTEMS AND METHODS FOR ADJUSTING CONTENT OF A BEVERAGE

RELATED APPLICATIONS AND PRIORITY

This application claims priority to U.S. Provisional Patent Application No. 63/093,090 filed Oct. 16, 2020, the content of which is incorporated herein by reference in its entirety.

The subject matter of this application is related to U.S. application Ser. No. 15/694,659, filed Sep. 1, 2017 (U.S. Publication 2018/0099850 that published on Apr. 12, 2018), the entire disclosures of which are hereby incorporated by reference.

The subject matter of this application is related to U.S. application Ser. No. 15/862,206, filed Jan. 4, 2018 (U.S. Publication 2018/0177325 that published on Jun. 28, 2018), and now U.S. Pat. No. 10,674,857 issued on Jun. 9, 2020, the entire disclosures of which are hereby incorporated by reference.

The subject matter of this application is related to U.S. application Ser. No. 14/960,109, filed Dec. 4, 2015 (U.S. Publication 2016/0159632) and now U.S. Pat. No. 9,932,217 issued on Apr. 3, 2018, the entire disclosures of which are hereby incorporated by reference.

The subject matter of this application is related to U.S. application Ser. No. 15/179,709, filed Jun. 10, 2016 (U.S. Publication 2017/0156540) and now U.S. Pat. No. 10,231,567 issued on Mar. 19, 2019, the entire disclosures of which are hereby incorporated by reference.

The subject matter of this application is related to U.S. application Ser. No. 16/157,062, filed Oct. 10, 2018 and now U.S. Pat. No. 10,512,358 issued on Dec. 24, 2019, the entire disclosures of which are hereby incorporated by reference.

The subject matter of this application is related to U.S. Design patent application Ser. No. 29/632,269 filed Jan. 5, 2018, now U.S. Design Pat. D887,769 issued Jun. 23, 2020, the entire disclosures of which are hereby incorporated by reference.

The subject matter of this application is related to U.S. Design patent application Ser. No. 29/632,266 filed Jan. 5, 2018, now U.S. Design Pat. D856,083 issued Aug. 13, 2019, the entire disclosures of which are hereby incorporated by reference.

BACKGROUND OF THE DISCLOSURE

The disclosure relates to systems and methods to provide beverages for consumption. In particular, the disclosure relates to beverage apparatuses, vessel assemblies for insertion into beverage apparatuses, and various related features.

Portable refillable bottles and other containers used for water and other beverages are widely used and are important for health and hydration. Such bottles and containers are used with increasing frequency to consume functional ingredients, such as, for example, energy, protein, vitamins, nutrition, minerals, antioxidants, electrolytes and a variety of other supplements. However, one limitation of many known bottles and hydration containers is that the consumable contents remain constant and unchanged except for changes in quantity as the contents (frequently, but not exclusively water) are consumed and subsequently replenished. There are known bottles and containers that do possess functionality to add additives into a consumable liquid in the bottle and container. However, those bottles also have limitations.

Accordingly, known portable refillable bottles and other containers have shortcomings.

SUMMARY OF THE DISCLOSURE

A beverage apparatus, hand-holdable by a user of the beverage apparatus to be portable, can include a chamber housing that includes a chamber for storing a consumable liquid. The beverage apparatus can include a dispensing assembly. The dispensing assembly can retain a vessel or pod. The dispensing assembly can be operatively controllable by a controller to output the additive from the vessel into the consumable liquid. The beverage apparatus can include a receptacle member that is provided in the shape of a volcano or cylinder. The receptacle member can serve to house the pod. A skirt structure can be mounted to a lower portion of the beverage apparatus. The skirt can be flexible so as to accommodate for reciprocal movement of the pod, in a dispense event. Related features are disclosed.

It should be understood that the Detailed Description as set forth below and specific examples, while indicating embodiments of the systems, apparatuses, and methods, are given by way of illustration only, since various changes and modifications within the spirit and scope of the concepts disclosed herein will become apparent to those skilled in the art from this disclosure.

BRIEF DESCRIPTION OF THE DRAWINGS

These and other objects, features, advantages, and characteristics of the present disclosure will become apparent to those skilled in the art upon consideration of the following Detailed Description, taken in conjunction with the accompanying claims and drawings, all of which form a part of the present disclosure. In the drawings:

FIG. 15A is a cross-sectional view along line 15A FIG. 14, according to principles of the disclosure.

FIG. 15B is a cross-sectional view along line 15B FIG. 14, according to principles of the disclosure.

FIG. 30 is a schematic diagram showing an "option C" or option 3 that includes a particular arrangement of a beverage apparatus 10C in combination with a base 610C, according to principles of the disclosure.

FIG. 47 is a schematic diagram of a beverage apparatus 10 with pod 700, according to principles of the disclosure.

FIG. 49 is a top perspective view of a beverage apparatus 10 the same as or similar to the beverage apparatus of FIG. 2 or FIG. 23, for example.

FIG. 50 is a bottom perspective view of a beverage apparatus 10 of FIG. 49, without pod, according to principles of the disclosure.

FIG. 51 is a bottom perspective view of the beverage apparatus of FIG. 49, with pod 700, according to principles of the disclosure.

FIG. 52 is a bottom view of the beverage apparatus of FIG. 49 (not to scale vis-à-vis FIG. 51), without pod 700, according to principles of the disclosure.

Figure 1:
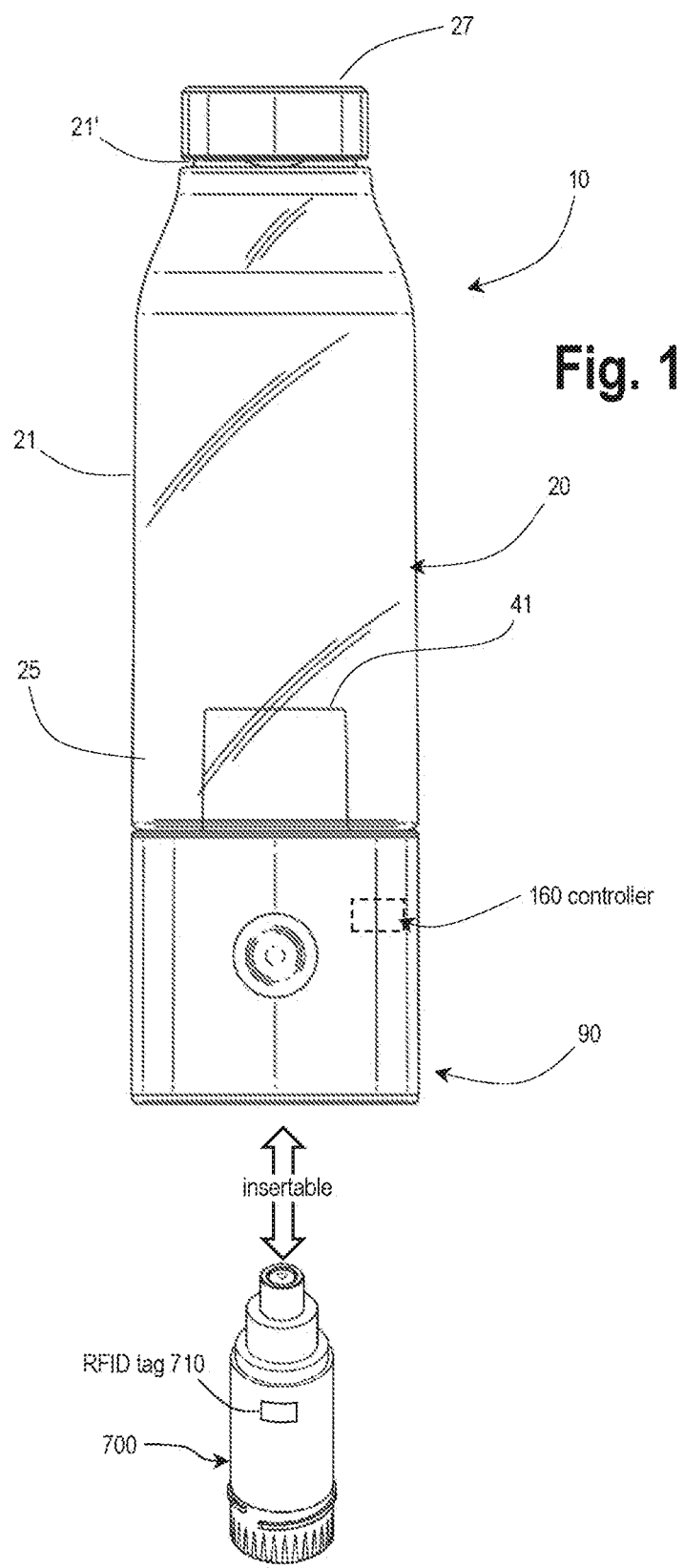
FIG. 1 is a front view of a beverage apparatus, according to principles of the disclosure.

The headings provided herein are for convenience only and do not necessarily affect the scope or meaning of what is claimed in the present disclosure. In the drawings, same reference numerals and acronyms have been used to identify same or similar structure, components or functionality for ease of understanding and convenience.

DETAILED DESCRIPTION OF THE DISCLOSURE

A few inventive aspects of the disclosed embodiments are explained in detail below with reference to the various drawing figures. Exemplary embodiments are described to illustrate the disclosed subject matter, not to limit its scope, which is defined by the claims. Those of ordinary skill in the art will recognize a number of equivalent variations of the various features provided in the description that follows.

In the following description, references are made to various embodiments in accordance with which the disclosed subject matter can be practiced. Multiple references to "one embodiment" or "an embodiment" do not necessarily refer to the same embodiment. Particular features, structures or characteristics associated with such embodiments can be combined in any suitable manner in various embodiments. Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description of the principles of the disclosure.

Figure 2:
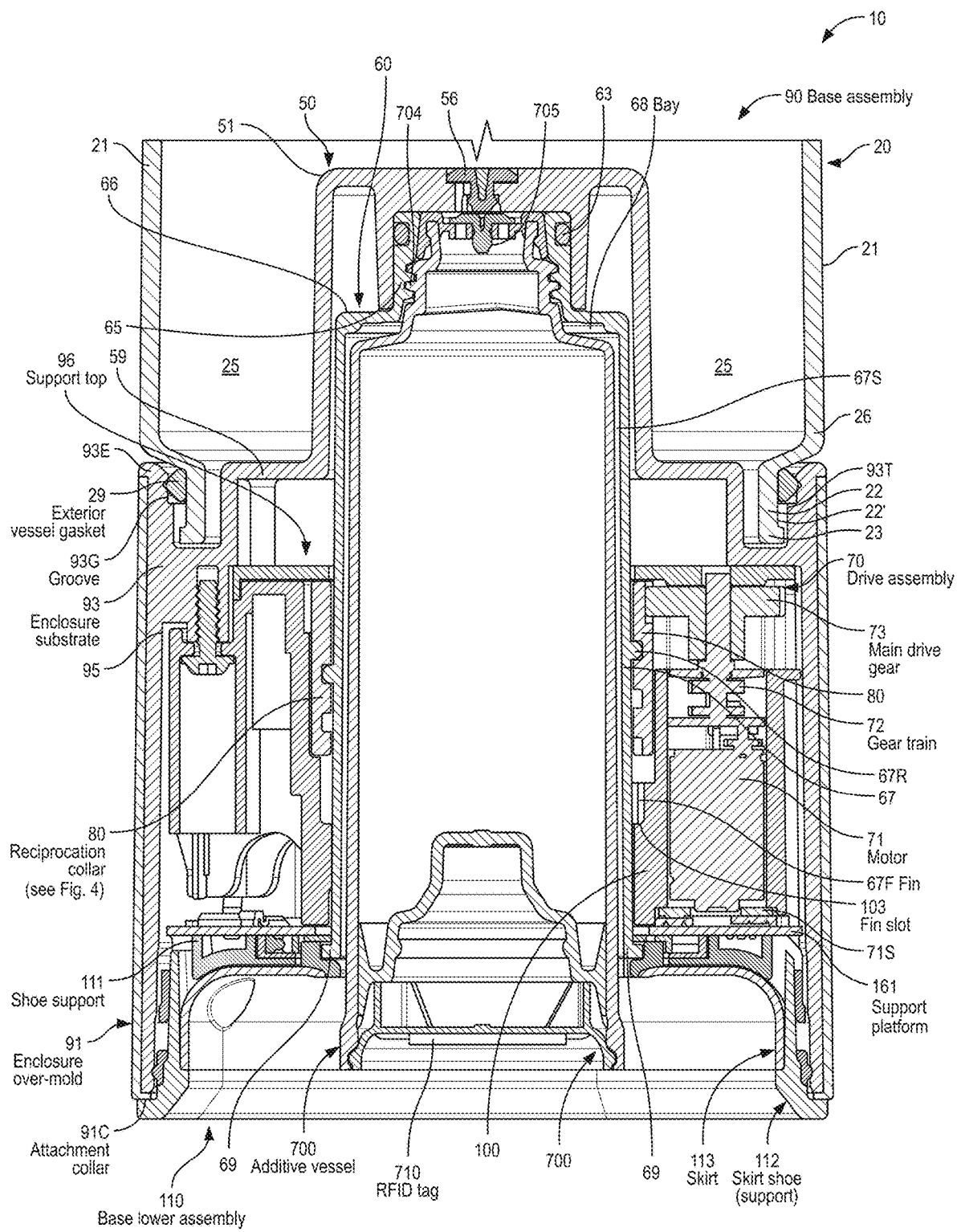
FIG. 2 is a cross-sectional side view of a beverage apparatus the same as or similar to the beverage apparatus of claim 1, according to principles of the disclosure.

FIG. 1 is a front view of a beverage apparatus or bottle 10, according to principles of the disclosure. The beverage apparatus 10 can be in the form or shape of a bottle or drinking vessel, such as shown in FIG. 1. The beverage apparatus 10 can be portable such that the beverage apparatus is able to be held in one hand. For example, a user may hold the beverage apparatus 10 while walking or jogging. The beverage apparatus 10 can include a chamber housing 20. The chamber housing 20 can contain or hold consumable liquid, such as water, that a user can consume. The beverage apparatus 10 can hold or retain an additive vessel or pod 700, as shown in FIG. 2. The pod 700 can be removably retained within the beverage apparatus 10 as described in detail below. The pod can contain additive that is dispensed into the consumable liquid.

As shown in FIG. 1, the beverage apparatus 10 can include a base assembly 90. The base assembly 90 can support the chamber housing 20. The chamber housing 20 can be screwed on, clicked on, or otherwise attached to the base assembly 90, for example. That is, the chamber housing 20 and the base assembly 90 can be provided with respective mating threads, for example. The beverage apparatus or bottle 10 can include a lid or cap 27. The cap 27 can be screwed onto the chamber housing 20, with the chamber housing 20 and lid 27 being provided with respective mating threads, for example.

As described in detail below, the base assembly 90 can include various components. In particular, the base assembly 90 can include a dispensing assembly 40. The dispensing assembly 40 can include a receptacle assembly 41. As shown, the receptacle assembly 41 can extend into a chamber 25 that is defined by the chamber housing 20. The receptacle assembly 41 can be in the shape of a "volcano" structure that extends into the chamber 25. Further details are described below. The base assembly can also include a drive assembly 70, which can be described as a dispense mechanism or drive mechanism 70.

Figure 3:
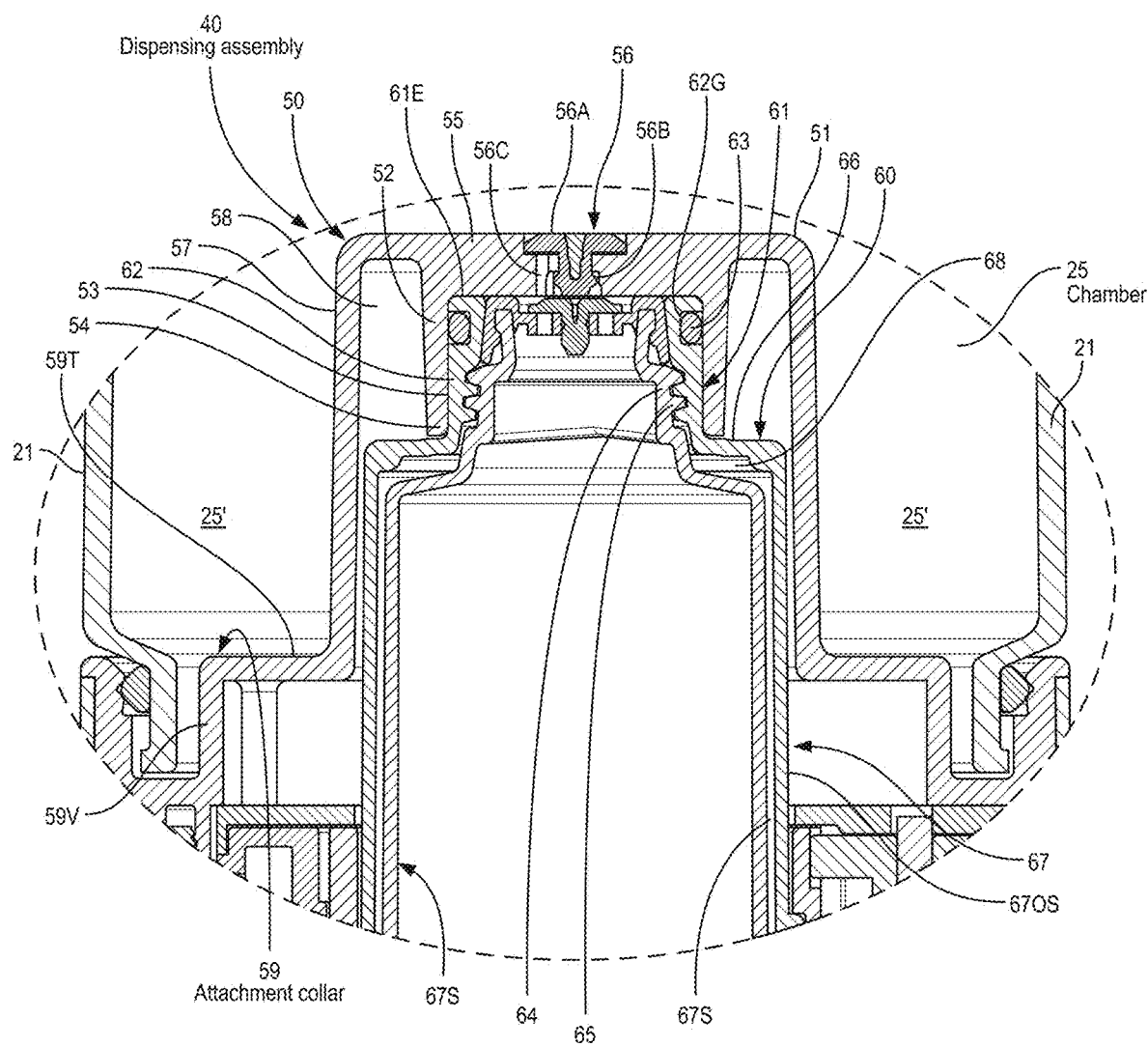
FIG. 3 is a portional cross-sectional side view of the beverage apparatus of FIG. 2, to illustrate in further detail a dispensing assembly 40 of the beverage apparatus 10, according to principles of the disclosure.
Figure 4:
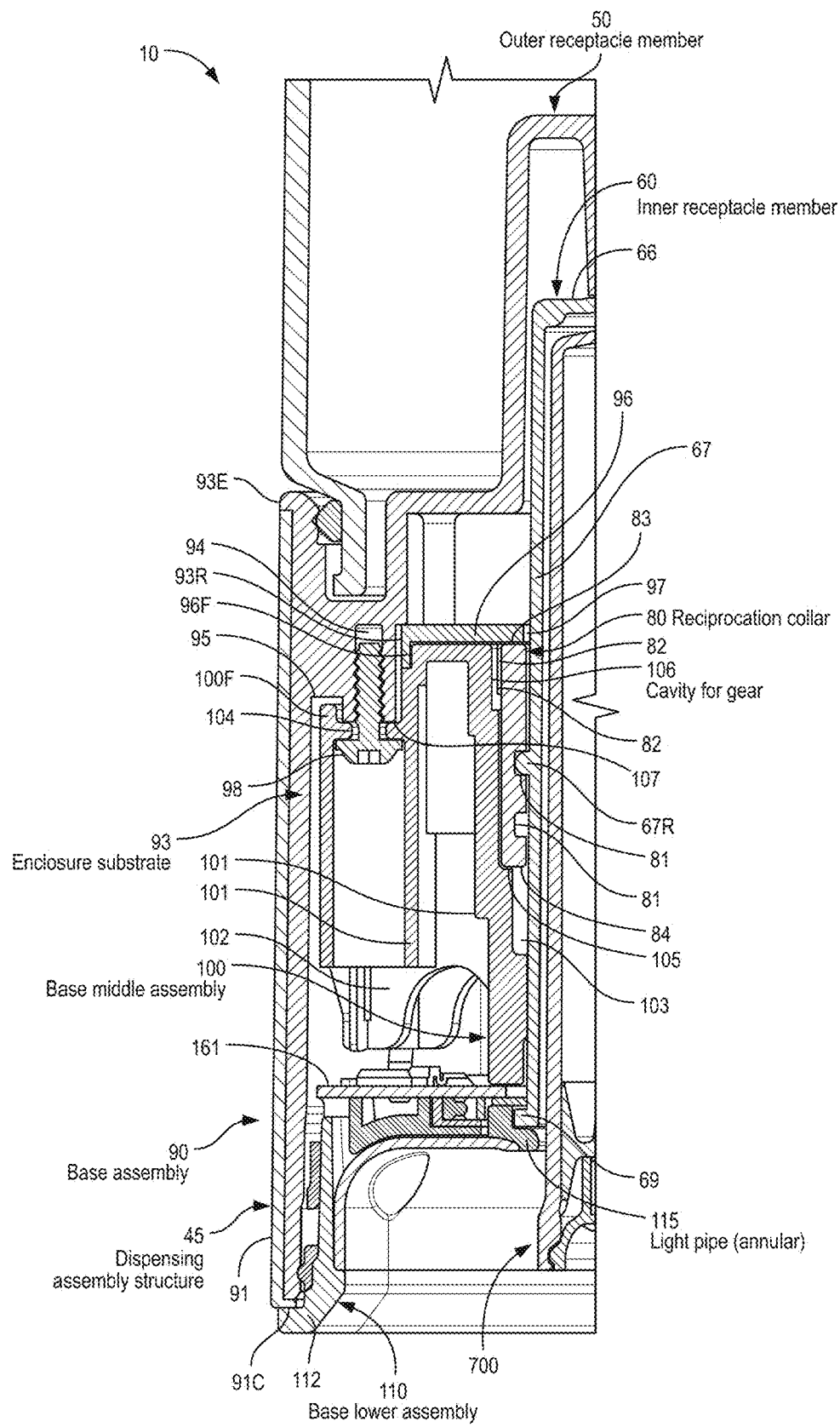
FIG. 4 is a portional cross-sectional side view of the beverage apparatus of FIG. 2, to illustrate in further detail the base assembly 90, according to principles of the disclosure.
Figure 5:
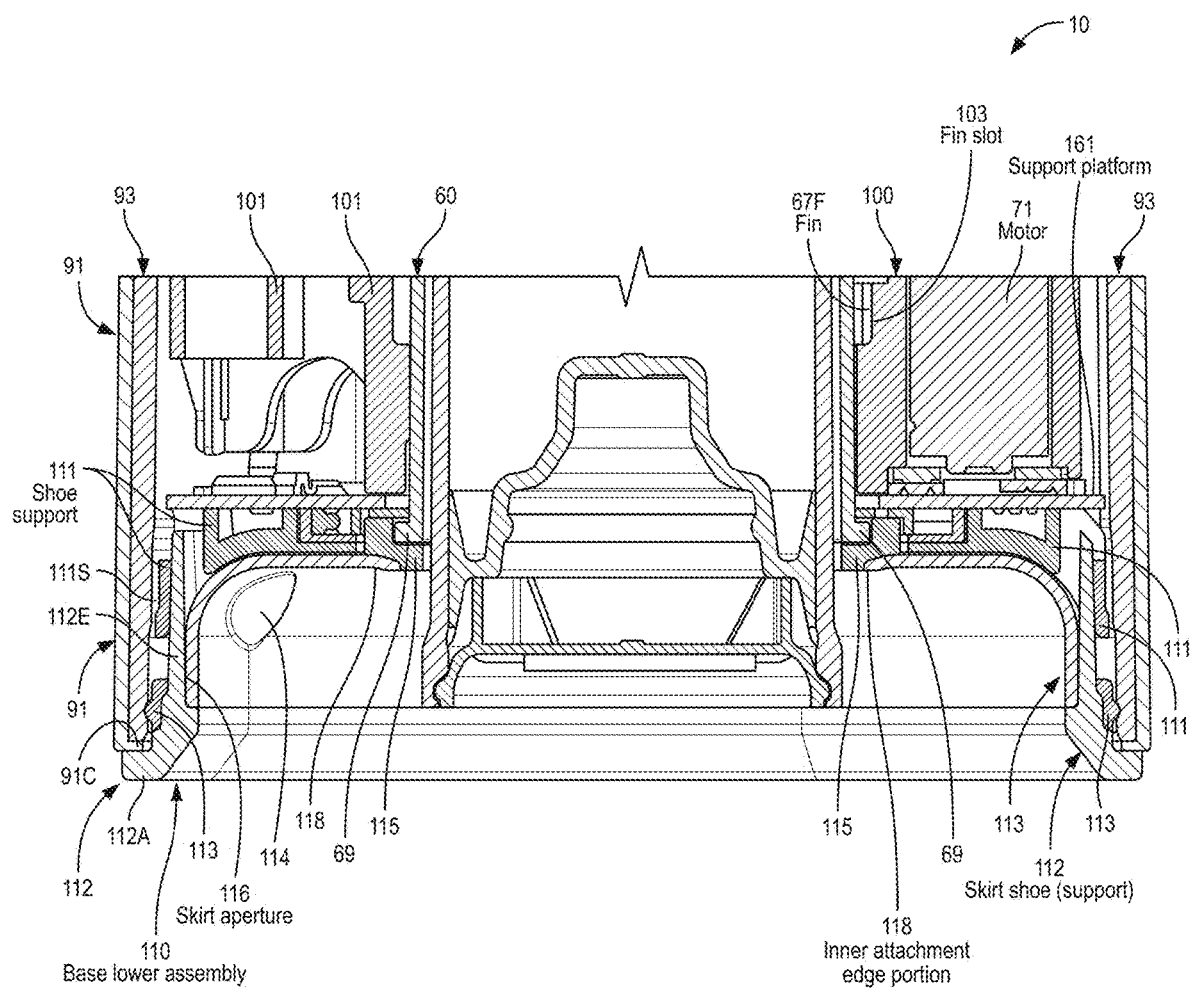
FIG. 5 is a portional cross-sectional side view of the beverage apparatus of FIG. 2, to illustrate in further detail the base lower assembly 110, according to principles of the disclosure.

FIG. 2 is a cross-sectional side view of a beverage apparatus the same as or similar to the beverage apparatus of claim 1, according to principles of the disclosure. FIG. 3 is a portional cross-sectional side view of the beverage apparatus of FIG. 2, to illustrate in further detail the dispensing assembly, of the structure of FIG. 2. FIG. 4 is a portional cross-sectional side view of the beverage apparatus of FIG. 2, to illustrate in further detail the base assembly 110, according to principles of the disclosure. FIG. 5 is a portional cross-sectional side view of the beverage apparatus of FIG. 2, to illustrate in further detail the base lower assembly 110, according to principles of the disclosure.

Hereinafter, further details of the bottle 10 are described with reference to FIGS. 2-5, in particular.

As shown in FIG. 2, the bottle 10 can include the chamber housing 20. Only a lower portion of the chamber housing 20 is illustrated in FIG. 2. The chamber housing can include a body 21. The body 21 can be cylindrical in shape. The body 21 can be of uniform or constant diameter in the vertical direction, or the body 21 can be tapered, as desired. The body 21 can be tapered and with an upper end of the body 21 attached to or including an upper neck 21', as shown in FIG. 1. The upper neck 21' can be shaped as desired and can accommodate the threads that mate with the lid 27. The upper neck 21' can be shaped as desired to provide a desired shape of a bottle. In a horizontal plane, the body 21 can be of a "squircle" shape, i.e. a shape that is a combination of a square and a circle. The body 21 (and in general bottle 10) can be other shapes, such as rectangular, square, and/or circle, and with rounded or square corners, as may be desired.

As shown in FIG. 2, the chamber housing 20 can also include a lower neck 22. The lower neck 22 can be of a smaller diameter than the body portion 21, so as to be inset from the body 21. The chamber housing 20 can include a lower shoulder or annular shoulder 26. The annular shoulder 26 can serve to connect the body 21 and the lower neck 22. The annular shoulder 26 can be tapered as shown in FIG. 2, for example. The lower neck 22 can include an outer surface 22'. The outer surface 22' can include, be attached to, or be integrated with a first attachment element 23. The first attachment element 23 can include one or more threads 23.

The chamber housing 20 can, in part, include or define the chamber 25. That is, the chamber 25 can be constituted by the body 21, the lid 27, the receptacle assembly 41, and other components so as to define an internal volume 25'. That is, the bottle 10 can include various components that form a chamber 25, and the chamber 25 can define an internal volume 25'.

The chamber housing 20 and the base assembly 90 can be attached to each other via threads, as described above, or via other attachment arrangement. The chamber housing 20 can include first attachment element or threads 23. The base assembly 90 can include second attachment element or threads 93T. The second attachment element 93T can be a threaded surface with which the threads 23 engage, for example.

Relatedly, FIG. 23 (described below) shows a further threaded arrangement by which the chamber housing 20 can be attached to the base assembly 90.

The bottle 10 can include one or more gaskets that can be positioned between the chamber housing 20 and the base assembly 90. For example, as shown in FIG. 2, an exterior vessel gasket 29 or gasket 29 can be positioned between the base assembly 90 and the chamber housing 20. The gasket 29 can be positioned in a groove or gasket groove 93G of the base assembly 90. Accordingly, the gasket 29 can provide a seal between the chamber housing 20 and the base assembly 90. The particular location of the gasket 29 and the surfaces of the chamber housing 20 and the base assembly 90 that are engaged with the gasket 29 and/or additional gaskets can be varied as desired. Further details are described below.

As described above, the bottle 10 can include a chamber housing 20 and a base assembly 90. The base assembly 90 can include a dispensing assembly 40. The dispensing assembly 40 can include a receptacle assembly 41 and a drive assembly or dispense mechanism 70. Further, the receptacle assembly 41 can include an outer receptacle member 50 and an inner receptacle member 60. The inner receptacle member 60 can reciprocate up and down within the outer receptacle member 50. Such arrangement is shown in FIGS. 2-3, for example. That is, the inner receptacle member 60 can reciprocate up and down, in the vertical direction, in the outer receptacle member 50. The reciprocation of the inner receptacle member 60 can be driven by the drive assembly 70. The outer receptacle member 50 can be described as a receptacle member 50, and the inner receptacle member 60 can be described as a receptacle member 60.

With reference to FIG. 3, in particular, the outer receptacle member 50 can be in the form of a closed cylinder or cylindrical structure that extends into the chamber 25. The outer receptacle member 50, and receptacle assembly 41 in general, can be described as possessing a "volcano" shape or cylindrical shape, as shown in FIG. 3. The outer receptacle member or member 50 can include an attachment collar 59. The attachment collar 59 can be attached to other structure in the dispensing assembly 40 and/or receptacle assembly 41 so as to support the outer receptacle member. The attachment collar 59 can be annular in shape or ring shaped so as to surround a center portion of the outer receptacle member 50. The attachment collar 59 can include a transverse flange 59T and a vertical flange 59V. Both of such flanges 59T, 59V can be annular in shape or ring shaped so as to surround and support the inner volcano shape structure. A lower edge of the vertical flange 59V can be attached to an inner structure of the dispensing assembly 40. An upper edge of the vertical flange 59V can support an outer edge of the transverse flange 59T. In turn, an inner edge of the transverse flange 59T can support a lower edge of an outer wall 57. The transverse flange 59T can provide a lower portion of the chamber 25, so as to define a portion of the internal volume 25'.

As shown in FIG. 3, the outer wall 57 can extend upwardly from the transverse flange 59T a distance into the internal volume 25' as defined by the chamber 25. In accordance with an aspect of the disclosure, as the outer wall 57 extends into the chamber 25, such construct can provide for a pod 700 of greater length and of greater capacity, as compared to if the pod did not extend into the chamber 25. Additionally, the outer wall 57 can be constructed to extend further into the chamber 25 such that a valve 56A is located in a more vertically center position in the chamber 25. An advantage can thus be provided in that such center positioning of the valve 56A can enhance the mixing of additive flowing into the chamber 25 through the valve 56A. FIG. 15A and FIG. 15B, for example, illustrate an amount that the outer wall 57 can extend into the chamber 25. However, the particular distance, which the outer wall 57 is constructed to extend into the chamber 25—that is, the amount that the outer receptacle member or volcano 50 extends into the chamber 25—can be varied as desired. The amount that the outer wall extends into the chamber 25 can depend on the desired dimension and length or height of the pod 700.

As shown in FIG. 3, the outer receptacle member 50 can include a cap portion 55. The cap portion 55, in conjunction with the outer receptacle member 50, can include a top outer edge 51. The top outer edge 51 can serve to attach the cap portion 55 to an upper edge of the outer wall 57. In an aspect of the disclosure, the outer wall 57 can be described as a skirt, or outer skirt, of the cap portion 55.

The cap portion 55 can include a valve structure in a center location of the cap portion 55, as shown in FIG. 3. In particular, the dispensing assembly 40 can include a housing valve 56. The housing valve 56 can include a check valve or an umbrella valve, for example. The housing valve 56 can be constructed of flexible material. The cap portion 55 can include a valve attachment aperture 56B. The valve attachment aperture 56B can receive a stem of the umbrella valve 56A, for example. The stem of the valve 56A can include an expanded lower end, such that the umbrella valve 56A is retained in place, i.e. secured within the valve attachment aperture 56B. The cap portion 55 can also include at least one flow aperture 56C. The valve 56A can be pliable or elastic such that the valve 56A can allow flow in the upward direction, as shown in FIG. 3, through the flow aperture 56C. That is, the valve 56A allows upward flow once a predetermined pressure is achieved, since such predetermined pressure can "push" a sealing portion (or disk) of the valve 56A away from the cap portion 55. Once the sealing portion is pushed away, the housing valve 56 allows liquid flow up through the flow aperture 56C and into the chamber 25. It is appreciated that other types of check valves or one-way valves can be utilized in lieu of the arrangement shown in FIG. 3.

In general, the housing valve 56 can be described as including both the valve 56A and the surrounding structure of the cap portion 55. In general, the housing valve 56 can be provided as a check valve that allows flow, upon predetermined pressure differential being attained, from an interior of the dispensing assembly 40 into the chamber 25, but prevents a backflow in the opposite direction. Accordingly, as described below, additive can be dispensed through the flow aperture 56C into the chamber 25, and thus into consumable liquid in the chamber 25. However, due to operation of the valve 56A, liquid is prevented from flowing in the opposite direction down through the flow aperture 56C.

The outer receptacle member 50 can include an outer slide collar 52 as shown in FIG. 3. The outer slide collar 52 can be ring shaped and annular. The outer slide collar 52 can include an inner slide surface 53. The inner slide surface 53 can provide a cylindrical, annular inner surface that slidably receives the inner receptacle member 60. The inner receptacle member 60 can include an inner slide collar 61, and the inner slide collar 61 can include outer slide surface 62. Accordingly, the inner receptacle member 60 can slide up and down within the outer slide collar 52 (with the inner slide surface 53 sliding on the outer slide surface 62 of the inner slide collar 61), so as to provide "reciprocation" of the inner receptacle member 60. Accordingly, the outer slide collar 52 can slidably receive the inner slide collar 61 of the inner receptacle member 60. The relative dimensions of the collars 52, 61 (and specifically a diameter of the outer slide surface 62 relative to the inner slide surface 53) can provide slidability while stably retaining the inner slide collar 61 within the outer slide collar 52.

The inner slide collar 61 and/or the outer slide collar 52 can be provided with an annular groove 62G for an O-ring 63. Accordingly, an annular O-ring 63 can be positioned on the outer slide surface 62 of the inner slide collar 61 and/or positioned on an inner slide surface 53 of the outer slide collar 52 so as to provide a seal between the collars 52, 61 while allowing relative movement of the collars 52, 61. The O-ring 63 can be described as a "bay O-ring" and can include an annular gasket.

The outer slide collar 52 can extend downwardly from the cap portion 55. As shown in FIG. 3, the cap portion 55 can be thicker inboard of the outer slide collar 52 verses the thickness of the cap portion outboard of the outer slide collar 52, so as to provide structural integrity. Relatedly, a cavity 58 can be provided outboard of the outer slide collar 52. The cavity 58 can be annular in shape or donut shaped. Accordingly, the cavity 58 can be described as a donut cavity.

As shown in FIG. 3, the outer slide collar 52 can include a lower edge 54. Such lower edge 54 can engage with a shoulder 66 of the inner receptacle member 60. Such arrangement can provide a first stop so as to limit upward movement, in a reciprocation, of the inner receptacle member 60 relative to the outer receptacle member 50. Also, a top edge 61E of the inner slide collar 61 can engage with a lower surface of the cap portion 55. Such arrangement can provide a second stop so as to limit upward movement, in a reciprocation, of the inner receptacle member 60 relative to the outer receptacle member 50. Depending on height of the outer slide collar 52 relative to height of the inner slide collar 61, such first stop could occur so as to limit upward travel of the inner receptacle member 60, such second stop could occur so as to limit upward travel of the inner receptacle member 60, or the first and second stops could occur at the same time depending on the relative geometries of the components.

Hereinafter, further details of the inner receptacle member 60 are described. The inner receptacle member 60 can be slidably positioned within the outer receptacle member 50. In turn, a pod 700 can be positioned within the inner receptacle member 60. For example, threads 65 and a tightening wedge or wedge 65W can be used to attach the pod 700 to the inner receptacle member 60. The threads 65 can engage or screw onto threads 704 on the pod 700 (see also FIGS. 11 and 48A). The tightening wedge 65W can engage with a matching wedge 704W on the pod 700. Accordingly, the pod can be threaded onto the inner receptacle member 60 and the wedge 704W "drawn up" against the wedge 65W, so as to stably secure the pod 700 onto the inner receptacle member 60. In some embodiments, the wedge 65W and the wedge 704W can be omitted, with securement of the pod 700 onto the inner receptacle member 60 being reliant upon tightening of the threads 704 onto the threads 65.

As described above, the inner receptacle member 60 can include the inner slide collar 61. The inner slide collar 61 can also be described as an inner slide neck, of the inner receptacle member 60. The inner receptacle member 60 can also include the shoulder 66 and a body 67. As shown in FIG. 3, the body 67 can be of uniform and consistent cross section along a length of the body 67. Accordingly, the body 67 can be of uniform cross section to allow the reciprocation of the inner receptacle member 60 within the outer receptacle member 50. As shown, the shoulder 66 can serve to attach the inner slide collar 61 to the body 67. As described above, the shoulder 66 can engage with the outer slide collar 52 so as to limit travel, i.e. reciprocation, of the inner receptacle member 60 within the outer receptacle member 50.

The body 67, of the inner receptacle member 60, can include an inner surface or body inner surface 67S, as well as an outer surface or body outer surface 670S. The body inner surface 67S can be dimensioned so as to slidably receive the pod 700. The body inner surface 67S can define or form a bay or aperture 68. Accordingly, the bay 68 can receive such pod 700.

The body outer surface 670S can be dimensioned so as to reciprocate within the dispensing assembly 40. The body outer surface 670S can include at least one drive ridge or drive thread 67R, as shown in FIG. 4. In embodiments, the body outer surface 670S can include a pair of drive ridges or drive threads 67R on opposing sides of the body outer surface 670S. Each of the drive threads 67R can be engaged and be driven so as to provide the reciprocation to the inner receptacle member 60. Further details are described below.

The body outer surface 670S can also include a vertical fin 67F, as shown in FIG. 5, in accordance with at least some embodiments of the disclosure. The vertical fin 67F can engage with a matching groove in surrounding structure of the dispensing assembly 40. Accordingly, the vertical fin 67F can prevent rotation of the inner receptacle member 60 during reciprocation of the inner receptacle member 60. Alternatively, the body outer surface 670S can be provided with a groove that engages with a fin or similar structure of the surrounding structure of the dispensing assembly 40.

The inner receptacle member 60 can also include a lower attachment flange (or attachment ring) 69, as shown in FIG. 4. The lower attachment flange 69 can be annular or ring shaped and can surround or form the lower edge of the body 67. The lower attachment flange 69 can be attached to a skirt ring, as described below.

As shown in FIG. 3, the inner slide collar 61, of the inner receptacle member 60, can be provided and include an inner engagement surface 64. The inner engagement surface 64 can include or support the threads 65. The threads or interior threads 65 can engage with threads of a pod 700, so as to secure the pod 700 within the inner receptacle member 60. It is appreciated that the disclosure is not limited to specifically threads. Other mechanisms can be utilized so as to secure the pod 700 within the inner receptacle member 60. For example, the inner engagement surface 64 could be provided with a recess, and the pod 700 be provided with a protuberance, which engages with such recess—or vice versa. Other attachment mechanisms can be utilized to secure the pod 700 within the inner receptacle member 60. As described above, the base assembly 90 can include the dispensing assembly 40. The dispensing assembly 40 can include the receptacle assembly 41 and the drive assembly 70.

Figure 12:
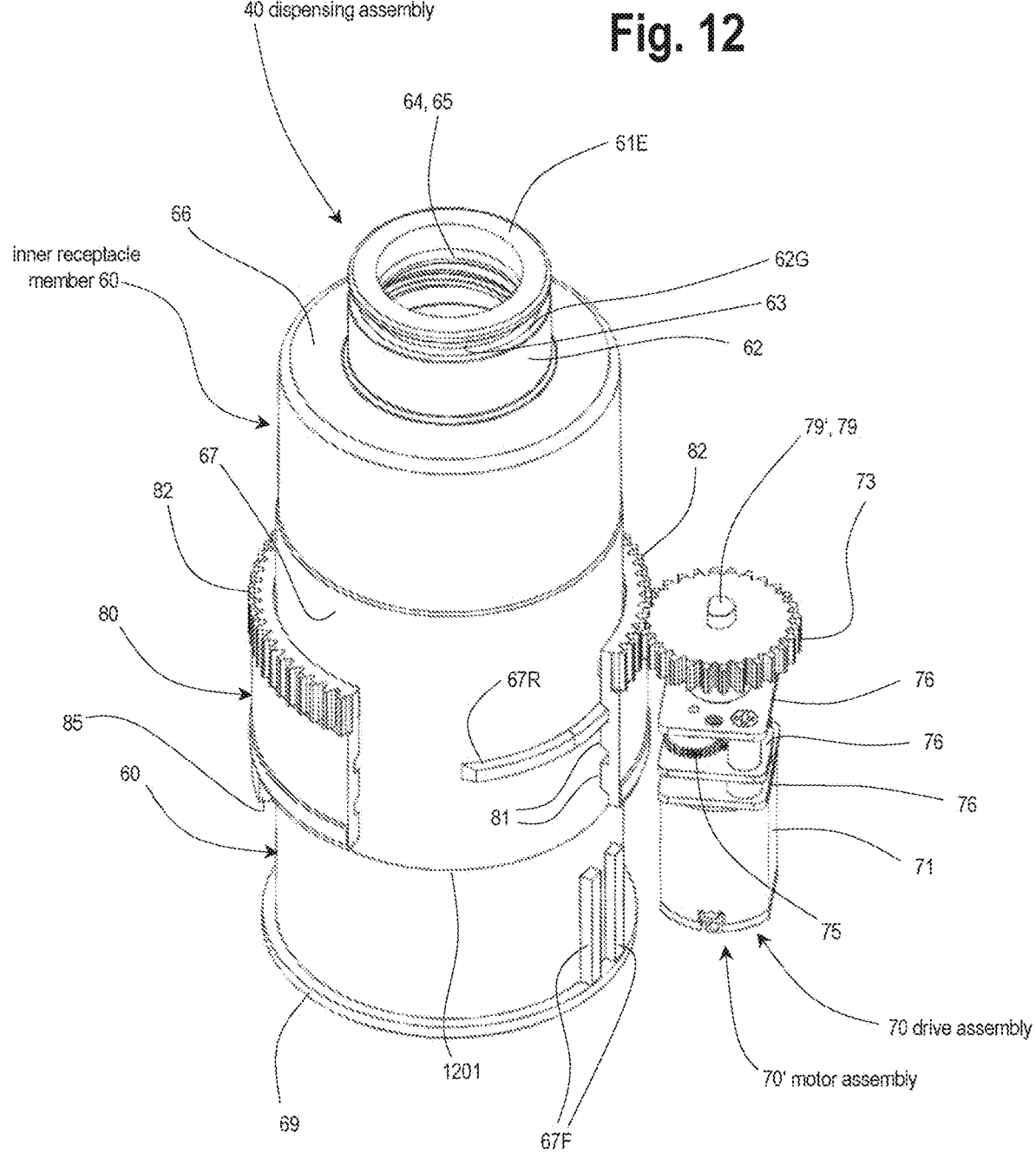
FIG. 12 is a top perspective view of a dispensing assembly 40, including details of the inner receptacle member 60 and drive assembly 70, according to principles of the disclosure.
Figure 13:
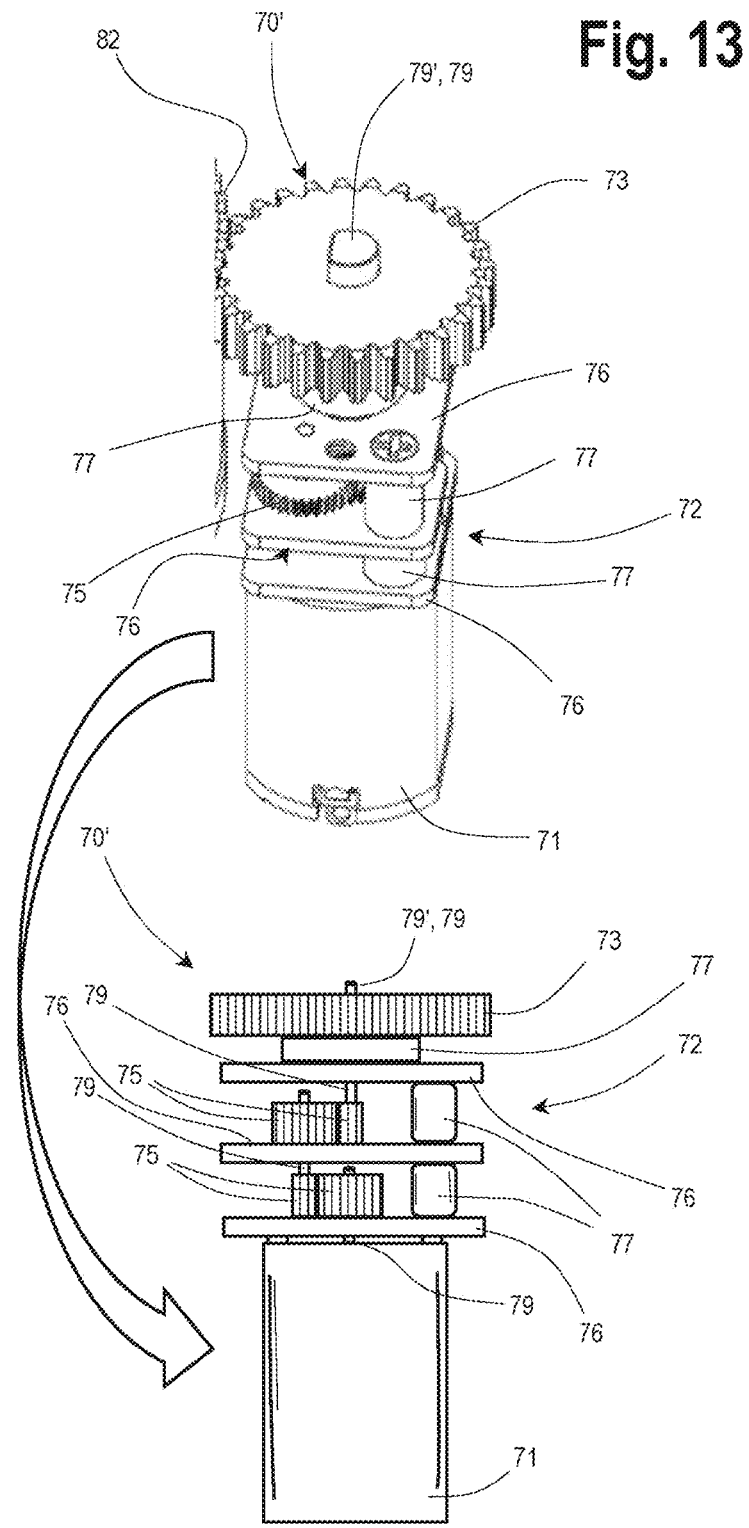
FIG. 13 is a diagram that shows a perspective view and front view of a drive assembly 70 the same as or similar to the drive assembly 70 shown in FIG. 12, according to principles of the disclosure.

The drive assembly 70 is illustrated in FIG. 2 and FIG. 4. FIG. 12 is a perspective view of a dispensing assembly 40, according to principles of the disclosure. FIG. 12 shows further details of the inner receptacle member 60 and drive assembly 70. FIG. 13 is a diagram showing a front view of a drive assembly 70, in conjunction with a perspective view of the drive assembly, the same as or similar to the drive assembly 70 shown in FIG. 12, according to principles of the disclosure.

The drive assembly 70 can include or be associated with a reciprocation collar 80, as shown in FIG. 12. The reciprocation collar 80 can be rotatably disposed in the base assembly 90 so as to be able to rotate, while being constrained in the vertical direction. For example, as described further below, the reciprocation collar 80 can be rotatably disposed in an inner diameter annular recess. The reciprocation collar 80 can be rotatably constrained within such recess. The reciprocation collar 80 can include one or more vertical stops or stop surfaces 85 that can engage with surrounding structure so as to limit or constrain rotation of the reciprocation collar 80, i.e. so as to limit angular rotation.

The reciprocation collar 80 can include drive threads 81. The drive threads 81 can be described as inner diameter (ID) drive threads. The drive threads 81 can be integrated with or supported on an inner diameter of the reciprocation collar 80. The drive threads 81 can engage with the drive threads 67R of the inner receptacle member 60. As shown in FIG. 12, for example, and described herein, the drive threads 67R can be disposed on the body portion 67 or body 67 of the inner receptacle member 60. The drive threads 67 can be at an angle, matching the drive threads 81. Ridges and/or grooves (see ridge 1201 shown in FIG. 12) can be provided on a component to mate and orient the component with another adjacent component. Accordingly, as the reciprocation collar 80 is rotated, such rotation results in vertical movement of the inner receptacle member 60, i.e. as a result of the drive threads 81 engaging with the drive threads 67R. Relatedly, the vertical fin 67F, which is located on the body portion 67, can prevent rotation of the inner receptacle member 60. Other structure can also be used to prevent rotation of the inner receptacle member 60. In the example of FIG. 12, given that the vertical movement of the reciprocation collar 80 is constrained by structure of the dispensing assembly 40, as the reciprocation collar 80 is rotated, such will impart vertical movement to the inner receptacle member 60. More specifically, as the reciprocation collar 80 is rotated clockwise, such rotation will effectively screw the reciprocation collar 80 onto the inner receptacle member 60, i.e. given the angle of the threads. Since vertical movement of the reciprocation collar 80 is constrained, such will result in the inner receptacle member 60 moving upward as shown in FIG. 12. On the other hand, as the reciprocation collar 80 is rotated counterclockwise, such will result in the inner receptacle member 60 moving downward as shown in FIG. 12. The thread angle of the components can be reversed if desired.

Accordingly, the reciprocation collar 80 can be selectively rotated so as to control vertical position of the inner receptacle member 60. As described above, a pod 700 can be attached within and to the inner receptacle member 60. Accordingly, rotation of the reciprocation collar 80 can be used to control position of the pod 700 and the reciprocation member 60, i.e. with the pod 700 and the reciprocation member 60 moving as a unit.

As shown in FIG. 12, the dispensing assembly 40 can be provided with a mechanism so as to drive rotation of the reciprocation collar 80. In the illustrative structure of FIG. 12, the mechanism to drive the reciprocation collar 80 can be a motor with gears.

To further explain, the reciprocation collar 80 can be provided with drive threads 82 on an outer diameter of the reciprocation collar 80. The drive threads 82 can be described as outer diameter (OD) engagement drive threads 82. In some embodiments, the drive assembly 70 can drive the reciprocation collar 80. In other embodiments, the reciprocation collar 80 can be considered a part of the drive assembly 70. More specifically, the drive assembly 70 can include the reciprocation collar 80 and a motor assembly 70'.

As shown in FIG. 13, the motor assembly 70', of the drive assembly 70, can include a main drive gear 73. The main drive gear 73 can drive the drive threads 82 of the reciprocation collar 80. The main drive gear 73 can be described as "gear A". The reciprocation collar 80 can be described as including a "gear B", i.e. the drive threads 82. Thus, gear A can be driven so as to drive gear B.

As shown in FIG. 13, for example, the motor assembly 70' can include one or more motors 71. The motor 71 can be mechanically connected to the main drive gear 73, via a gear train 72, so as to drive the main drive gear 73. As shown in FIG. 13, the gear train 72 can include transfer gears 75, support platforms 76, spacers 77, various rotational support shafts 79, and other structure to secure the various components together. The rotational support shafts 79 can include shafts 79', which drive the main drive gear 73.

The drive assembly 70, which can include the motor assembly 70' and the reciprocation collar 80, can be supported within the base assembly 90 in any suitable manner. For example, the drive assembly 70 can be supported utilizing structural support members that are attached to or integrally formed with the support platforms 76. Components of the drive assembly 70, including structural supports, can be constructed using injection molding of plastic construct, for example. Relatedly, as shown in FIG. 4, the reciprocation collar 80 can include an upper engagement edge 83 and a lower engagement edge 84. The edges 83 and 84 can limit or constrain vertical travel to a window of vertical movement. Structure of the base assembly 90 can be provided so as to support the reciprocation collar 80 and to selectively engage the upper engagement edge 83 and lower engagement edge 84. In particular, a support top 96 can engage the upper engagement edge 83, and an engaging shoulder 105, of internal structure of the dispensing assembly 40, can engage the lower engagement edge 84, as shown in FIG. 4. Accordingly, the reciprocation collar 80 can be rotatably secured, in a set vertical position, within the dispensing assembly 40.

As described above, FIG. 4 is a portional cross-sectional side view of the beverage apparatus of FIG. 2, to illustrate in further detail the base assembly 90, according to principles of the disclosure. As shown in FIG. 4, the base assembly 90 can include an enclosure over-mold or casing 91. The base assembly 90 can also include an enclosure substrate 93, which can be or include an enclosure. The enclosure substrate 93 can include various structural features as described herein and shown in the drawings. The enclosure substrate 93 can be constructed of injection molded plastic, for example. Various other components of the beverage apparatus 10 can be constructed of injection molded plastic.

The enclosure over-mold or casing 91 can provide an outer protective casing that is annular or cylindrical, and that encloses the enclosure substrate 93. The casing 91 can provide an outer protective shell for the base assembly 90. The casing 91 can include an attachment collar 91C. The attachment collar 91C can be annular in shape and extend inwardly from a lower edge of the casing 91. The attachment collar 91C can function to secure the casing 91 onto the enclosure substrate 93. As shown in FIG. 4, the attachment collar 91C can be sandwiched between or clamped between a lower edge of the enclosure substrate 93 and an outer upper edge of a skirt shoe 112, as shown in FIG. 4. More specifically, the attachment collar 91C can be engaged with and supported upon a lower attachment flange 112A of the skirt shoe 112.

Figure 9:
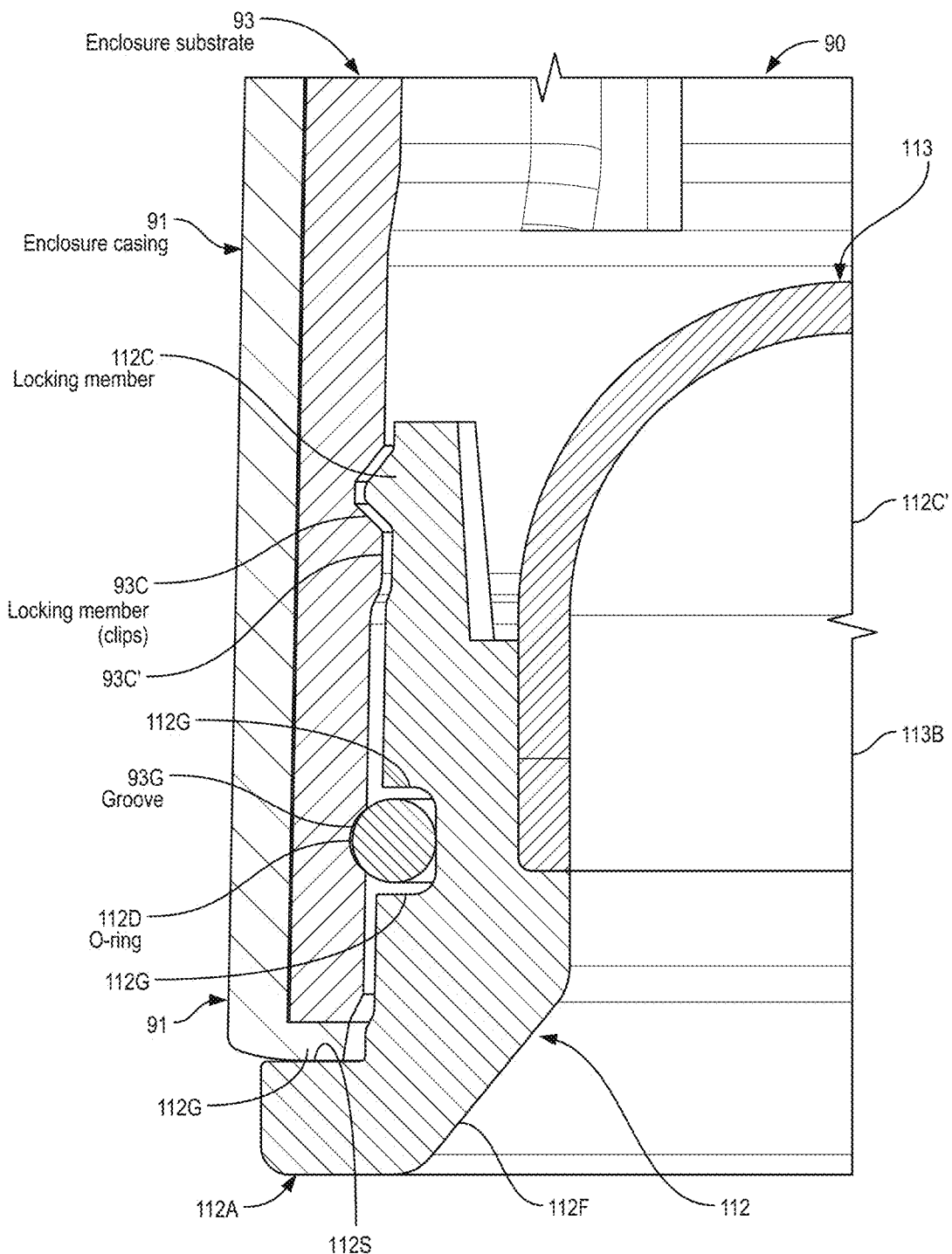
FIG. 9 is a portional cross-sectional side view of a beverage apparatus similar to the beverage apparatus 10 of FIG. 2, according to principles of the disclosure.

The enclosure substrate 93 can include a locking member or arrangement that serves to connect the enclosure substrate 93 to an interior structure of the beverage apparatus 10. The locking member or arrangement can attach the enclosure substrate 93 to a base middle assembly 100 and/or the base lower assembly 110. For example, in some embodiments, such locking member can be constituted by a friction fit so as to secure the enclosure substrate 93 to the base lower assembly 110. In some embodiments, an arrangement such as shown in FIG. 9 can be used to secure the enclosure substrate 93 onto the base lower assembly 110. Further details are described below with reference to FIG. 9.

As shown in FIG. 4, the beverage apparatus 10, and in particular the base assembly 90, can include the enclosure casing 91, the enclosure substrate 93, the base middle assembly 100, and the base lower assembly 110. Such components can collectively be described as a dispensing assembly structure 45, and can be part of the base assembly 90. The dispensing assembly 40 can also be a part of the base assembly 90. The dispensing assembly structure 45 can support the chamber housing 20 and can serve to support and interconnect the various components of the base assembly 90.

As shown in FIG. 4, the enclosure substrate 93 can be connected to the base middle assembly 100 using fasteners. For example, the enclosure substrate 93 can include a fastener aperture 94. The base middle assembly 100 can include a fastener aperture 104. A fastener 98 can extend through the fastener aperture 104 and into the fastener aperture 94, so as to be secured in the fastener aperture 94. The fastener 98 can be secured utilizing threads. Other attachment mechanisms can be used. In some embodiments, the enclosure substrate 93 can be integrally formed with the base middle assembly 100. The base middle assembly 100 can include an outer flange 100F that is received into an annular receiving groove 95, so as to position and support the base middle assembly 100 relative to the enclosure substrate 93.

The enclosure substrate 93 can also include an attachment collar 93E. The attachment collar 93E can be an annular collar that extends outwardly at an upper end of the enclosure substrate 93. The attachment collar 93E can encircle the beverage apparatus 10. The attachment collar 93E can serve to hold or engage with the enclosure casing 91.

As described above, the base assembly 90 can also include a support top 96. As shown in FIG. 4, the support top 96 can be in the form of a ring or collar that is housed or "couched" within the enclosure substrate 93. The support top 96 can include an outer flange 96F. For example, the outer flange 96F can be received into an inner facing, annular recess 93R, as shown in FIG. 4. The annular recess 93R can accommodate or engage with both the support top 96 and an outer, upper diameter of the base middle assembly 100.

As shown in FIG. 4, the support top 96 can include an inner opening or aperture 97. The opening 97 can surround, support and house the inner receptacle member 60. As otherwise described herein, the support top 96 can also provide an upper stop or constraint to the reciprocation collar 80.

As shown in FIG. 2 and FIG. 4, the base assembly 90 can include the base middle assembly 100. The base middle assembly 100 can also be described as a support mid 100. As shown in FIG. 4, the base middle assembly 100 can include various support structure 101. The support structure 101 can be constructed of injection molded plastic, for example.

As shown in FIG. 4, the base middle assembly 100 can include curved support flanges 102. The curved support flanges 102 can provide structure for the base middle assembly 100 to engage with and attach to the enclosure substrate 93. As described above, the base middle assembly 100 can also include vertical slots 103. The vertical slots 103 can slidably engage with anti-rotational fins 67F, of the inner receptacle member 60. The base middle assembly 100 can also include the fastener apertures 104, which serve to attach the assembly 100 to the enclosure substrate 93. The base middle assembly 100 also includes the engaging shoulder 105. The engaging shoulder 105 serves to retain, abut against, and house a lower end of the reciprocation collar 80. In particular, the reciprocation collar 80 can rotate within the base middle assembly 100, while being constrained in the vertical direction by the engaging shoulder 105 and the support top 96.

As shown in FIG. 4, the base middle assembly 100 or assembly 100 can also include gear cavity 106. The gear cavity 106 can be a recess or relief in and around, at least a portion of, the upper, inner portion of the base middle assembly 100. The gear cavity 106 can accommodate the outer diameter (OD) engagement drive threads 82 on the outer surface of the reciprocation collar 80. Such drive threads are illustrated in FIG. 12, for example.

The base middle assembly 100 can also include a support surface 107. The support surface 107 can include one or more surfaces on the outer circumference of the base middle assembly 100 that serve to engage and support the enclosure substrate 93. The support surface 107 can be "stepped" so as to engage with a matching surface, of the inner diameter, of the enclosure substrate 93.

The base middle assembly 100, along with the base lower assembly 110, can include or support a support platform 161. The support platform 161 can support various electrical components of the beverage apparatus 10. The support platform 161 can support, for example, printed circuit boards, one or more processors, one or more storage components or databases, a battery and other electrical components. The support platform 161 can also include, support or be associated with a USB port assembly 168, which can include a USB port connector 169. In at least one embodiment, the USB port connector 169 can provide electrical power to the beverage apparatus 10, so as to charge a battery within the beverage apparatus 10, for example.

Relatedly, FIG. 5 is a portional cross-sectional side view of the beverage apparatus of FIG. 2, to illustrate in further detail the base lower assembly 110, according to principles of the disclosure. The base lower assembly 110 can be attached and can be secured onto a lower end of the beverage apparatus 10. The base lower assembly 110 can be supported by both the base middle assembly 100, the enclosure substrate 93 and/or the enclosure casing 91.

Figure 11:
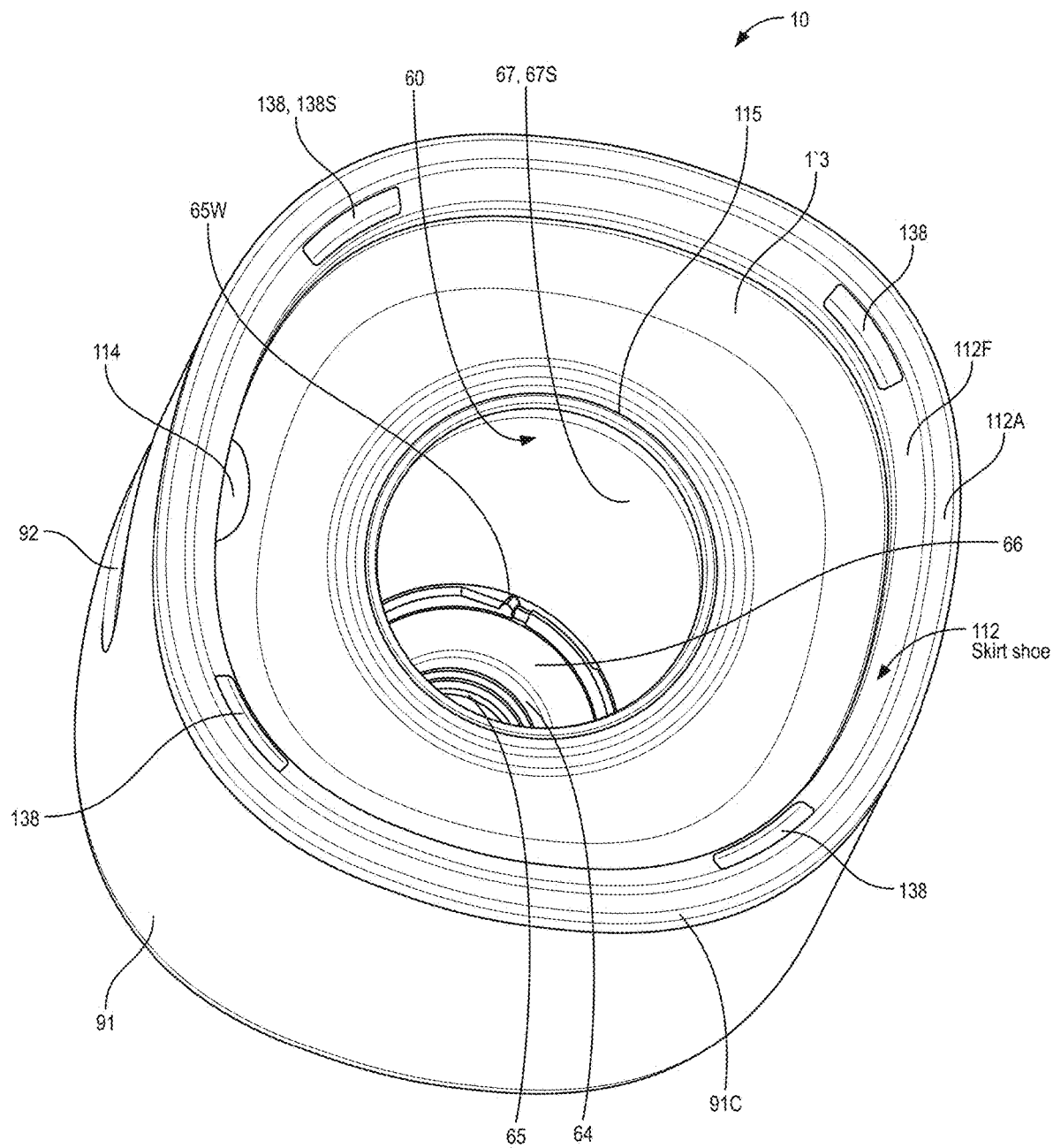
FIG. 11 is bottom perspective view of a beverage apparatus 10, according to principles of the disclosure.
Figure 17:
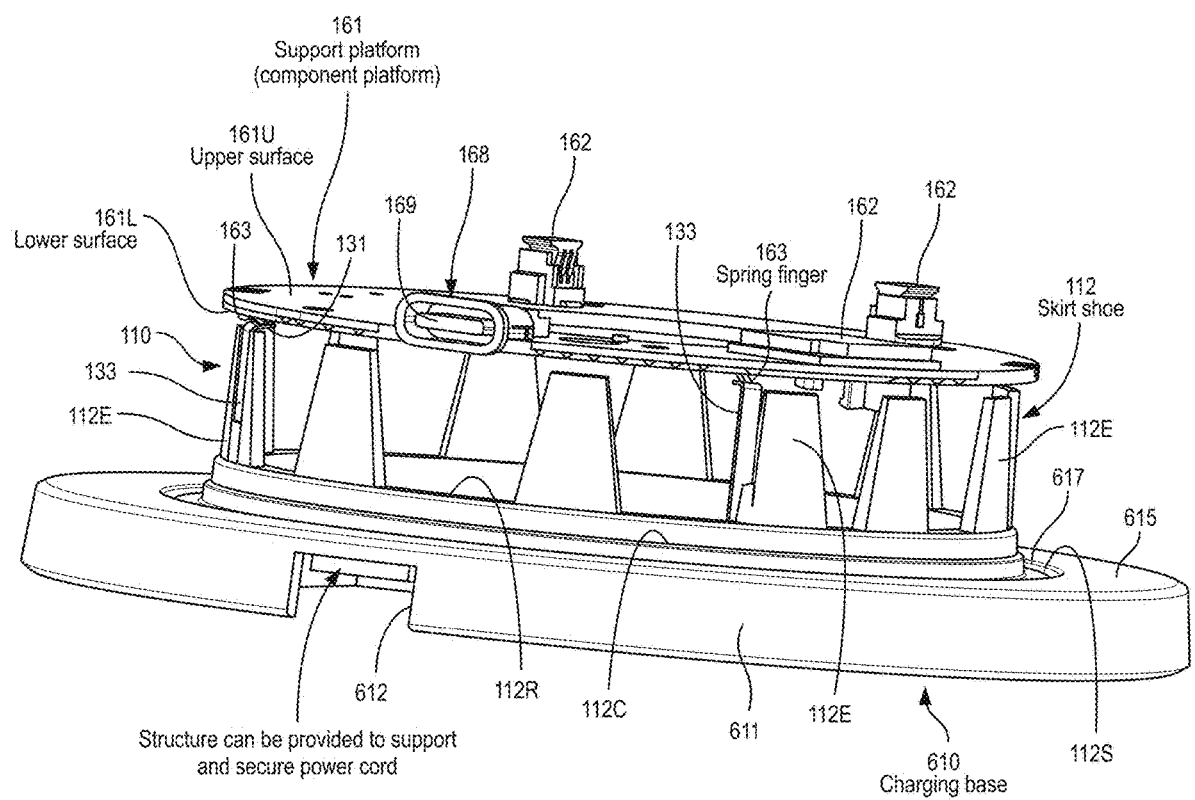
FIG. 17 is a perspective view of the base assembly 90 (including support platform or circuit board 161 and skirt shoe 112) with the base assembly 90 positioned on a charging base 610, according to principles of the disclosure.

Related to FIG. 5, FIG. 11 is bottom perspective view of a beverage apparatus 10, according to principles of the disclosure. Also, FIG. 17 is a perspective view of the base assembly 90 (including support platform or circuit board 161 and skirt shoe 112) with the base assembly 90 positioned on a charging base 610, according to principles of the disclosure. FIG. 4, described above, also shows features of the base lower assembly 110.

As shown in FIG. 5 and FIG. 17, the base lower assembly 110 can include the shoe support 111. The shoe support 111 can be constructed of injection molded plastic. The shoe support 111 can include structure, such as fins, holes, slits, support posts, or other engagement structure that engage with and support the skirt shoe 112 and the component platform 161. The shoe support 111 can support the skirt shoe 112. In turn, the skirt shoe 112 can support a skirt 113. As described below, in different embodiments, different construct can be used for the shoe support 111 and the skirt shoe 112. In such different constructs, some components can be a part of or integrated with the shoe support 111 or the skirt shoe 112.

With reference to the embodiment of FIG. 5, the shoe support 111 can include openings, grooves, apertures, slits or other similar structure into which a respective connection projection or connection fin 112E (of the skirt shoe 112) is received. For example, the connection projection 112E can be in the form of a prong 112E (FIG. 17) that is received into a slit or receiving aperture 111S of the shoe support 111.

The particular attachment structure can be varied as desired. Such attachment structure allows the skirt shoe 112 to be attached to the shoe support 111. The shoe support 111 can be secured to the internal structure of the beverage apparatus 10. A skirt 113 is secured onto the skirt shoe 112.

As shown in FIG. 5, the skirt 113 can include a plurality of apertures or skirt apertures 116. The connection projections or connection fins 112E (of the skirt shoe 112) can extend through such apertures 116, as well as into the shoe support 111. Accordingly, the connection projections or connection fins 112 can support the skirt 113.

The skirt shoe 112 can also include a lower attachment flange 112A. The lower attachment flange 112A can form a lower, outer edge of the skirt shoe 112. The lower attachment flange 112A can be in the form of a flange that forms an outer, lower periphery of the skirt shoe 112. As shown in FIG. 5, the lower attachment flange 112A can engage with the attachment flange or collar 91C of the enclosure casing 91. Further details are described below with reference to FIG. 18, in particular.

Figure 6:
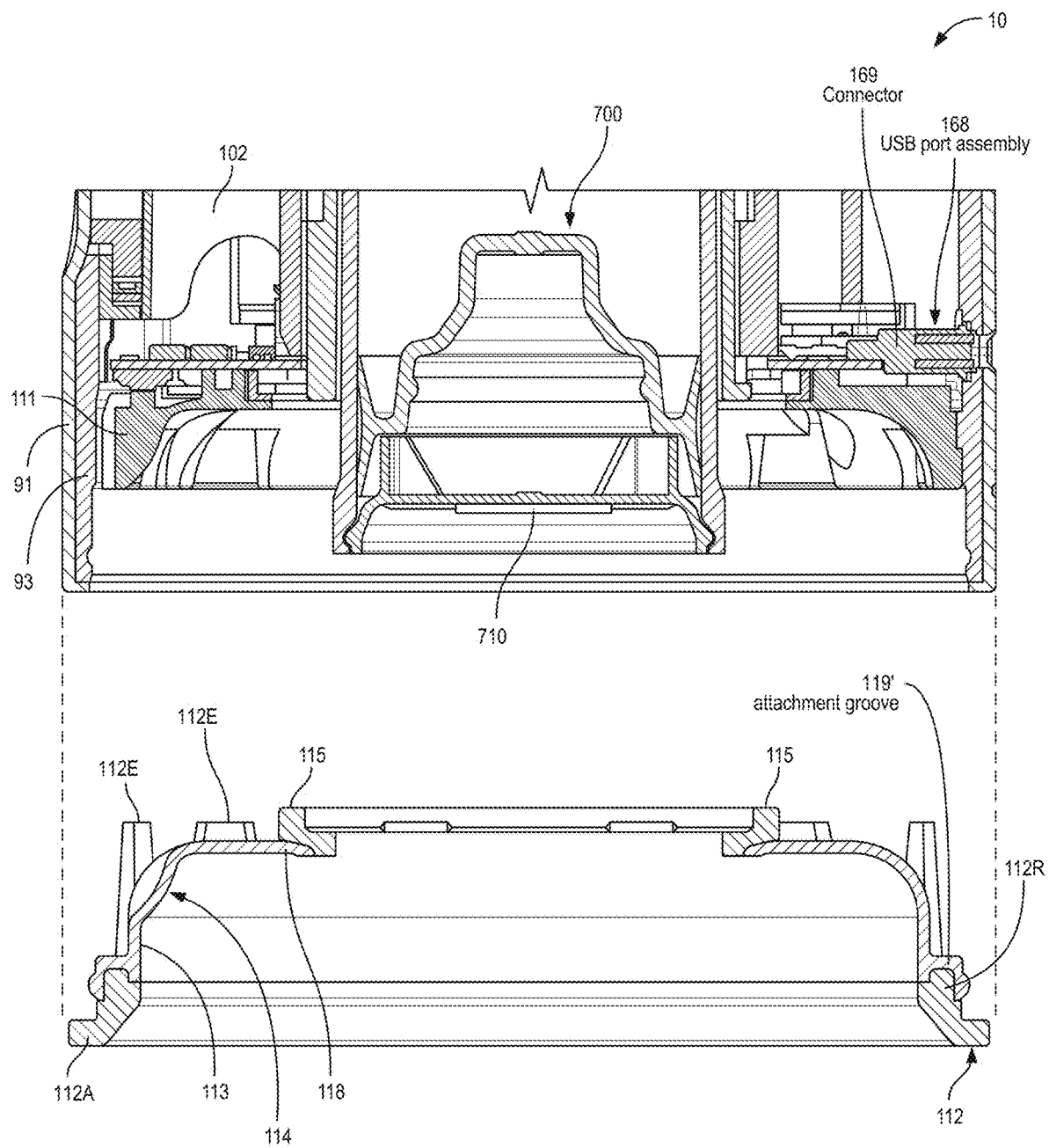
FIG. 6 is an exploded cross-sectional view of a lower end of a beverage apparatus 10 the same as or similar to the beverage apparatus 10 of FIG. 2, according to principles of the disclosure.
Figure 7:
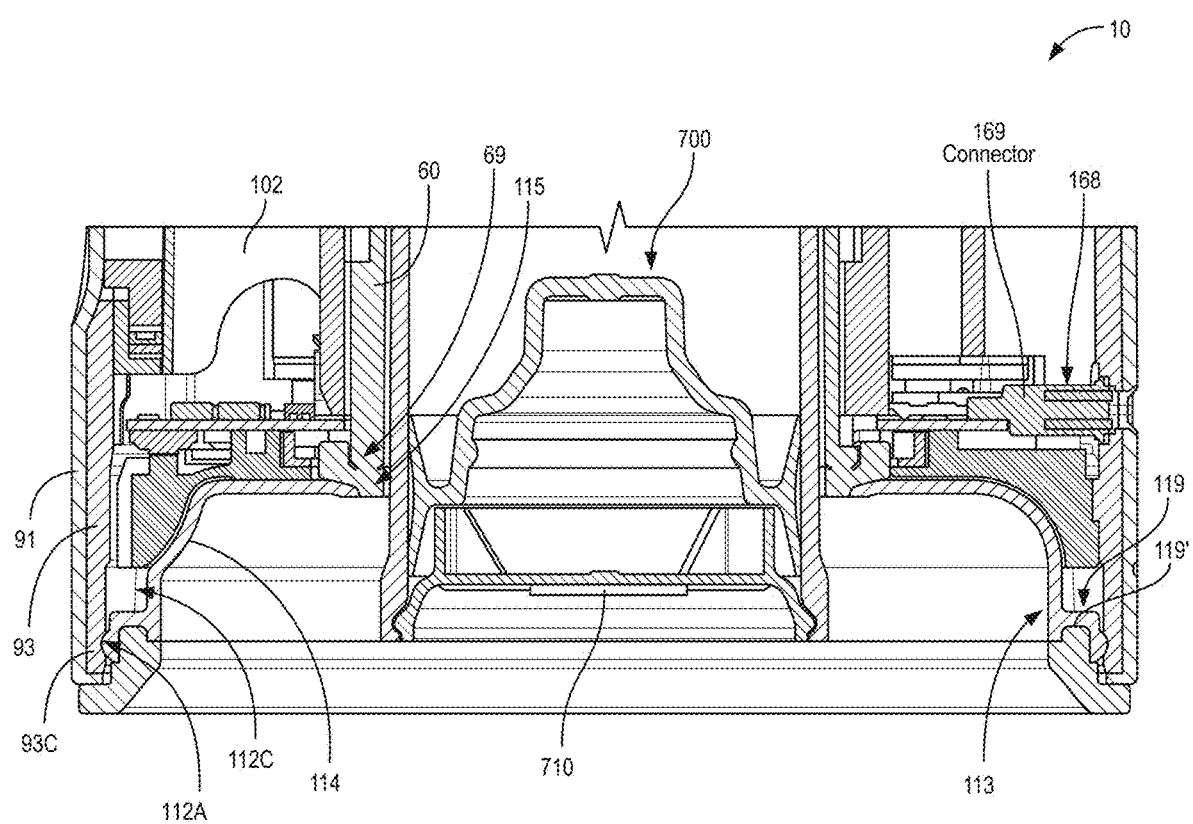
FIG. 7 is a cross-sectional view of the lower end of the beverage apparatus 10, of FIG. 6, with the components (shown in FIG. 6) attached together, according to principles of the disclosure.

In accordance with at least one embodiment of the disclosure, FIG. 6 is an exploded cross-sectional view of a lower end of a beverage apparatus 10 the same or similar to the beverage apparatus 10 of FIG. 2. Relatedly, FIG. 7 is a cross-sectional view of the lower end of the beverage apparatus 10, of FIG. 6, with the components (shown in FIG. 6) attached together, according to principles of the disclosure. FIG. 6 shows skirt ring 113 mounted onto the skirt shoe 112. FIG. 6 also shows a bottom button 114 of the skirt 113. The bottom button 114, and skirt in general, can be constructed of flexible or elastomeric material. Accordingly, the button or bottom button 114 can be depressed by a user as provided by the elastic nature of the skirt 113. The bottom button 114 can be positioned adjacent a mechanical switch or other switch so as to activate functionality of the beverage apparatus 10.

FIGS. 6 and 7 also show further details regarding attachment of the skirt 113 onto supporting structure of the beverage apparatus 10. As described above, the skirt 113 can be mounted onto the skirt shoe 112 at an outer peripheral edge of the skirt 113. More specifically, the skirt 113 can be provided with an outer attachment edge portion 119 that can form an outer periphery of the skirt 113. Accordingly, the attachment edge portion 119 can be annular and run about an outer edge of the skirt 113. The attachment edge portion 119 can be annular and have a squircle shape of the bottle. The attachment edge portion 119 can include a groove 119'. The skirt shoe 112, as shown in FIGS. 6, 7, and 17 can include attachment ring 112R. The attachment ring 112R can be received, snapped, or clicked into the attachment groove 119'. Accordingly, the skirt 113, being elastic in nature, can be retained on and attached to the skirt shoe 112. As shown in FIG. 17, the attachment ring 112R can support the connection projections 112E. That is, the connection projections 112E can extend upwardly from the attachment ring 112R. Relatedly, the attachment groove 119' (of the skirt 113) can be intermittently broken by the skirt apertures 116. As described above, the skirt apertures 116 can receive the connection projections or connection fins 112E (of the skirt shoe 112). Accordingly, the attachment edge portion 119 (of the skirt 113) can include a plurality of the grooves 119' (see FIG. 6) running about the skirt 113 that are interrupted or broken by skirt apertures 116 (see FIG. 5). Each skirt aperture 116 can receive a corresponding connection projection 112E. Each attachment groove 119' can receive a segment of the attachment ring 112R. Accordingly, such structure can securely and stably support the skirt 113 while providing flexibility of an inner extent of the skirt 113, as described hereinafter.

As shown in FIGS. 5 and 6, the skirt 113 can also include an inner attachment edge portion 118. The attachment edge portion 118 can be bonded or mechanically connected to a skirt ring 115. The skirt ring 115 can be bonded or mechanically connected to a lower edge of the inner receptacle member 60. In some embodiments, the lower edge of the inner receptacle member 60 can be provided with a lower attachment flange 69, as described above. Such lower attachment flange 69 can serve to attach the inner receptacle member 60 to the skirt ring 115. In other embodiments, the lower attachment flange 69 can be omitted. That is, a lower edge of the inner receptacle member 60 can be attached directly to the skirt ring 115. In some embodiments of the disclosure, the inner attachment edge portion 118 of the skirt 113 can be bonded onto the skirt ring 115. In turn, the skirt ring 115 can be bonded onto the inner receptacle member 60, i.e., bonded to the lower attachment flange 69 or directly to a lower edge of the inner receptacle member 60. However, in other embodiments, such bonding can be omitted. That is the elastic nature of the skirt 113 can apply an upward force so as to maintain the inner attachment edge portion 118, i.e. an inner edge of the skirt 113, engaged with the skirt ring 115, in conjunction with maintaining the skirt ring 115 engaged with the inner receptacle member 60. Also, the skirt ring 115 and the inner receptacle member 60 can be friction fit together.

Figure 8:
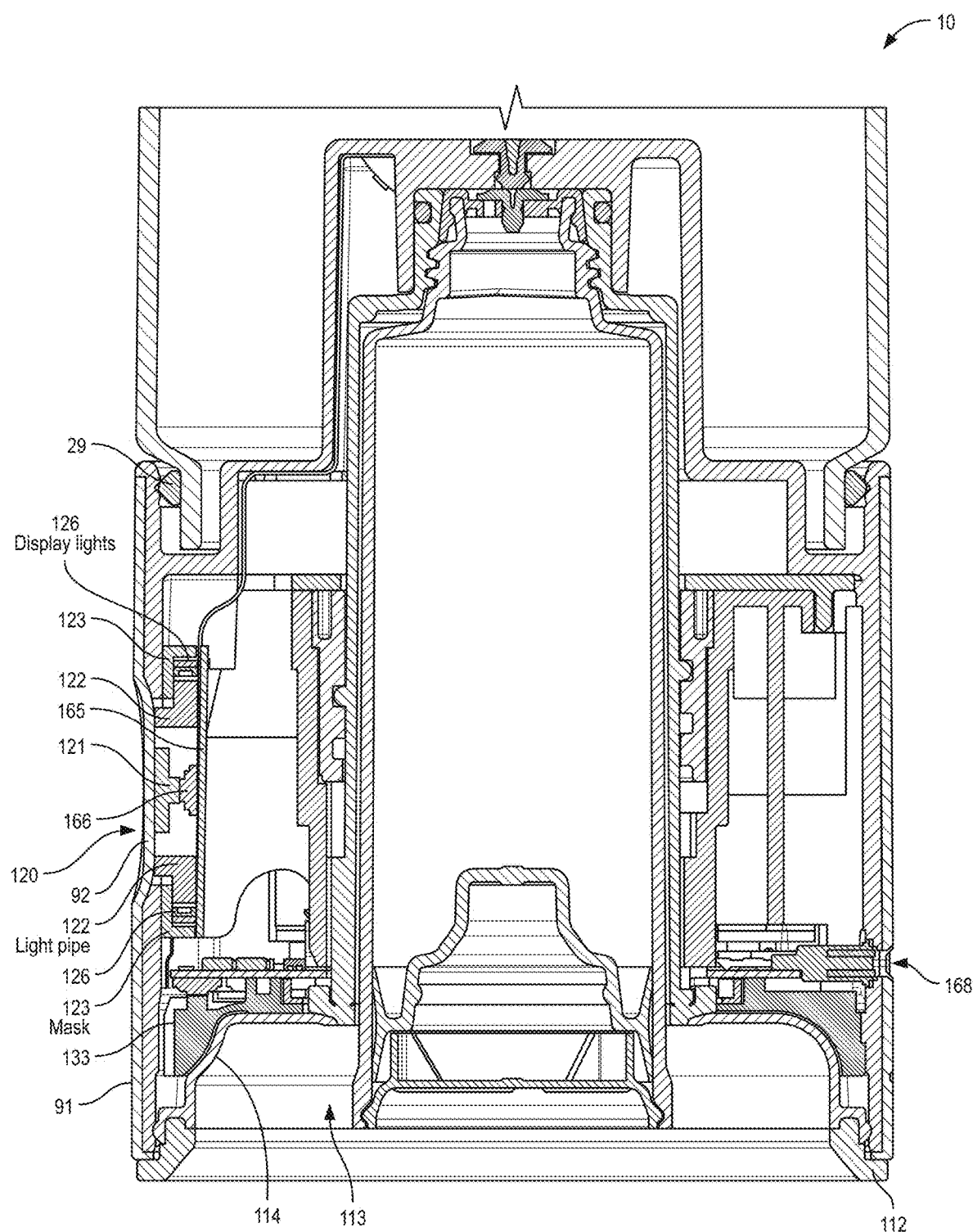
FIG. 8 is a cross-sectional side view of a lower portion of a beverage apparatus 10 the same as or similar to the beverage apparatus 10 shown in FIG. 2, according to principles of the disclosure.

FIG. 8 is a cross-sectional side view of a lower portion of a beverage apparatus 10 the same as or similar to the beverage apparatus 10 shown in FIG. 2. In particular, FIG. 8 is provided to show details of a user interface (UI) 120. The user interface 120 provides functionality by which a user can input information into the beverage apparatus 10. The user interface 120 also provides functionality by which the beverage apparatus 10 can output information to the user.

The user interface 120 can be combined with the button 114 (described above), as well as other user interfaces as desired. For example, the user interface 120 can include a button 121 that can be depressed by the user applying pressure to the enclosure over-mold or casing 91. That is, the casing 91 can be constructed of flexible or elastomeric material, through which the user can apply pressure so as to depress button 121. The button 121 can be described as an additive button 121 since the user can press the additive button 121 so as to request a dispense of additive from the pod 700 into the chamber 25. The button 121 can, in turn, engage with a button 166. The button 166 can be a part of or engage with a side circuit board 165 or additional circuit board or other componentry. The side circuit board 165 can support electrical and mechanical components. The side circuit board 165 can supplement other circuit boards in the beverage apparatus 10, such as the circuit board 161. The side circuit board 165, in conjunction with the side circuit board 161, can provide control of and/or include the user interface 120.

The user interface 120 can include components provided to output information or data to the user. The user interface 120 can include one or more display lights 126. The display lights can be controlled by controller 160. The display lights 126 can be constructed so as to, as controlled by controller 160, output different sequences of emitted light, different patterns of emitted light, different colors, and other variations in light so as to indicate particular operations of the beverage apparatus 10. For example, a display light 126 can be controlled, by the controller 160, to pulse or output a particular color of light upon the dispense from an additive vessel 700 of a particular type, e.g. a particular vitamin. For example, upon a user pressing the button 121, the controller 160 can control the light 121 to emit light. Such operation can provide the user with feedback in response to the user interacting with the beverage apparatus 10.

The light or lights 126 can be integrated into the beverage apparatus 10 in various ways. As shown in FIG. 8, a front light pipe 122 can be exposed to the light 126, such that the light pipe 122 illuminates upon the light 126 illuminating. The light pipe 122 can be constructed of transparent material, such as clear plastic. The light pipe 122 can be annular or circular in shape and surround the button or additive button 121. The light pipe 122 can be masked so as to control the visual experience and the particular output of light.

Accordingly, a front light pipe mask 123 can be positioned adjacent the front light pipe 122. Lights of the beverage apparatus 10, to provide user output, can be masked by other masking structure or masked by the overall structure of the beverage apparatus.

As described above, the beverage apparatus can include a skirt 113. The skirt 113 can be attached to a skirt shoe 112. The skirt shoe 112 can be attached to a shoe support 111. Such arrangement is shown in FIG. 5, for example. Such components can be attached together using heat bonding, adhesive, other bonding, and/or mechanical connection arrangements. For example, protuberances, in a first component, can be provided that match with recesses, in a second component. Additionally, a recess in conjunction with an O-ring or gasket can be provided so as to attach components described herein and to provide a seal between components described herein.

In accord with a further embodiment, FIG. 9 is a portional cross-sectional side view of a beverage apparatus similar to the beverage apparatus 10 of FIG. 2, according to principles of the disclosure. FIG. 9 shows details of a base assembly 90. The base assembly 90 includes skirt 113 and skirt shoe 112. The skirt 113 can be attached to the skirt shoe 112 at a bond or bond seam 113B. The base assembly 90 also includes an enclosure substrate 93 and an enclosure casing 91. The enclosure casing 91 can include an attachment collar 91C. The attachment collar 91C can be sandwiched between a lower edge of the enclosure substrate 93 and a lower attachment flange 112A of the skirt shoe 112. The lower attachment flange 112A can be provided with an upper surface or support surface 112S that engages with the attachment collar 91C. The skirt shoe 112 can include a chamfer 112F. The skirt shoe 112 can house connection assemblies 130. Each of such connection assembly 130 can be constructed of conductive material, including metal, and can conduct electricity from an exterior of the beverage apparatus 10 to interior components of the beverage apparatus 10. Multiple connection assemblies 130 can be used for charging of the beverage apparatus 10, for example. A contact plate, contact, or charge plate 138 (see FIG. 11), of the connection assembly can be positioned within the chamfer 112F. Illustratively, a connection assembly 130 is described below with reference to FIGS. 11 and 19-22.

In the embodiment of FIG. 9, the skirt shoe 112 can be attached and secured onto the enclosure substrate 93. As otherwise described herein, the enclosure substrate 93 can be of a cylindrical shape, and the skirt shoe 112 can be of a cylindrical shape. Such cylindrical shape can be squircle in shape or circular in shape so as to be the same shape as the overall shape of the bottle. The skirt shoe 112 can be slid into the enclosure substrate 93. The skirt shoe 112 and/or the enclosure substrate 93 can be provided with attachment or locking members so as to secure such two components together. For example, as shown in FIG. 9, the skirt shoe 112 can be provided with a locking member 112C. The locking member 112C can be an annular ridge that extends about the skirt shoe 112. The enclosure substrate 93 can include a locking member 93C. The locking member 93C can be a recess or annular recess or groove that extends about an inner diameter of the enclosure substrate 93. The locking member 93C can engage with the locking member 112C so as to attach the skirt shoe 112 within the enclosure substrate 93. As shown in FIG. 9, additional attachment mechanisms can be provided. In particular, the skirt shoe 112 can be provided with an annular recess or recess 112C' that engages with a protuberance or annular ridge 93C' of the enclosure substrate 93. Additional attachment mechanisms can be provided including clips, ridges, grooves, protuberances, or recesses. Such attachment mechanisms can be used in the arrangement of FIGS. 2 and 4, for example.

Additionally, the skirt shoe 112 can be provided with a groove or annular groove 112G that houses an O-ring or gasket 112D. Such arrangement can provide a seal between the skirt shoe 112 and the enclosure substrate 93, as well as serve to attach the components 112, 93. In some embodiments, the enclosure substrate 93 can also be provided with a groove 93G so as to mate with the O-ring 112D. Such groove 93G can be shallow, so as to allow the O-ring 112D to slip out. In some embodiments, the enclosure substrate 93 may not be provided with a groove, such that the O-ring 112D simply rests on the inner surface of the enclosure substrate 93.

Figure 10:
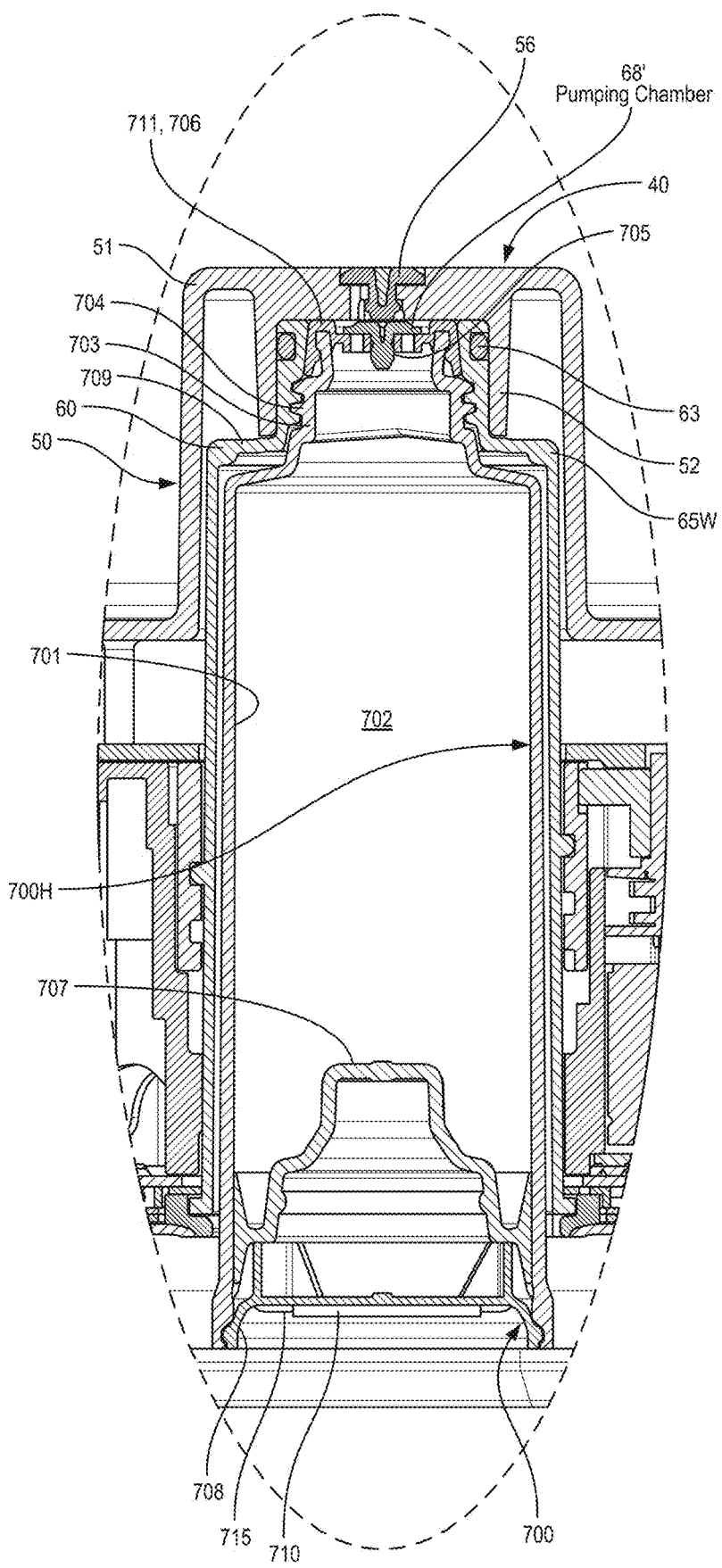
FIG. 10 is a portional cross-sectional view of a dispensing assembly 40 of a beverage apparatus 10 the same as or similar to the beverage apparatus 10 of FIG. 2, according to principles of the disclosure.

FIG. 10 is a portional cross-sectional view of a dispensing assembly 40 of a beverage apparatus 10 the same as or similar to the beverage apparatus 10 of FIG. 2, according to principles of the disclosure. As described above, the dispensing assembly 40 can include an outer receptacle member 50 and an inner receptacle member 60. The inner receptacle member 60 can house a pod 700. The pod 700 and the inner receptacle member 60, as shown in FIG. 10, can reciprocate up and down as a unit. Further details of construct of the pod 700 and operation to perform dispensing of additive in the pod 700 are otherwise described herein.

As described above, FIG. 11 is bottom perspective view of a beverage apparatus 10, according to principles of the disclosure. As shown in FIG. 11, the beverage apparatus 10 includes an enclosure casing 91 that forms an outside surface of the beverage apparatus 10. The enclosure casing 91 can include an attachment collar 91C, as also shown in FIG. 9. The apparatus 10 can include the skirt shoe 112. The skirt shoe 112 can include a chamfer 112F in which contact plates 138 can be disposed. Each contact plate 138 can include a contact surface 138S. The contact surface 138S can engage with a charging station, for example. FIG. 11 also shows the lower attachment flange 112A, as is also shown in FIG. 9.

The skirt shoe 112 and inner receptacle member 60, along with other components, can support the skirt 113. As shown in FIG. 5 and FIG. 11, a skirt ring 115 can be provided so as to attach the skirt 113 onto the inner receptacle member 60. The inner receptacle member 60 can include the body 67 that includes an inner surface 67S. As described herein, the inner receptacle member 60 can house a pod 700. Threads on the pod 700 can thread onto or engage with threads 65 of member 60. As shown in FIG. 3, FIG. 11, and FIG. 12, the interior threads or threads 65 can be disposed on or integrated with, i.e. molded with, an inner engagement surface 64.

FIG. 11 also shows the button 92 that can be described as a button over-mold. The button 92 can be constructed of flexible or elastomeric material that can be pressed by a user. The pressing of the button 92 engages with mechanical or electrical components within an interior of the beverage apparatus 10. Also, FIG. 11 shows a bottom button 114. As described herein, the skirt 113 can be constructed of flexible or elastomeric material. The bottom button 114 can be constructed of flexible material that can be pressed by a user. The pressing of the bottom button 114 can engage with mechanical or electrical components within the interior of the beverage apparatus 10. Pressing of the bottom button 114 and the button 92 can be observed by the controller 160 and result in predetermined operations being performed by the beverage apparatus 10.

As described above. FIG. 12 is a top perspective view of a dispensing assembly 40, including details of the inner receptacle member 60 and drive assembly 70. FIG. 13 is a diagram that shows a perspective view and front view of a drive assembly 70 the same as or similar to the drive assembly 70 shown in FIG. 12. FIG. 12 shows the inner receptacle member 60 that can house and retain a pod 700 and reciprocate, as a unit, with the pod 700. The inner receptacle member 60 can include a drive ridge or drive thread 67R.

Such drive thread 67R can be engaged with the reciprocation collar 80. Accordingly, rotation of the reciprocation collar 80 translates into up-and-down motion of the inner receptacle member 60, depending on direction of rotation. In operation, in some embodiments, the vertical fins 67F can engage with surrounding structure of the dispensing assembly such that reciprocation movement of the inner receptacle member 60/pod 700 is allowed, while rotational movement is precluded. The reciprocation collar 80 is rotatably driven by engagement drive threads or outer diameter engagement drive threads 82.

Such threads 82 are driven by a main drive gear 73. In turn, the main drive gear 73 is driven by motor 71 through a suitable gear train or gear arrangement. As shown in FIG. 2, the motor can be supported by supports 71S. The supports 71S can be plastic, metal, or rubber, for example. Additional details are described above.

Figure 14:
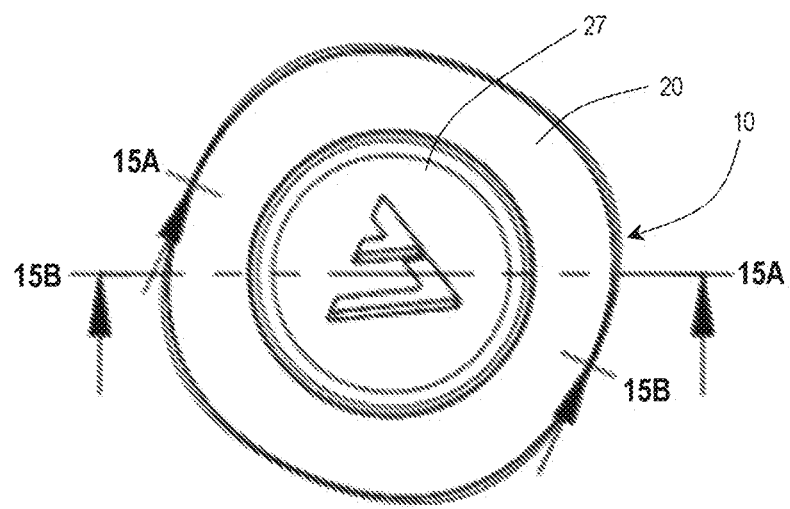
FIG. 14 is a top view of a beverage apparatus 10, according to principles of the disclosure.

In accordance with at least some embodiments of the disclosure, the beverage apparatus 10, and in particular the chamber housing 20 and body 21, can be of a "squircle" shape, i.e. a shape that is a combination of a square and a circle. FIG. 14 is a top view of a beverage apparatus 10, according to principles of the disclosure. As shown, the beverage apparatus 10 includes a chamber housing 20. The beverage apparatus 10 can include a lid or cap 27 that screws onto or threads onto the chamber housing 20.

FIG. 15A is a cross-sectional view along line 15A FIG. 14. FIG. 15B is a cross-sectional view along line 15B FIG. 14. As shown in FIG. 15A and FIG. 15B, the beverage apparatus 10 can include dispensing assembly 40. The dispensing assembly 40 can receive a pod 700 that contains an additive. A consumable liquid can be contained in the chamber housing 20, and the additive from the pod 700 can be added into the chamber housing 20 using the dispensing assembly 40. The beverage apparatus can include cap 27. A bulb or elastic bulb 28 can be positioned atop the chamber housing 20. That is, an outer lip or edge of the bulb 28 can be positioned on a top edge of a neck of the chamber housing 20, in accordance with at least one embodiment. The cap 27 can be screwed onto the neck so as to hold the bulb 28 in place. The bulb can be elastic or rubber. The cap 27 can include holes, slits, or apertures 27'. Such apertures can allow air flow through the cap 27. As result, with the bulb 28 being elastic, the arrangement can effectively adjust to varying volumes of liquid and gas within the chamber housing 20. When additive is dispensed into the chamber housing 20, the bulb 28 can deform so as to increase the volume of the chamber housing 20. In the absence of the bulb 28, a dispense of additive into the chamber housing 21 could be hindered due to pressure buildup within the chamber housing 20. FIGS. 15a and 15B also show other features as otherwise described herein, including drive assembly 70 and motor 71.

Figure 16:
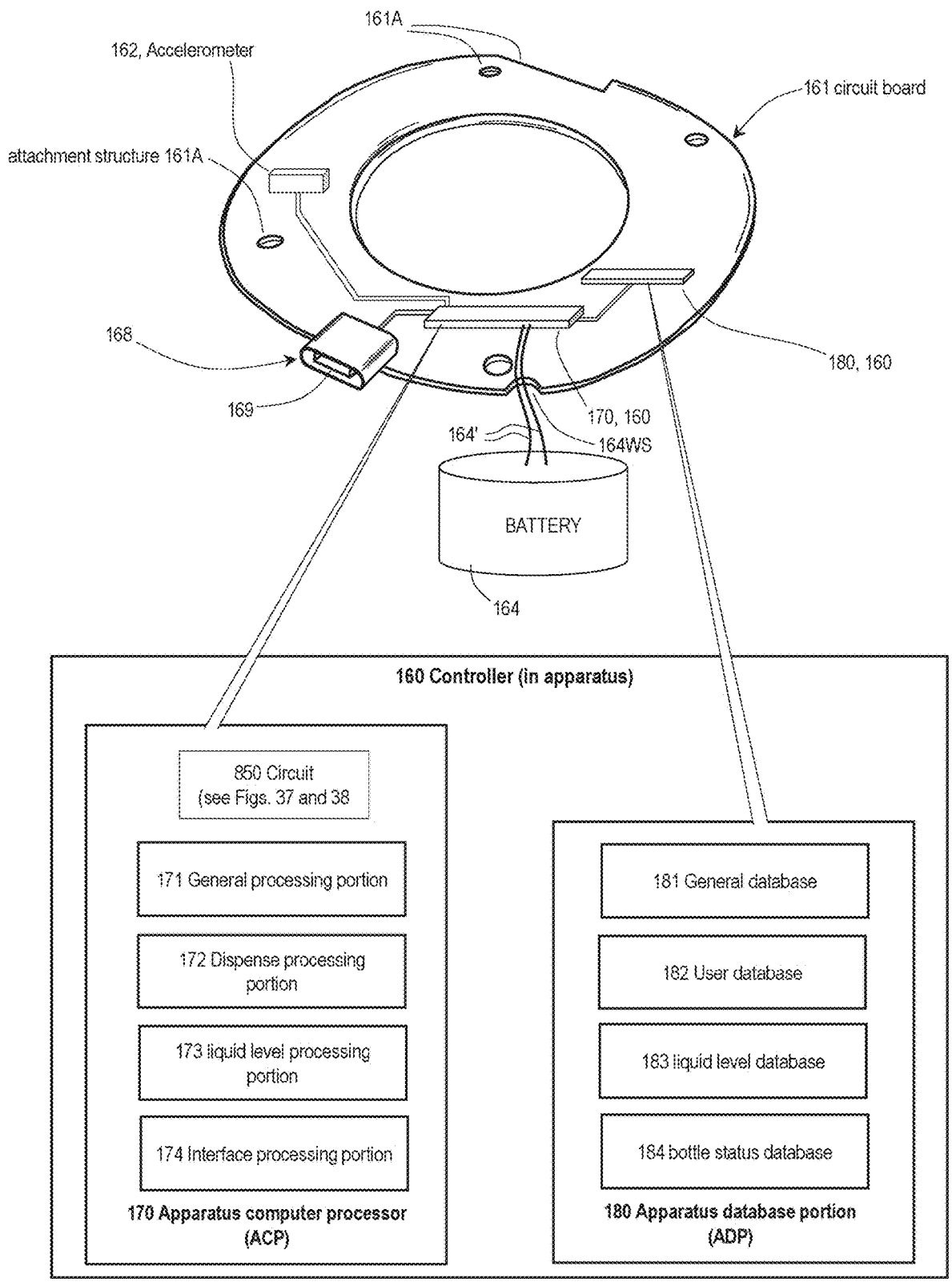
FIG. 16 is a schematic diagram showing details of a controller 160 mounted on support platform 161, along with battery 164 attached to the controller 160, according to principles of the disclosure.

FIG. 16 is a schematic diagram showing a controller 160 mounted on support platform 161, along with battery 164 attached to the controller 160. The support platform 161 can be the same or similar to the support platform 161 as shown in FIG. 2. The support platform 161 can also be described or include a component platform and/or a circuit board. The support platform 161 can support a variety of electrical components 162 including a controller 160, components to charge the beverage apparatus 10, and various other electrical components of the beverage apparatus 10. The battery 164 can be connected to the support platform 161 and/or the controller 160 via wires 164', which can pass through a wire slit or opening 164WS in the support platform 161, which can constitute a circuit board.

The support platform 161 can include an upper surface 161U and a lower surface 161L. The electrical components can be positioned on and supported on the surfaces 161U and/or 161L. Additionally, the support platform 161 can include attachment structure 161A. The attachment structure can include apertures, slits, openings, holes, barbed projections, projections, positioning studs, threaded studs, or other structure that can be used to attach the support platform 161 to other internal structure in the beverage apparatus 10.

The support platform 161 can also support the USB port assembly 168, which can include a USB port connector 169. However, other types and arrangements of connectors can be utilized as an alternative to a USB (Universal Serial Bus)

connection. As described further below, the support platform 161 can also include a plurality of spring fingers 163. In particular, the spring fingers 163 can be supported on the lower surface 161L of the support platform 161, to provide connections for charging of the beverage apparatus 10.

The controller 160 can be constituted by one or more modules or portions that are disposed on or in the support platform 161 and/or constituted by other circuit boards or support platforms within the beverage apparatus 10. For example, portions of the controller 160 can be supported by or be a part of a side circuit board 165. The controller 160 can include one or more processors that can be in the form of (or described as) an apparatus computer processor (ACP) 170. The ACP 170 can perform various processing based on data or code. The controller 160 can also include an apparatus database portion (ADP) 180, which can store such data or code. Further details of the controller 160 are described below.

As described above, FIG. 17 is a perspective view of the base assembly 90 (including support platform or circuit board 161 and skirt shoe 112) with the base assembly 90 positioned on a charging base 610, according to principles of the disclosure. The support platform 161 can be supported in position, above the skirt shoe 112, by the shoe support 111 (see FIG. 2) or by other internal structure of the beverage apparatus 10. The charging base 610 can include an outer platform 615 with the outer wall 611. A cord opening 612 can be provided in the outer wall 611 so as to allow for wiring into the charging base 610. Further details of the charging base 610 and operation thereof are described below.

Figure 18:
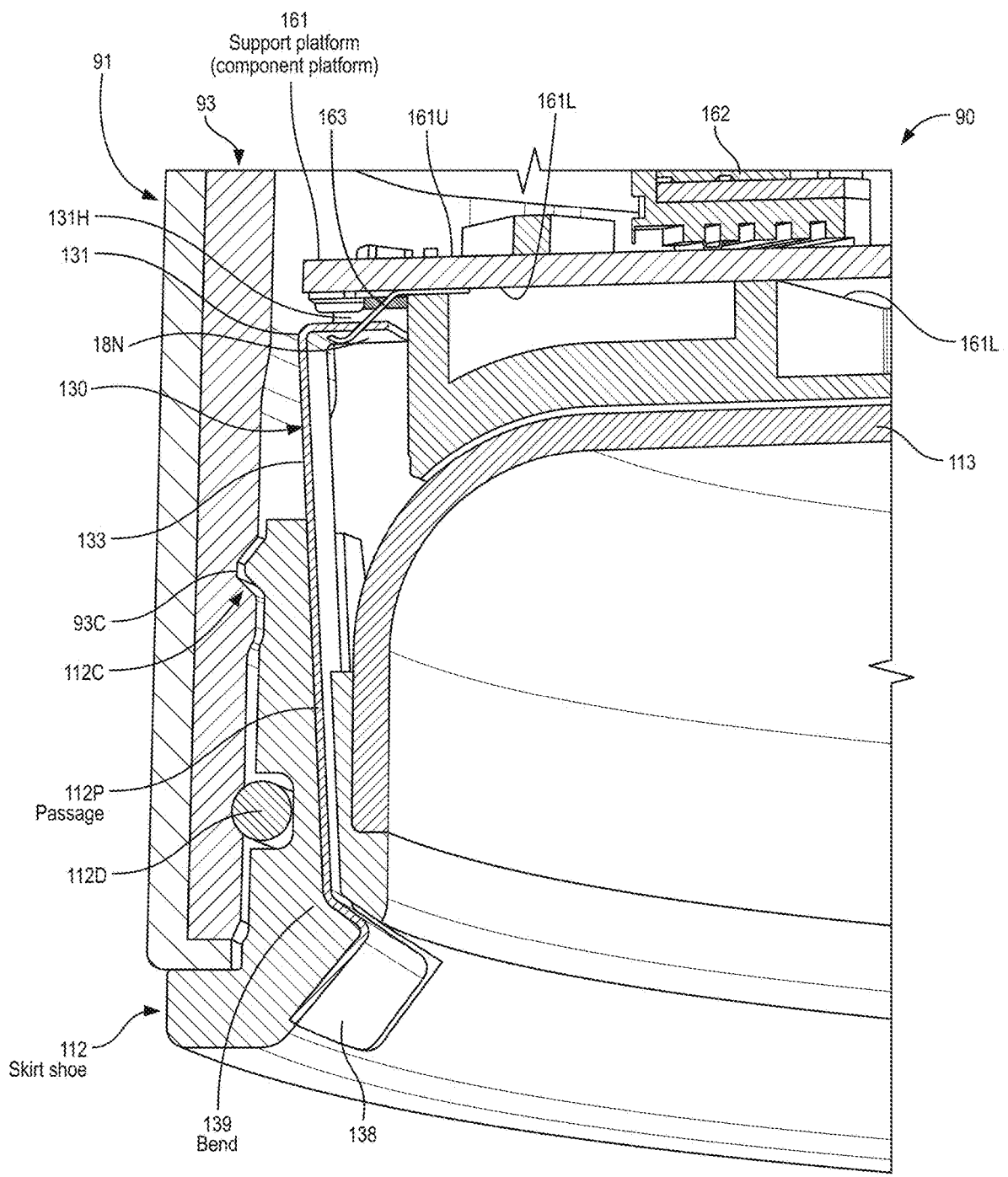
FIG. 18 is a portional cross-sectional side view of a lower portion of a beverage apparatus similar to the beverage apparatus 10 of FIG. 9, according to principles of the disclosure.

Relatedly, FIG. 18 is a portional cross-sectional side view of a lower portion of a beverage apparatus similar to the beverage apparatus 10 of FIG. 9, according to principles of the disclosure. As in FIG. 9, a beverage apparatus 10 can include a base assembly 90. The base assembly 90 can include an enclosure casing 91 and enclosure substrate 93. A skirt shoe 112 can be secured onto the enclosure casing 91, the enclosure substrate 93, and other structure of the beverage apparatus 10. The skirt shoe 112 can include locking member 112C, which engages with locking member 93C of the enclosure substrate 93. An O-ring 112D can be positioned between the enclosure casing 91 and the enclosure substrate 93, as in the arrangement of FIG. 9.

The arrangement of FIG. 18 shows features of a connection assembly 130. The connection assembly 130 can provide an electrical pathway between an exterior of the beverage apparatus 10 and the component platform 161 or support platform 161.

Figure 19:
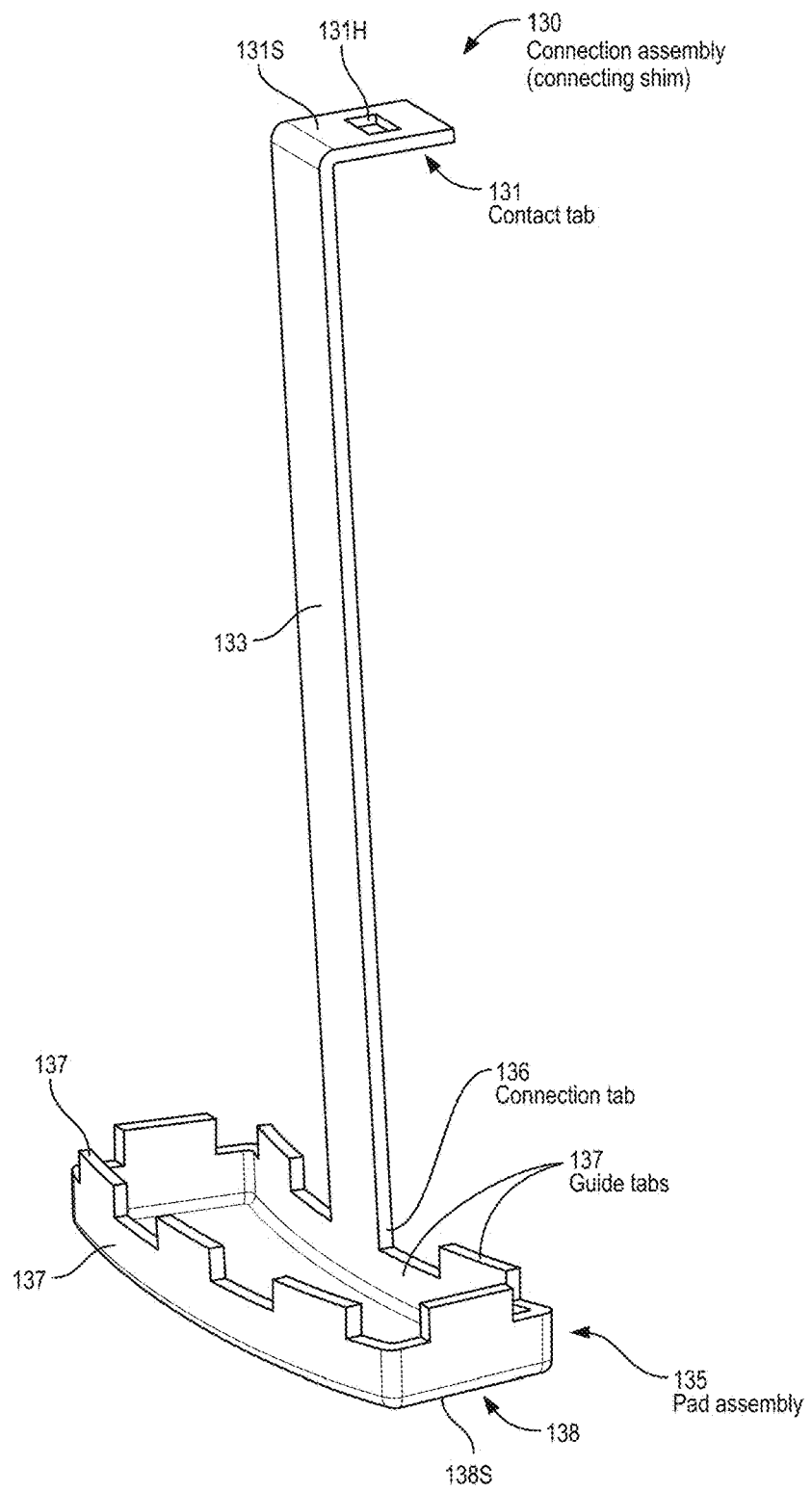
FIG. 19 is a perspective view of a connection assembly 130, according to principles of the disclosure.
Figure 20:
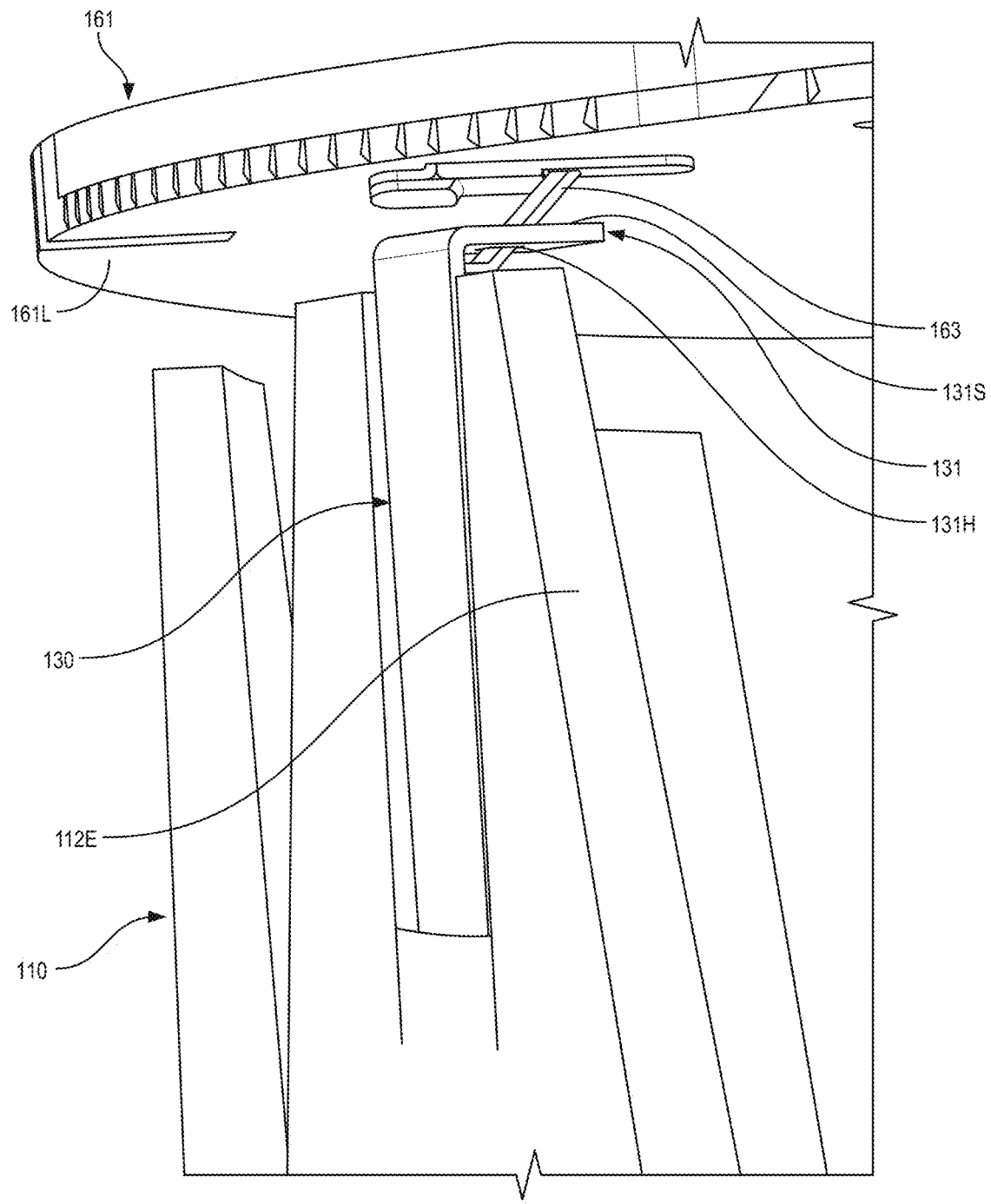
FIG. 20 is a portional perspective view of connection assembly 130 positioned within a skirt shoe 112 in combination with component platform 161, according to principles of the disclosure.
Figure 21:
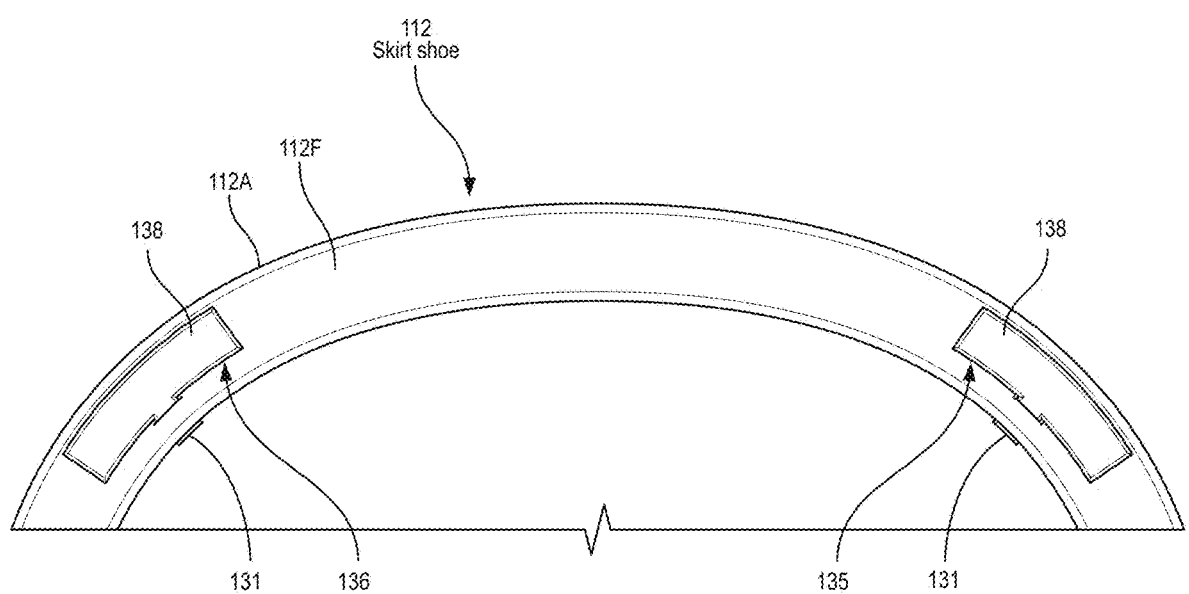
FIG. 21 is a bottom view of skirt shoe 112 with connection assembly 130, according to principles of the disclosure.

Related to FIG. 18, FIG. 19 is a perspective view of a connection assembly 130, according to principles of the disclosure. The connection assembly 130 can also be described as a connecting shim or connection shim 130. FIG. 20 is a portional perspective view of the connecting shim 130 positioned within a skirt shoe 112 in combination with component platform 161. FIG. 21 is a bottom view of skirt shoe 112 with connection assembly 130. Also, FIG. 22 is a further portional perspective view of the connecting shim 130 positioned within a skirt shoe 112 in combination with component platform 161.

As shown in FIG. 19, the connection assembly 130 can provide electrical connection from the contact plate, charge plate, or contact 138 up to a contact tab 131, or vice versa. The contact plate 138 can include a contact surface 138S. The contact tab 131 can include a contact surface 131S. As noted at 18N in FIG. 18, the contact tab 131 can include a hole, opening or aperture 131H, and a portion of the spring finger 163 can pass through the hole 131H in conjunction with resting on or being biased on the contact surface 138S. Such arrangement can provide effective electrical contact between the connection assembly 130 and the spring finger 163, and accommodate for structural variations in shape and position of the connection assembly 130 and the spring finger 163, as well as structural variations with other connected and/or supporting electrical components. The contact plate 138 can be part of a pad assembly 135. The pad assembly 135 can be constructed so as to be in the form of a box, which is open at the top. The pad assembly 135 can include sides. The sides can be terminated at an upper end with guide tabs 137. The guide tabs 137 can engage with an opening or openings in the skirt shoe 112. That is, the pad assembly 135 can be received into the skirt shoe 112 as shown in FIG. 22, for example. A plurality of the connection assemblies 130 can constitute at least part of a charging assembly 130CA, as illustrated in FIGS. 28-41, for example. Such connection assemblies can be described as a first, second, third, fourth, etc. connection assembly. The pad assembly 135 can include a connection tab 136 that connects to the connecting rod 133, as shown in FIG. 19.

The pad assembly 135 can be connected to the contact tab 131 by a connecting rod, shaft, or pole 133, i.e. a connecting portion 133. As shown in FIG. 19, for example, the connecting rod 133 can be a flattened piece or strip of metal, for example. The structure of the connection assembly 130 can be constructed of flattened metal that is formed into the shape shown or other desired shape. Any of a wide variety of conducting metals can be utilized, such as copper, silver, aluminum, and stainless steel. The connecting rod 133 passes up through the skirt shoe 112 so as to physically extend from the chamfer 112F, of the skirt shoe 112, up through the skirt shoe 112 and provide contact to the component platform 161, as shown in FIG. 18.

Figure 22:
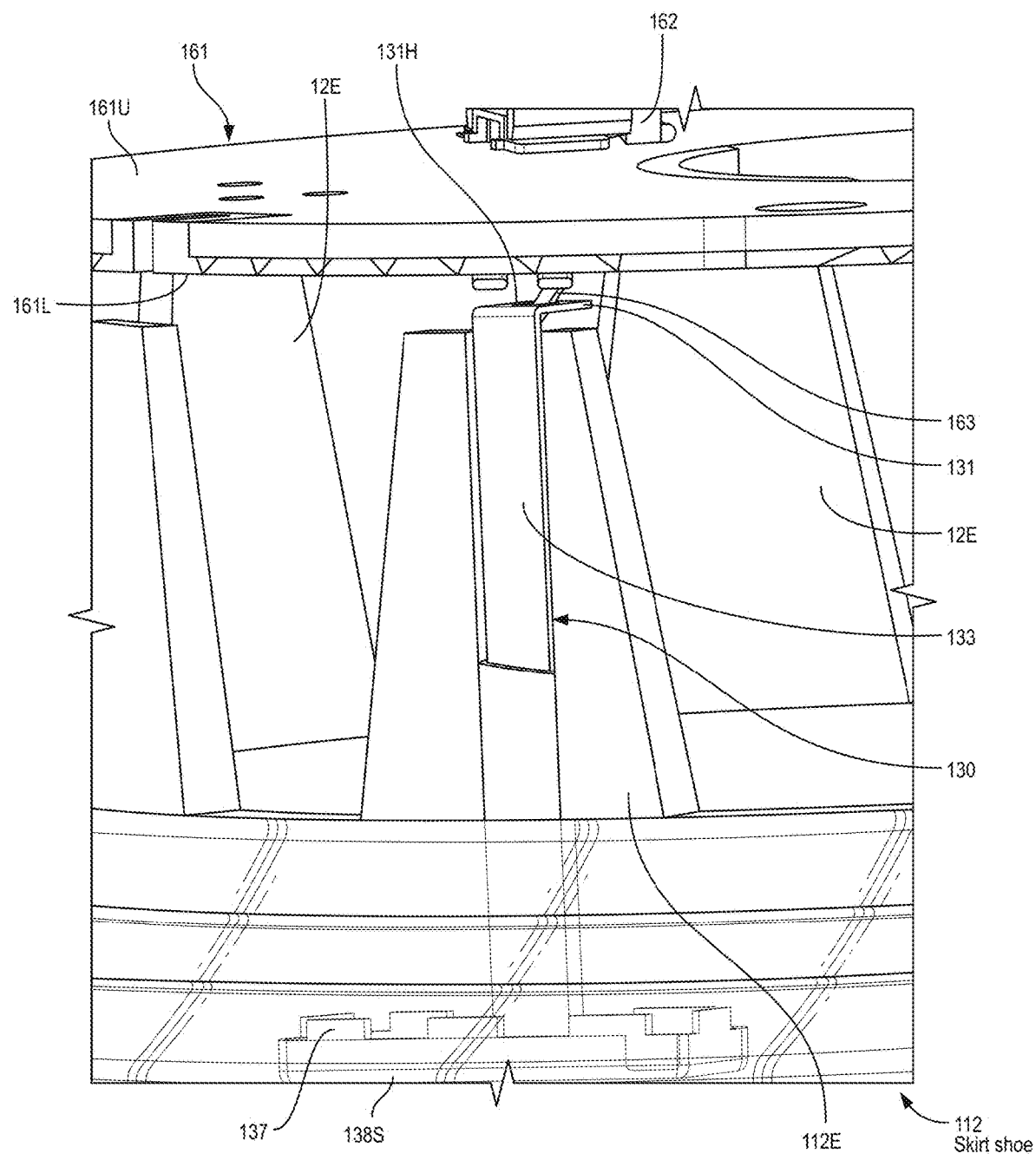
FIG. 22 is a further portional perspective view of the connection assembly 130 positioned within a skirt shoe 112 in combination with component platform 161, according to principles of the disclosure.

The pad assembly 135 can be dimensioned so as to be received into an aperture of the skirt shoe 112 as shown in FIG. 18, FIG. 21, and FIG. 22. In some embodiments, the pad assembly 135 can simply be a flat piece of metal that forms the contact plate 138. As shown in FIG. 18 and FIG. 19, the contact plate 138 can be positioned at an angle so as to match an angle of the chamfer 112F. The angle can be varied to match with angle of the chamfer 112F of skirt shoe 112. The connecting rod 133 can include a bend 139 and other bends as desired. The connecting rod 133 can include an upper portion above the bend 139 and a lower portion below the bend 139. The skirt shoe 112 can include a passage 112P. The connecting rod 133 can pass through the passage 112P.

Figure 27:
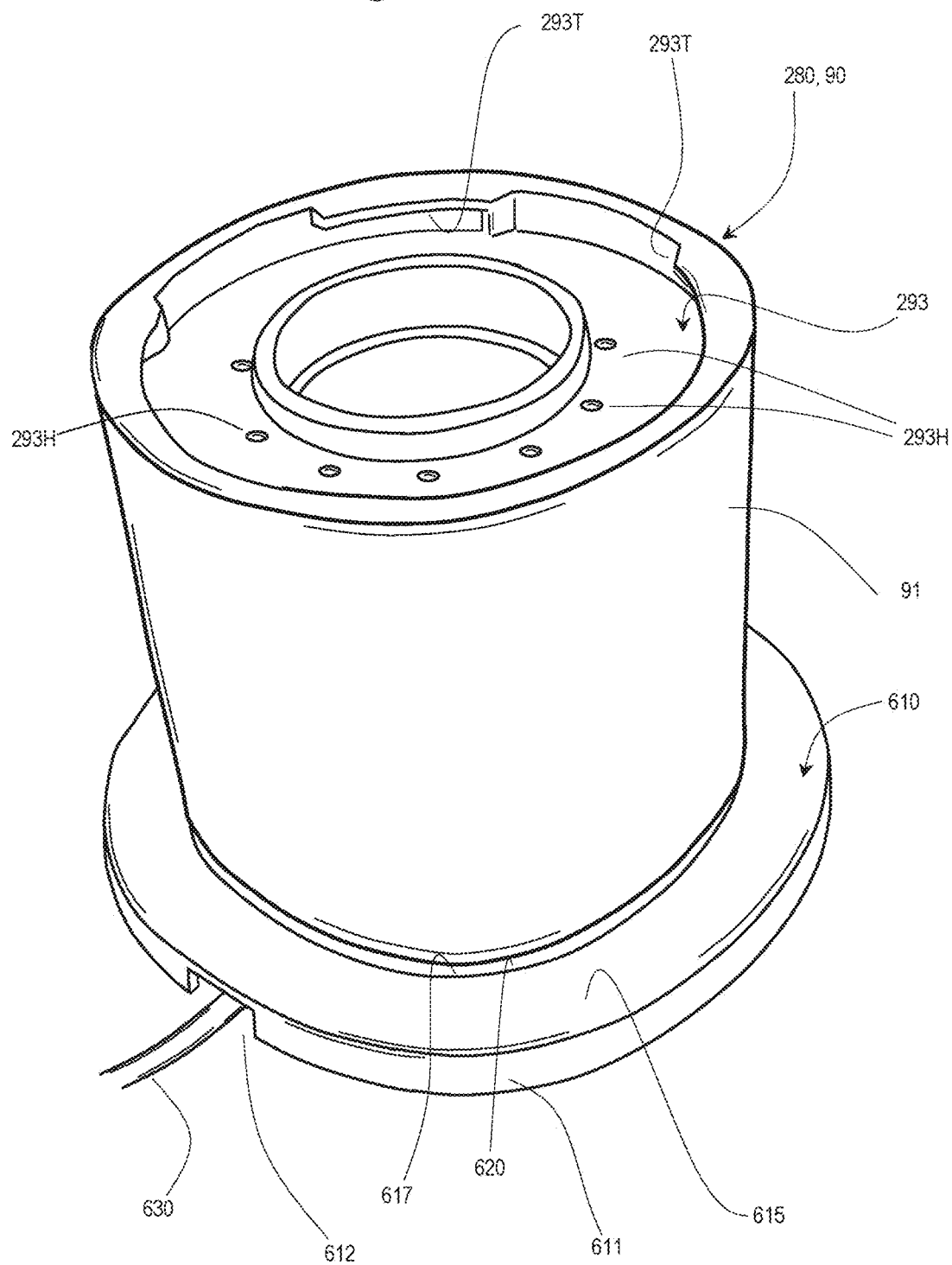
FIG. 27 is a top perspective view of a base 610 in combination with a base assembly 90, according to principles of the disclosure.

As described above, the connection assembly 130 can include a contact tab 131 at an upper end of the connection assembly 130. The contact tab 131 can engage with a spring finger 163. The spring finger 163 can be attached to or integrated with the component platform 161. The spring finger 163 can extend downwardly from a lower surface 161L of the component platform 161. The spring finger 163 and/or the contact tab 131 can be flexible in nature. The spring finger 163 and/or the contact tab 131 can include a flexible member or portion attached thereto. Such flexible member or portion can ensure flexibility and, as result, a good electrical connection between the spring finger 163 and the contact tab 131. The elements 163, 131 can be provided with a hole or aperture so as to provide electrical connection. FIG. 23 is a perspective cross-sectional view of a beverage apparatus 10, according to principles of the disclosure. FIGS. 24 and 27 are related to FIG. 23. FIG. 24 is a cutaway cross-sectional view of a beverage apparatus 10 the same as or similar to the beverage apparatus 10 of FIG. 23. Portions of the construct of the beverage apparatus 10 of FIG. 23 can be similar to construct of the beverage apparatus of FIG. 2. However, in this embodiment of FIG. 23 and FIG. 24, portions of the construct are different, so as to provide a receptacle assembly 241 of different structure than the receptacle assembly 41. In the arrangement of FIG. 2, the outer receptacle member 50 was shown as integrated with the enclosure substrate 93. In the arrangement of FIG. 23, the outer receptacle member 50 can be a separate structure. More specifically, the outer receptacle member 50 can include an attachment collar 259. A base middle assembly, which can be described as a base housing, housing or enclosure substrate, 280 can be disposed interior of an enclosure casing 91. The base housing 280 can include a support flange 293. The support flange 293 can include a plurality of holes or apertures 293H. The attachment collar 259 can include a plurality of holes or bores 259H. A plurality of fasteners 294 can be provided to pass through each of the holes 293H into a corresponding bore 259H. The bores 259H can be threaded so as to threadably receive a corresponding fastener 294. The support flange 293 can include a plurality of fastener head recesses. The structure of FIGS. 23 and 24 can also vary from the structure of FIG. 2 with regard to connection of the chamber housing 20. The chamber housing 20 can define a chamber 25. In the arrangement of FIG. 23, the chamber housing 20 can include a body 21, a shoulder 225, and a lower neck or neck 222. The lower neck 222 can be circular or annular in shape so as to screw onto the base housing 280. That is, the base housing 280 can be provided with threads or other attachment element 293T. The lower neck 222 can be provided with threads or other attachment element 223. Using threads 223, the chamber housing 20 can be screwed onto threads 293T. The lower neck 222 can be provided with an interior or inner diameter surface that engages with an outer diameter surface of the attachment collar 259. The outer diameter surface of the attachment collar 259 (or inner diameter of the lower neck) can be provided with a groove 258 that houses a vessel gasket or outboard gasket 229. Such gasket 229 can provide a seal between the inner diameter of the lower neck 222 and the outer diameter of the attachment collar 259. As shown in FIG. 23, the arrangement can also include a base gasket or enclosure gasket 228. Such base gasket 228 can provide a seal and cushion so as to effectively "seat" the attachment collar 259 onto the support flange 293, as well as to effectively seat a lower edge of the lower neck 222.

FIG. 24 shows further details of the base housing 280 of the beverage apparatus 10. The base housing 280 can be formed of injection molded plastic. As shown in FIG. 24, the base housing 280 can be hollow so as to form an internal cavity and so as to accommodate the various internal components of the beverage apparatus 10. Connection components or supports can be provided so as to connect to internal components, such as connection component 280CC. The internal cavity of the base housing 280 can include an upper, inner corner 283, as shown in FIG. 24. FIG. 24 shows a plurality of the holes 293H. The holes 293H can be countersunk or counterbored so as to receive a head of a corresponding fastener 294. The interior surface of the base housing 280 can include a plurality of reinforcing ribs 281, i.e. inner reinforcing ribs. The base housing 280 can also form a part of or accommodate the USB port assembly 168. As shown schematically in FIG. 23, the base housing 280 can also include a dispensing assembly 40 that includes a drive assembly 70. The drive assembly 70 can drive the inner receptacle member 60 up and down, i.e. provide reciprocation to the inner receptacle member 60. Such reciprocation can provide a dispense event as otherwise described herein. The drive assembly 70 can include motor 71 and a gear train 72, which can be mounted on a support plate or structure 299 as shown in FIG. 23. The support plate or structure 299 can be attached to the support flange 293, for example.

Figure 25:
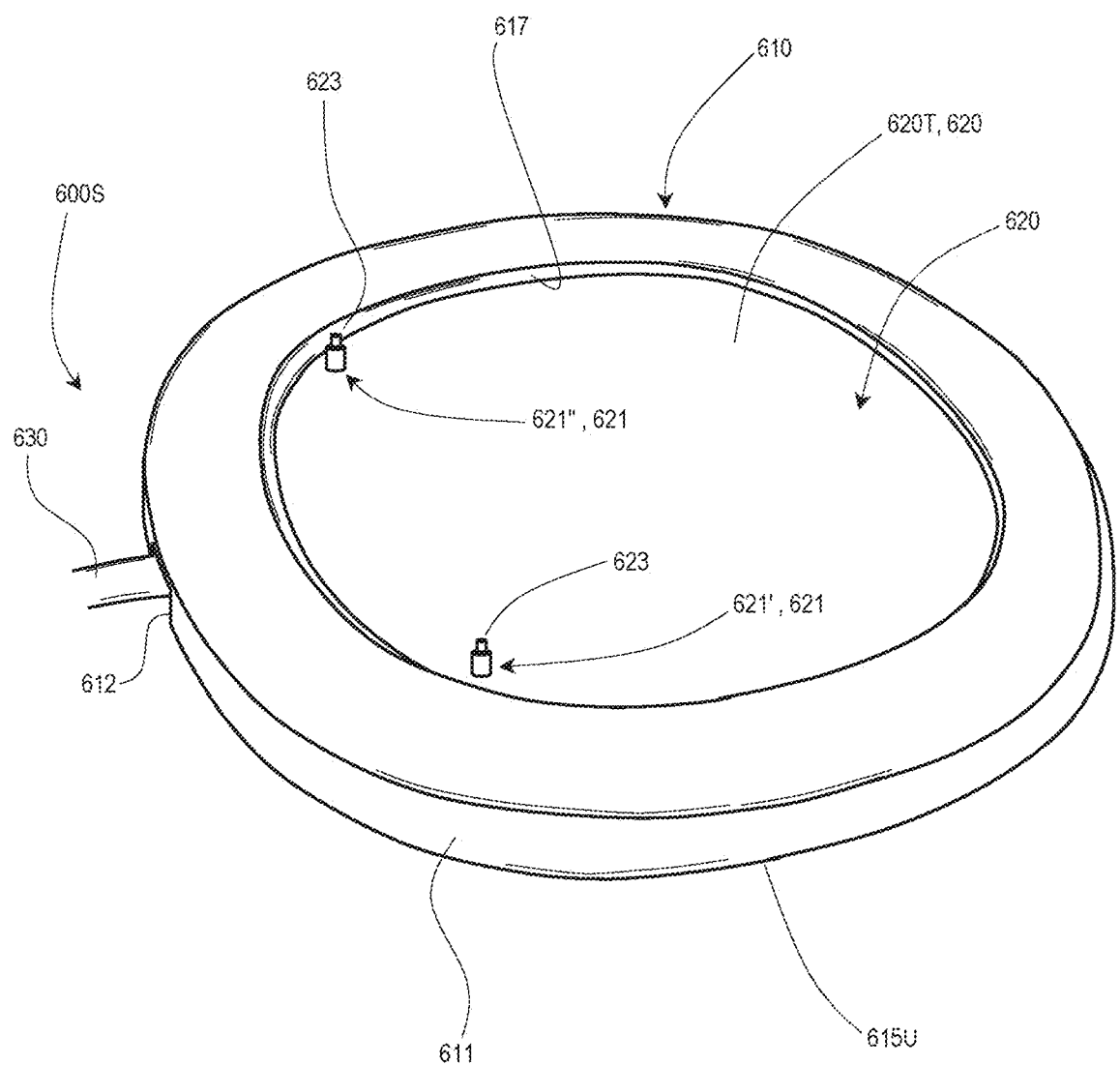
FIG. 25 is a top perspective view of a charge base 610, according to principles of the disclosure.

Hereinafter, various features of a charge system, charge station or charging station 600S will be described. The charge station or system 600S can include a charging base or charge base 610, as well as wires or other attachments or accoutrements that accompany the charge base 610 (such as wires 630). Features of the charge base 610 are described above with reference to FIG. 17. In further description of the charge base 610, FIG. 25 is a perspective view of a charge base 610, according to principles of the disclosure. Further, FIG. 26 is a bottom perspective view of a charge base the same as or similar to the charge base 610 of FIG. 25.

As shown in FIG. 25, the charge base 610 includes a bottle pad 620. The bottle pad 620 can include a pad top surface 620T. The bottle pad 620 can be surrounded by a pad wall 617. The pad wall 617 can be a short wall or ridge that surrounds and defines the bottle pad 620. An outer platform 615 can be outboard of the bottle pad 620. The outer platform 615 can be annular and surround the bottle pad 620. The outer platform 615 can be raised relative to the bottle pad 620.

Figure 26:
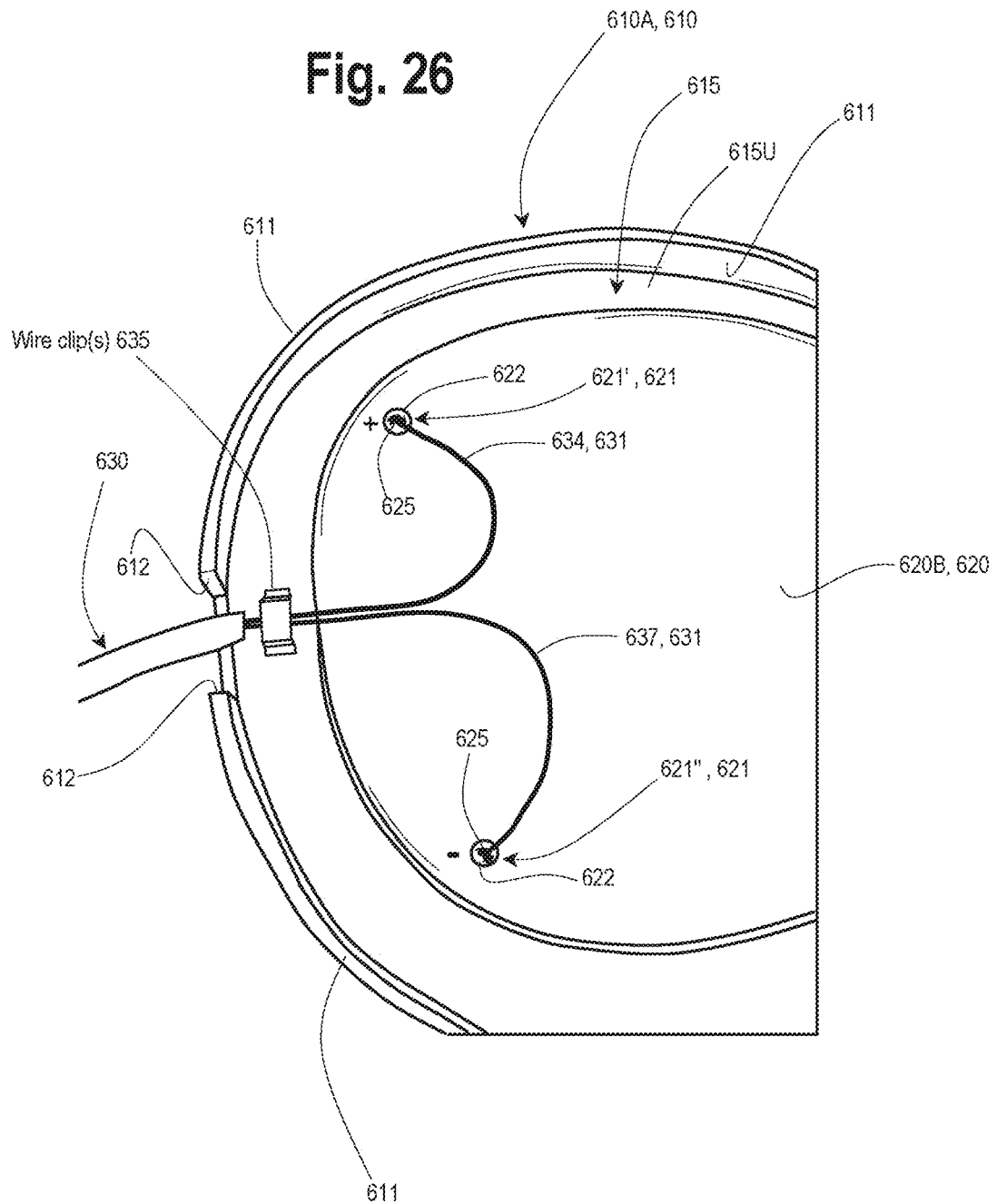
FIG. 26 is a bottom perspective view of a charge base the same as or similar to the charge base 610 of FIG. 25, according to principles of the disclosure.

As shown in FIG. 26, the bottle pad 620 can include a pad bottom surface 620B. The outer platform 615 can include an outer platform bottom surface or underside 615U. The underside 615U of the outer platform 615 can surround the bottle pad 620. The base 610 can include an outer wall 611. The outer wall 611 can include a vertical wall. The outer wall 611 can be attached to an outer peripheral edge of the outer platform 615 and extend downward from such outer peripheral edge of the outer platform 615. The outer wall 611 can serve to elevate or raise up both the bottle pad 620 and the outer platform 615.

Accordingly, clearance for wires and other components can be provided underneath the bottle pad 620 and/or the outer platform 615. The outer wall 611 can be provided with a cord opening 612. The cord opening 612 can allow for passage of a wire or electrical cord. The cord opening 612 can be provided in conjunction with structure to support and guide the cords and/or wires.

The base 610 can include a plurality of pins 621. In the embodiment of FIG. 25 and FIG. 26, a pair of pins 621 can be provided. The pins 621 can include a first pin 621' and a second pin 621". Each of the pins 621 can include a bottom portion or pad 622 of the pin. Each of the pins 621 can include a top or tip portion 623 of the pin 621, which can be broken into segments of different diameter. The bottom portion or pad 622 of each pin 621 can be attached to a respective wire 631. For example, the pad 622 of each pin 621 can be attached to a respective wire 631 using a wire pin connection, such as solder 625. Each of the pins 621 can be disposed in suitably sized apertures or holes that extend through the bottle pad 620.

As shown in FIG. 26, the pin 621' can be attached to wire 634. The pin 621" can be attached to wire 637. The wires can be attached to an underside of the base 610 utilizing a wire clip or wire securement mechanism 635 as may be desired. The wires 631 with plastic cover or coating can collectively constitute a base power cord or cord 630, as shown in FIG. 26.

The base 610 is described herein as including pins 621. However, other connection structure can be used, and the disclosure is not limited in particular to a "pin" structure. For example, pads, bent tabs or spring biased tabs could be used on the base 610 so as to provide contact with connection elements on the bottle. Such structure of bent tabs or spring biased tabs could also be used for connection elements on the bottle. FIG. 27 is a top perspective view of a base 610 in combination with a base assembly 90, of a beverage apparatus 10. The base 610 shown in FIG. 27 can be the same as or similar to the base 610 shown in FIGS. 25 and 26. The base assembly 90 can be the same as or similar to the base assembly 90 shown in FIG. 24.

Accordingly, the enclosure substrate or base housing 280 can include threads 293T, which can be in the form of angled flanges. The threads 293T can provide for attachment to a chamber housing 20. FIG. 27 also shows the plurality of holes 293H that can be used for attachment of an outer receptacle member 50 to the base housing or enclosure substrate.

Figure 28:
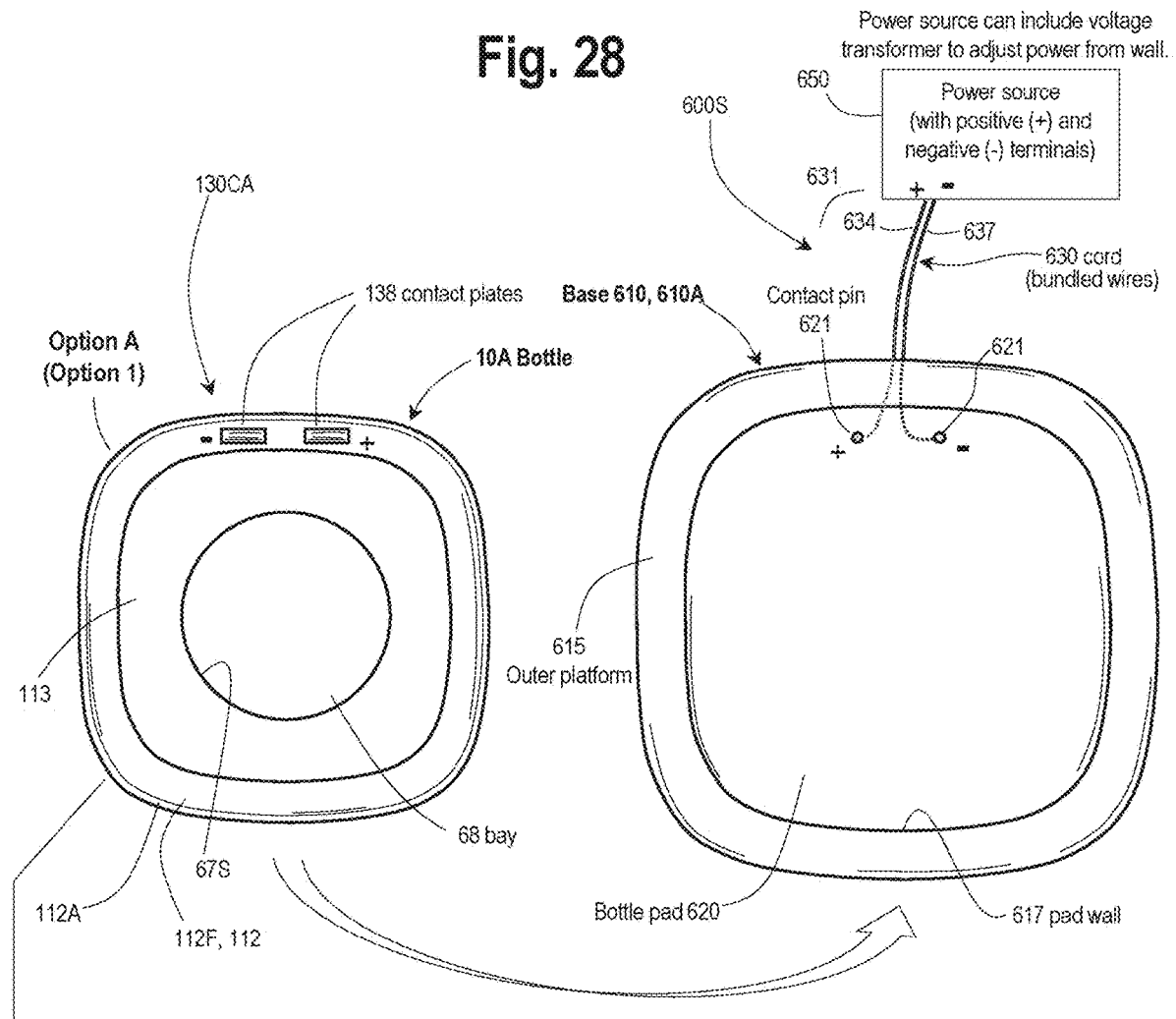
FIG. 28 is a schematic diagram showing an "option A" that includes a particular arrangement of a beverage apparatus or bottle 10A in combination with a base 610A, according to principles of the disclosure.

FIG. 28 is a diagram showing an "option A" that includes a particular arrangement of a beverage apparatus or bottle 10A in combination with a base 610, and specifically a base 610A, according to principles of the disclosure. The beverage apparatus 10A can include a skirt 113. The beverage apparatus 10A can include skirt shoe 112 with the lower attachment flange 112A and lower attachment chamfer 112F, as is also shown in FIG. 9. The assembly 10A can include a bay inner surface 67S that can define a bay 68. The bay 68 can receive a pod 700, and the skirt shoe 112 can support the skirt 113, as otherwise described herein. The bottle or beverage apparatus 10A can be the same as or similar to the beverage apparatus 10 of FIG. 18, for example.

As shown in FIG. 28, the base 610A can include structure that is similar to the construct shown in FIGS. 25 and 26. The base 610A can include contact pins 621 that are similar in structure to the contact pins 621 of FIGS. 25 and 26. However, in the arrangement of FIG. 28, the arrangement of the contact pins 621 are varied.

To explain further, in the "option A" or option 1 shown in FIG. 28, the beverage apparatus or bottle 10A can include two contact plates 138. In a corresponding manner, the base 610A can include two contact pins 621. The bottle 10A can be flipped over (and positioned on the base 610A) such that each of the contact plates 138 are positioned upon a respective contact pin 621. The base 610A can be provided with electrical power via the cord 630. The cord 630 can include wires 631. The wires 631 can include wires 634 and 637, which can be positive and negative polarity, for example. The electrical power can flow from a power source 650. The electrical power can be conducted to contact pins 621. Upon the contact pins 621 making contact with a respective contact plate 138, the contact plates 138 can be energized. In turn, the connection assembly 130 (of each contact plate 138) can be connected to appropriate contacts, for example spring fingers 163, that are associated with the component platform 161. As a result, the component platform 161 can be energized. The controller 160 can then use such energy to power the various components of the beverage apparatus, such as charging one or more batteries 164 and/or energizing the controller 160 and other components to perform operations of the beverage apparatus. The arrangement of FIG. 28 provides advantages such as relative simplicity in construction. However, with the arrangement of FIG. 28, a user must orient the bottle 10A in a corresponding orientation such that the contact plates 138 align with the contact pins 621. As described above, the bottle 10A and the base 610A can be of a "squircle" shape, i.e. a shape that is a combination of a square and a circle. Such squircle shape can be advantageous in that positioning of the bottle upon the base is limited to four possible orientations. Such is in contrast to a circle shape, in which positioning of the bottle upon the base is not limited. That is, with a circle shape, the bottle could be rotated upon the base to innumerable positions. Accordingly, the squircle can be helpful in aligning contact plates 138 with contact pins 621. As reflected at 2800 in FIG. 28, in FIGS. 28-35 and 39, the bottle and/or base polarity (+ or −) is provided for purposes of illustration and to show illustrative relative current flow. In the base 610, in FIGS. 28-35 and 39, internal wires between contacts 621 and cord 630 are shown in phantom. Wires can be soldered, bonded, rolled, crimped, clipped, or otherwise connected to each other.

FIG. 28 shows one illustrative arrangement of contact plates 138 of a bottle in conjunction with a particular arrangement of contact pins 621 of a base 610A. Hereinafter, further illustrative arrangements will be described.

As shown in FIG. 28, power source 650 can be provided with a positive terminal and a negative terminal. In an embodiment, the power source 650 can be a battery. In another embodiment, the power source 650 can be an adapter or converter to convert AC power into DC power. For example, the power source 650 might convert a 120 volt AC wall current, i.e. from a wall outlet, to 5 volt output being output from the power source 650 out to the base 610. Any of a wide variety of power sources 650 an be utilized so long as the provided power can be usable by the beverage apparatus 10 and/or can be converted to usable power. The base 610 in combination with the power source 650 can be described as a charging system or charging station 600S.

Figure 29:
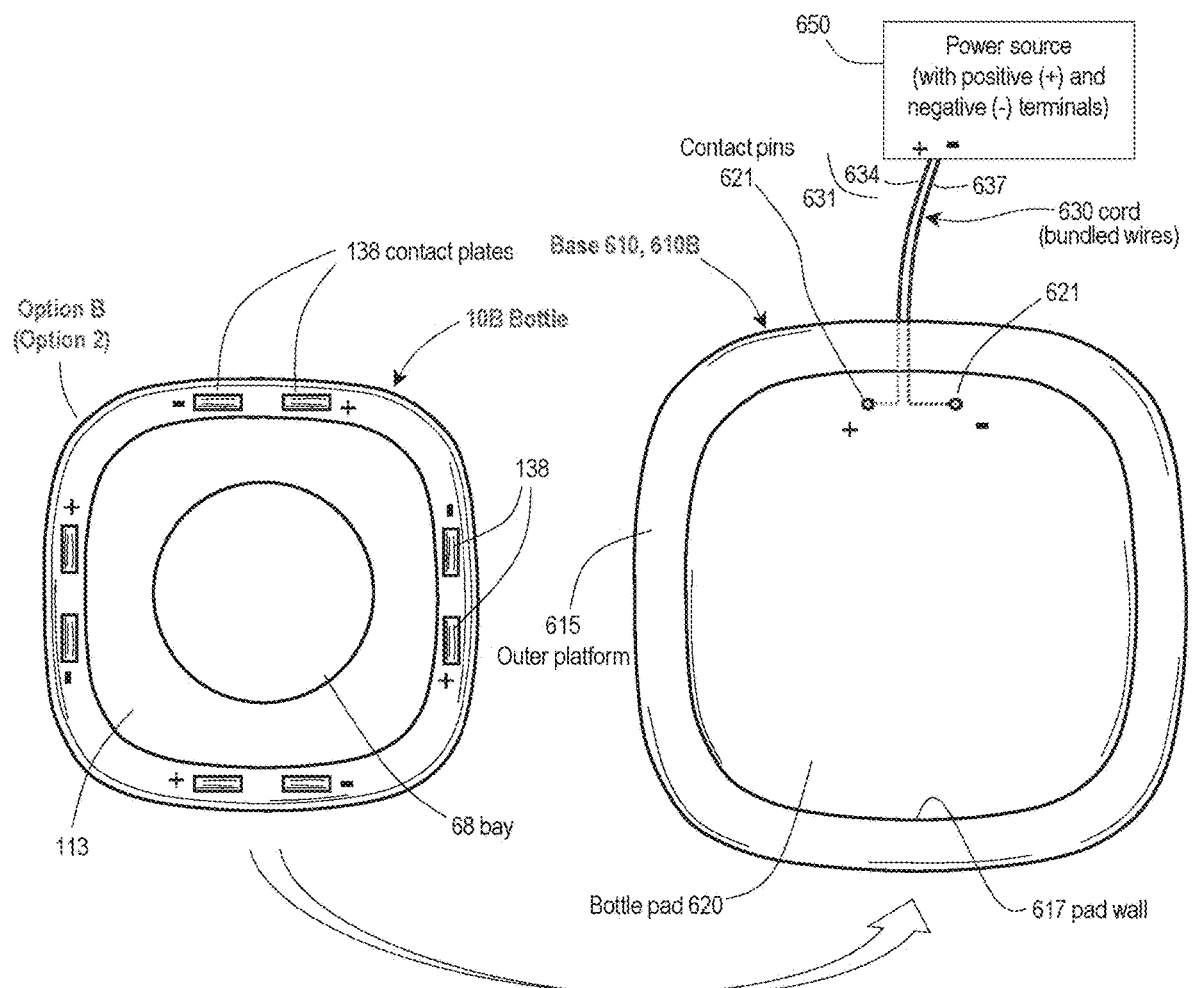
FIG. 29 is a schematic diagram showing an "option B" (or option 2) that includes a particular arrangement of a beverage apparatus 10B in combination with a base 610B, according to principles of the disclosure.

FIG. 29 is a diagram showing an "option B" (or option 2) that includes a particular arrangement of a beverage apparatus 10B in combination with a base 610B, according to principles of the disclosure. In the arrangement of FIG. 29, the beverage apparatus 10B and the base 610B can be of similar construct to that of FIG. 28. However, in contrast to the arrangement of FIG. 28, the bottle or beverage apparatus 10B can be provided with contact plates 138 on each side of the bottle 10B. That is, each side (of the squircle shape) of the beverage apparatus 10 can be provided with a pair of contact plates 138. As shown, in each set, one of the contact plates 138 can be positive and the other contact plate 138 can be negative.

As shown in FIG. 29, the base 610B can include a pair of positive and negative contact pins 621. The contact pins 621 can be connected to first wire 634 and second wire 637 (such wires shown in phantom), positive and negative respectively, that constitute the cord 630.

The arrangement of FIG. 29 provides an advantage that regardless of the four possible positions the bottle 10B can be placed upon the base 610B (due to the squircle shape), one of the pairs of contact plates 138 will necessarily match up with the pair of contact pins 621. Accordingly, while the arrangement of FIG. 29 adds complexity to construction of the bottle 10B, such arrangement can enhance user experience, in that the user need not be concerned with orientation of the bottle on the base for charging. In similar manner to FIG. 28, the base 610B can be connected to a power source 650.

FIG. 30 is a diagram showing an "option C" or option 3 that includes a particular arrangement of a beverage apparatus 10C in combination with a base 610C, according to principles of the disclosure. Similar to that described above, in the base 610C, in FIG. 30, internal wires between contacts 621 and cord 630, i.e. wire 634 or wire 637, are shown in phantom. FIG. 30 shows "legend" 3000 that shows connection symbology as used herein, regarding whether a wire is connected or is not connected.

In the arrangement of FIG. 30, the beverage apparatus 10C and the base 610C can be of similar construct to that of FIG. 28. However, in contrast to the arrangement of FIG. 28, the base 610C can be provided with contact pins 621 on each side of the bottle base 610C. That is, each side (of the squircle shape) of the base 610C can be provided with a pair of contact pins 621. Similar to the arrangement of FIG. 29, the arrangement of FIG. 30 provides an advantage in that regardless of the four possible positions the bottle 10C can be placed upon the base 610C (due to the squircle shape), the contact plates 138 will necessarily match up with one of the pairs of contact pins 621. Accordingly, while the arrangement of FIG. 29 adds complexity to construction of the base 610C, such arrangement can enhance user experience.

Figure 31:
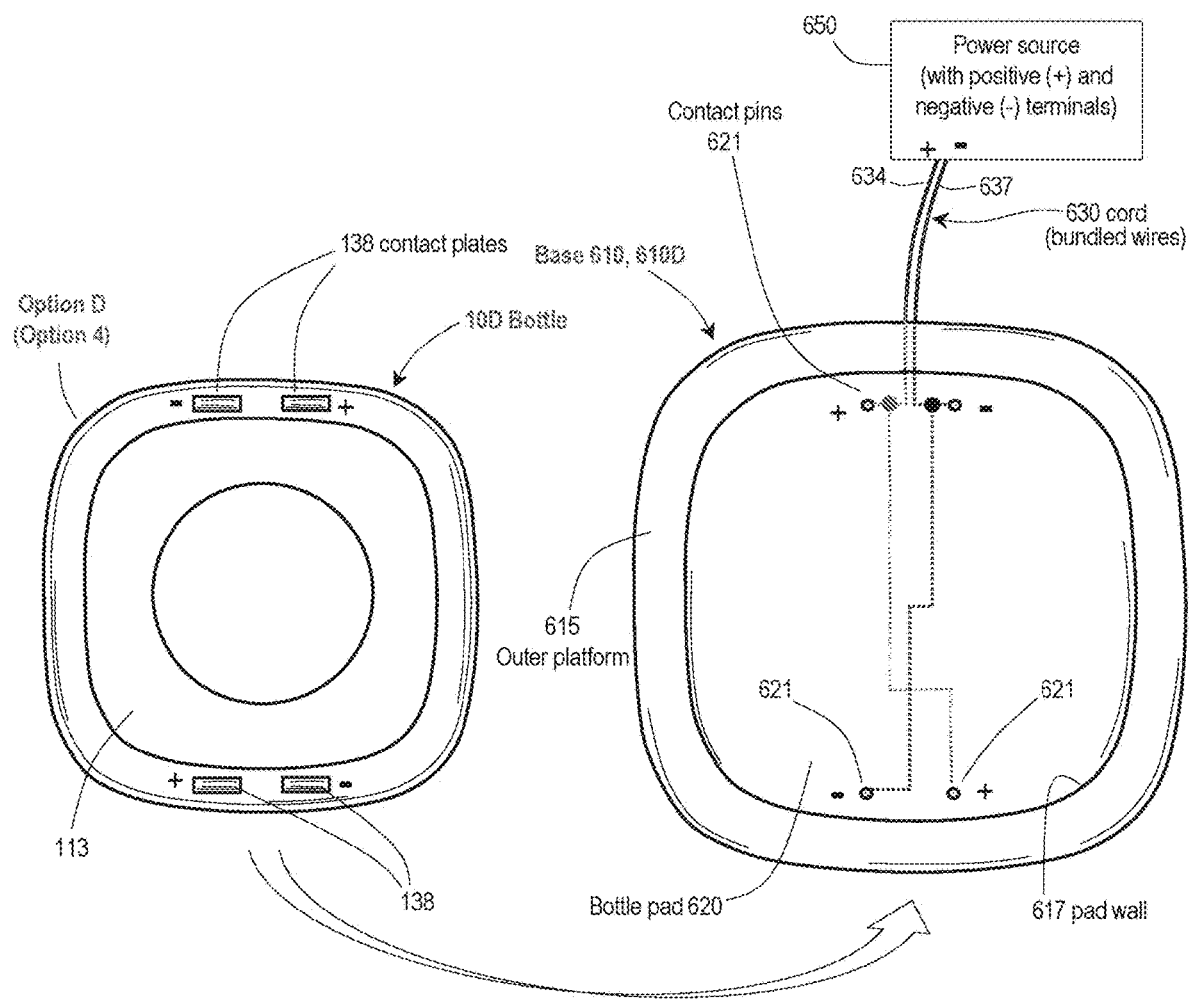
FIG. 31 is a schematic diagram showing an "option D" or option 4 that includes a particular arrangement of a beverage apparatus 10D in combination with a base 610D, according to principles of the disclosure.

FIG. 31 is a diagram showing an "option D" or option 4 that includes a particular arrangement of a beverage apparatus 10D in combination with a base 610D, according to principles of the disclosure. In the arrangement of FIG. 31, the beverage apparatus 10D and the base 610D can be of similar construct to that of FIG. 28. However, in contrast to the arrangement of FIG. 28, the base 610D can be provided with contact pins 621 on opposing sides of the base 610D. That is, opposing sides (of the squircle shape) of the base 610D can be provided with a pair of contact pins 621. Also, contact plates can be provided on opposing sides of the base 610D. The arrangement of FIG. 31 provides an advantage in that the beverage apparatus 10D can be placed in one of two orientations (out of four orientations possible) on the base 610D—to provide for the contact plates 138 to match up with a corresponding pair of contact pins 621.

The duplicity of connection of contact pins 621 to contact plates 138 (of the beverage apparatus 10D) can ensure connection between the beverage apparatus 10D and the base 610D. With each pair of contact pins, one of the pins 621 can be connected to positive power and one of the pins 621 can be connected to negative power.

Figure 32:
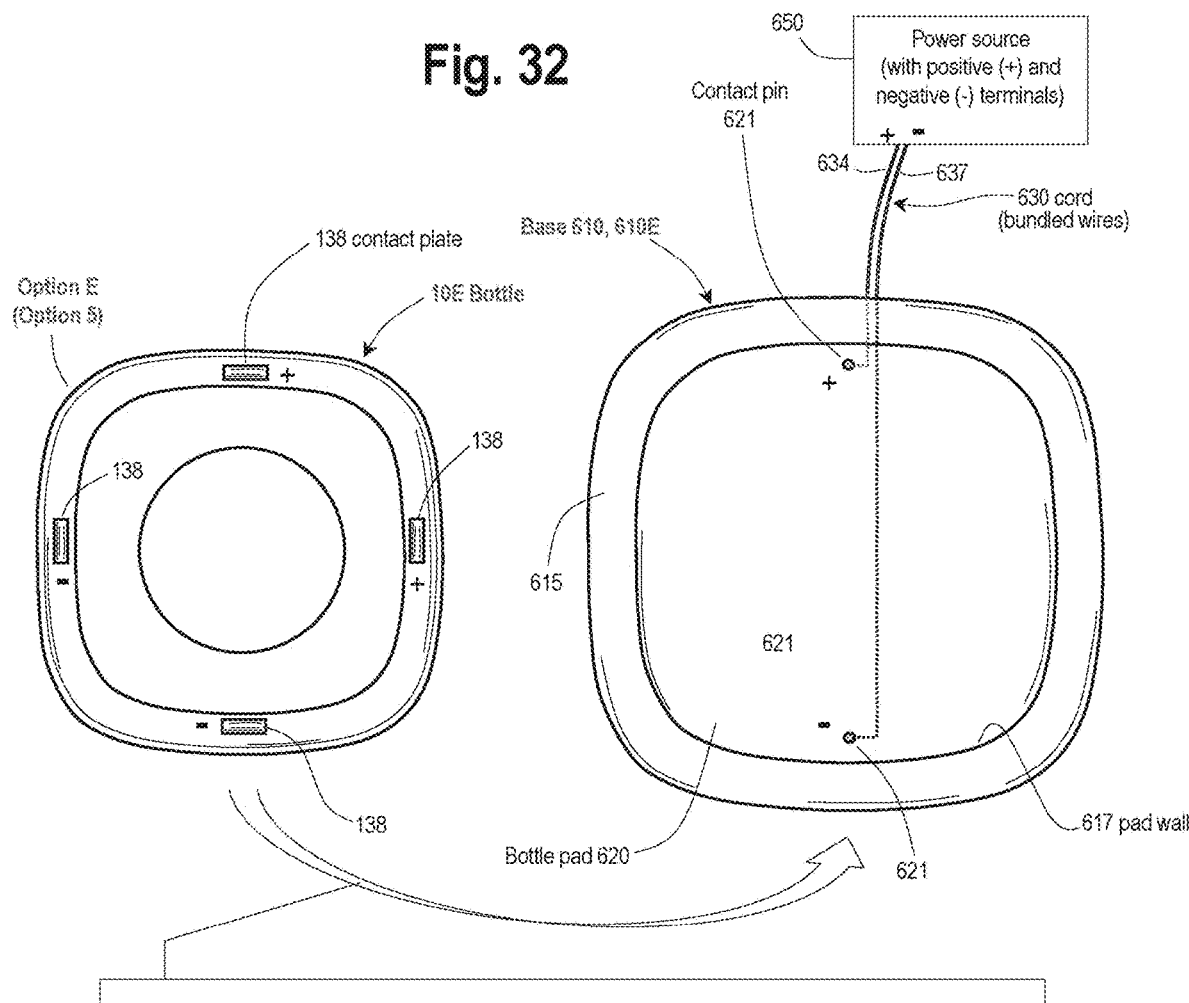
FIG. 32 is a schematic diagram showing an "option E" or option 5 that includes a particular arrangement of a beverage apparatus 10E in combination with a base 610E, according to principles of the disclosure.

FIG. 32 is a diagram showing an "option E" or option 5 that includes a particular arrangement of a beverage apparatus 10E in combination with a base 610E, according to principles of the disclosure. In the arrangement of FIG. 32, the beverage apparatus 10E and the base 610E can be of similar construct to that of FIG. 28. However, in contrast to the arrangement of FIG. 28, the base 610E can be provided with a positive contact pin 621 on one side of the base 610E and a negative contact pin on an opposing side of the base 610E. The bottle 10E can be provided with a respective positive contact 138 at the 12 o'clock and 3 o'clock positions as shown. The bottle 10E can be provided with a respective negative contact 138 at the 6 o'clock and 9 o'clock positions as shown in FIG. 32.

In the arrangement of FIG. 32, the arrangement provides an advantage in that the beverage apparatus 10E can be placed at any of the four possible rotational positions, and with all four of such possible rotational positions, electrical connection can be established between the base 610E and the bottle 10E.

With the arrangement shown in FIG. 32, with two of the rotational positions, a positive plate of the bottle 10E will "match up" with a positive plate of the base 610E, along with a negative plate of the bottle matching up with a negative plate of the base. However, in the two other positions, of the four possible positions, a positive contact plate of the bottle 10E will match up with a negative contact pin of the base 610E, along with a negative contact plate of the bottle 10E will match up with a positive contact pin of the base 610E.

Figure 33:
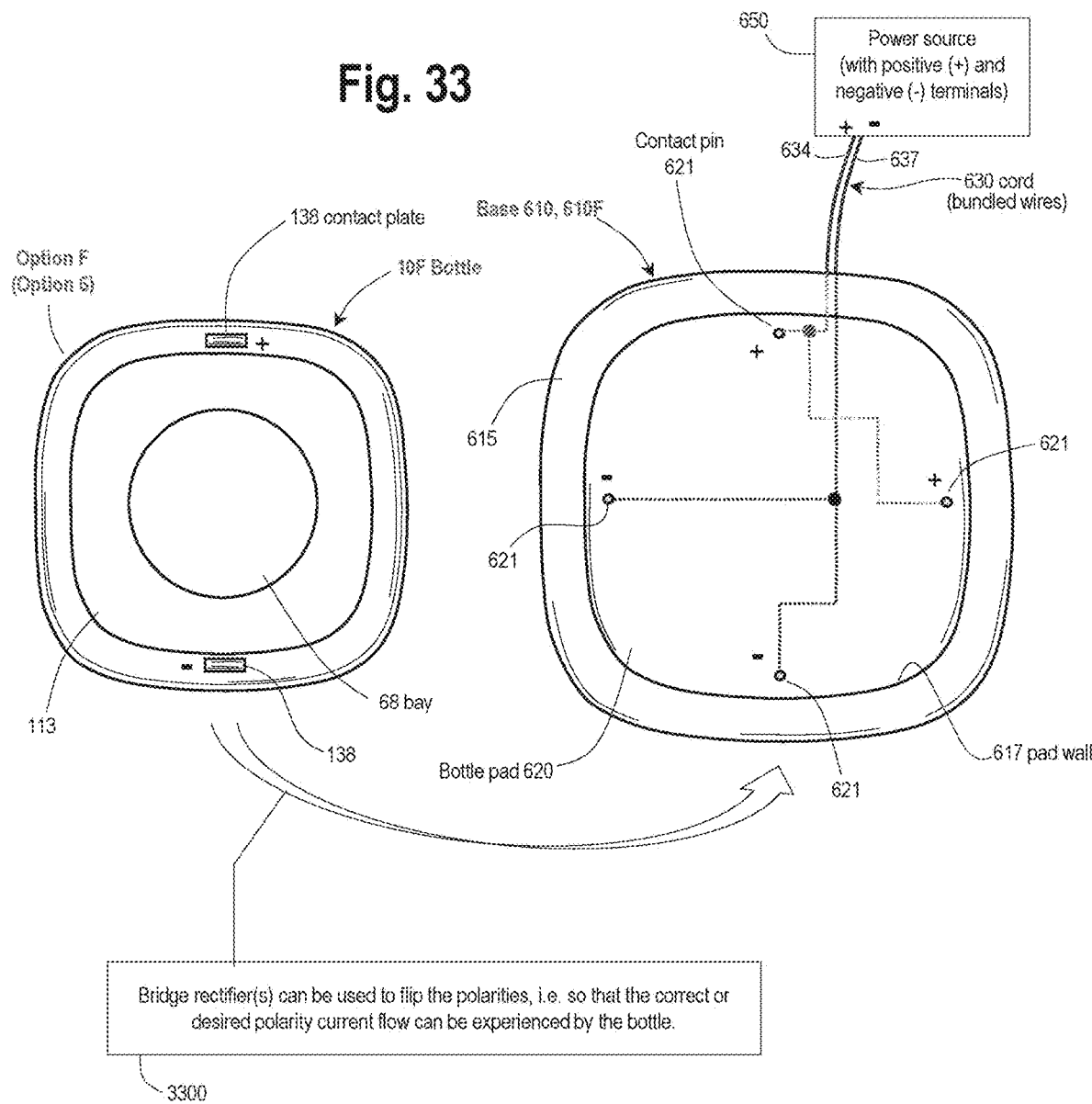
FIG. 33 is a schematic diagram showing an "option F" or option 6 that includes a particular arrangement of a beverage apparatus 10F in combination with a base 610F, according to principles of the disclosure.

Accordingly, as reflected in FIG. 32 at 3200, the arrangement of FIG. 32 presents the possible scenario in which polarities are flipped, i.e. (a) the positive contact plate of the bottle is on the negative pin of the base, AND (b) the negative contact plate of the bottle is on the positive pin of the base. In such scenario, an arrangement with bridge rectifier(s) with diodes can be used to flip or reverse the polarities, i.e. so that the correct polarity current flow can be experienced by the bottle. Further details are described below. FIG. 33 is a diagram showing an "option F" or option 6 that includes a particular arrangement of a beverage apparatus 10F in combination with a base 610F, according to principles of the disclosure. In the arrangement of FIG. 33, the beverage apparatus 10F and the base 610F can be of similar construct to that of FIG. 28. However, in contrast to the arrangement of FIG. 28, the bottle 10F can be provided with a positive contact plate 138 on one side of the bottle 10F and a negative contact plate 138 on an opposing side of the bottle 10F.

As shown in FIG. 33, the base 610F can be provided with a respective positive contact pin 621 at the 12 o'clock and 3 o'clock positions as shown. The base 610F can be provided with a respective negative contact pin 621 at the 6 o'clock and 9 o'clock positions as shown in FIG. 33.

In the arrangement of FIG. 33, the arrangement provides an advantage in that the beverage apparatus 10F can be placed at any of the four possible rotational positions, and with all four of such possible rotational positions, electrical connection can be established between the base 610F and the bottle 10F.

With the arrangement shown in FIG. 33, with two of the rotational positions, a positive plate of the bottle 10F will "match up" with a positive plate of the base 610F, along with a negative plate of the bottle matching up with a negative plate of the base. However, in the two other positions, of the four possible positions, a positive contact plate of the bottle 10F will match up with a negative contact pin of the base 610F, along with a negative contact plate of the bottle 10F being matched with a positive contact pin of the base 610F.

Accordingly, the arrangement of FIG. 33 presents a further possible scenario in which polarities are flipped, i.e. (a) the positive contact plate of the bottle is on the negative pin of the base, AND (b) the negative contact plate of the bottle is on the positive pin of the base. In such scenario, as reflected in FIG. 33 at 3300, bridge rectifier(s) with diodes can be used to flip or reverse the polarities, i.e. so that the correct polarity current flow can be experienced by the bottle.

Figure 34:
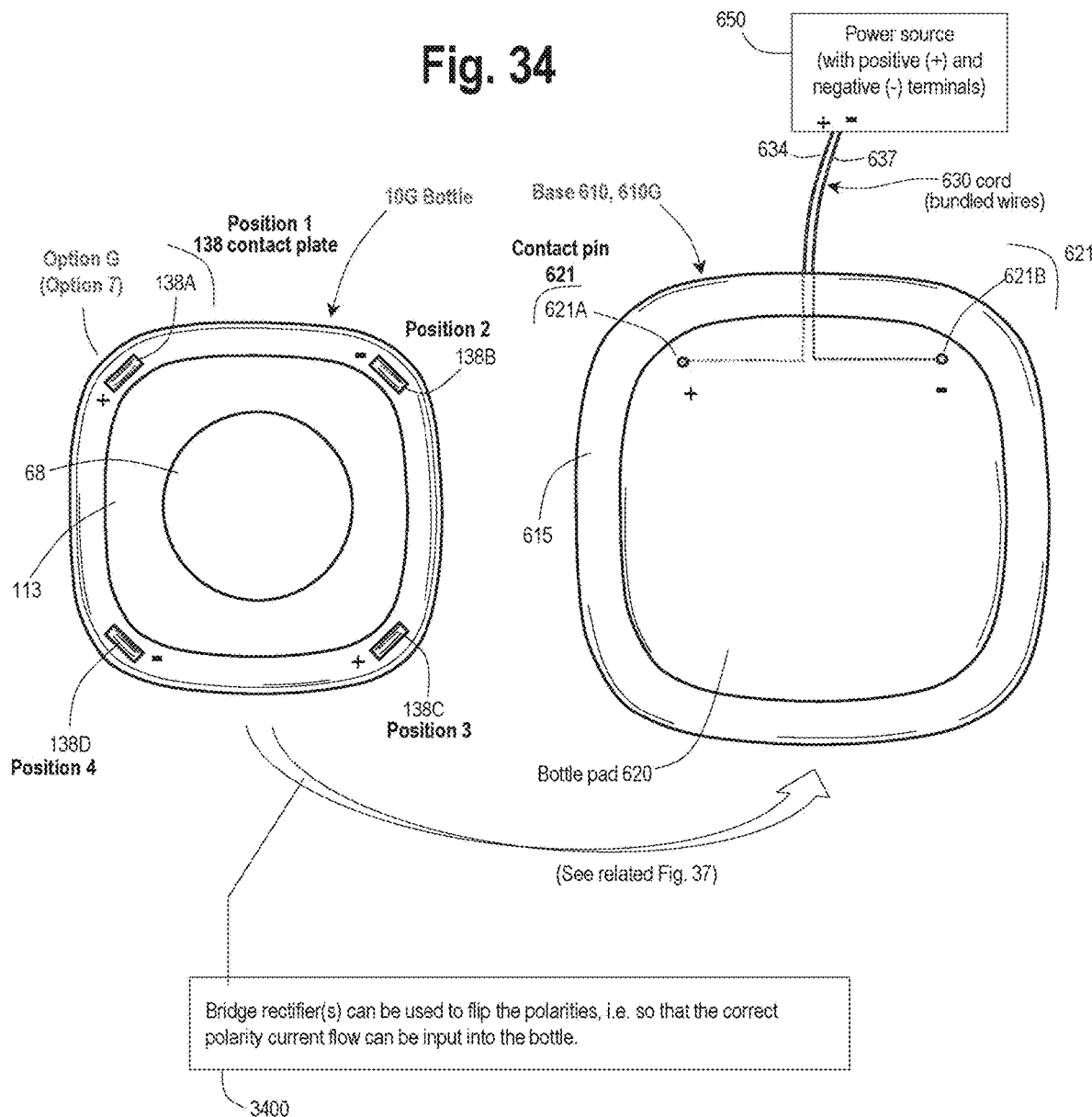
FIG. 34 is a schematic diagram showing an "option G" or option 7 that includes a particular arrangement of a beverage apparatus 10G in combination with a base 610G, according to principles of the disclosure.

FIG. 34 is a diagram showing an "option G" or option 7 that includes a particular arrangement of a beverage apparatus 10G in combination with a base 610G, according to principles of the disclosure. In the arrangement of FIG. 34, the beverage apparatus 10G and the base 610G can be of similar construct to that of FIG. 28. However, in contrast to the arrangement of FIG. 28, the base 610G can be provided with a positive contact pin 621 (i.e. pin 621A) on one corner of the base 610G (the upper left corner) and a negative contact pin 621 (i.e. pin 621B) on or in an adjacent corner of the base 610G (the upper right corner).

The bottle 10G can be provided with a respective positive contact plate 138 at the upper left corner position and the lower right corner position as shown, i.e. contact plates 138A and 138C, respectively. The bottle 10G can be provided with a respective negative contact plate 138 at the upper right corner position and the lower left corner position as shown, i.e. contact plates 138B and 138D, respectively. In the arrangement of FIG. 34, the arrangement provides an advantage that the beverage apparatus 10G can be placed at any of the four possible rotational positions, and with all four of such possible rotational positions, electrical connection can be established between the base 610G and the bottle 10G.

With the arrangement shown in FIG. 34, with two of the rotational positions, a positive plate of the bottle 10G will "match up" with a positive plate of the base 610G, along with a negative plate of the bottle matching up with a negative plate of the base. However, in the two other positions, of the four possible positions, a positive contact plate of the bottle 10G will match up with a negative contact pin of the base 610G, along with a negative contact plate of the bottle 10G will match up with a positive contact pin of the base 610G.

Accordingly, the arrangement of FIG. 34 presents the possible scenario in which polarities are flipped, i.e. (a) the positive contact plate of the bottle is on the negative pin of the base, AND (b) the negative contact plate of the bottle is on the positive pin of the base. In such scenario, as reflected in FIG. 34 at 3400, bridge rectifier(s) with diodes can be used to flip or reverse the polarities, i.e. so that the correct polarity current flow can be experienced by the bottle. Further details are described below with reference to FIG. 37 and FIG. 38 and circuit 840. That is, circuit 840 (in the bottle 10G) can be used so as to adjust polarity of incoming current so as to deliver a desired polarity current to the controller 160.

Figure 35:
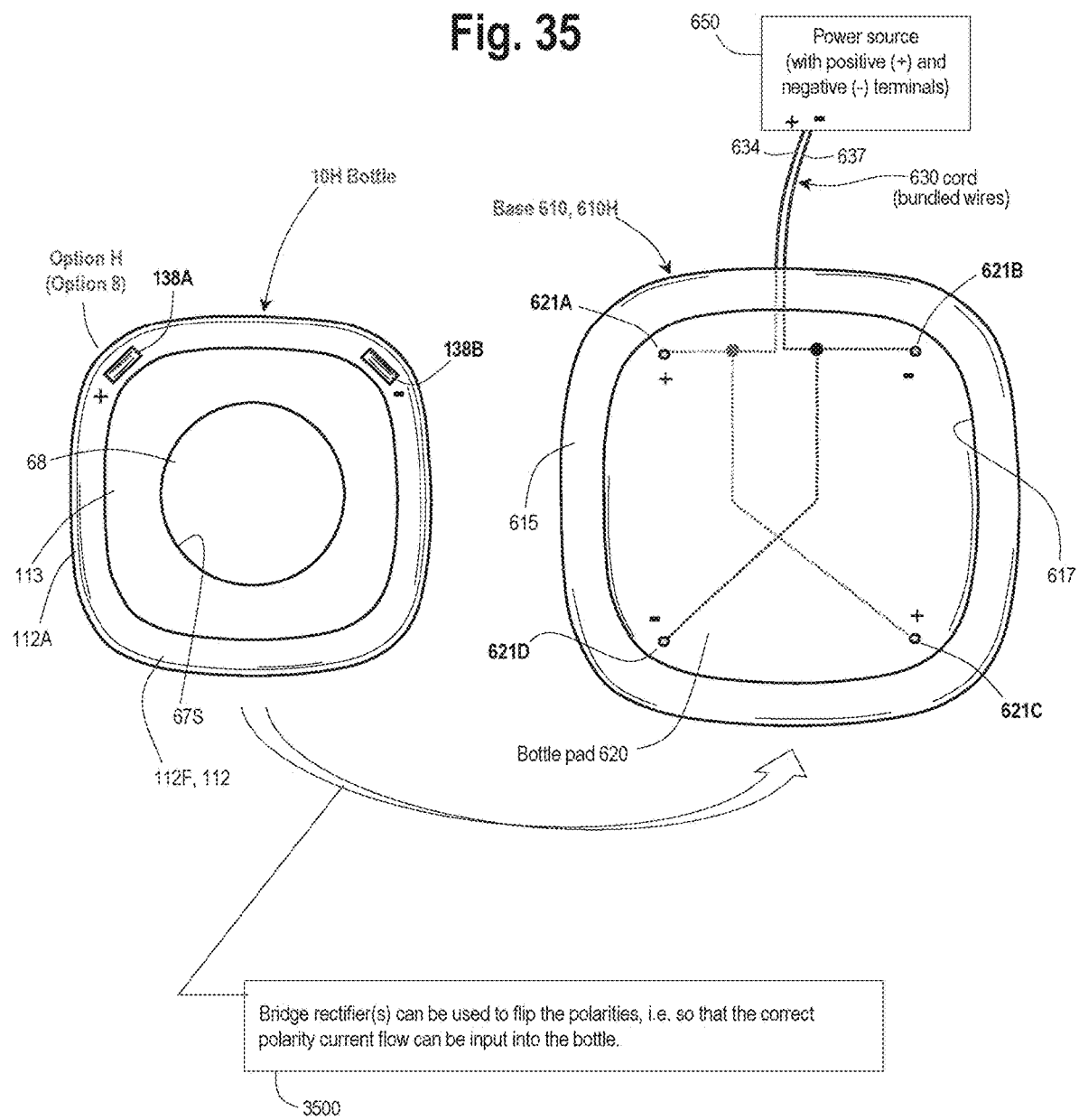
FIG. 35 is a schematic diagram showing an "option H" or option 8 that includes a particular arrangement of a beverage apparatus 10H in combination with a base 610H, according to principles of the disclosure.

FIG. 35 is a schematic diagram showing an "option H" or option 8 that includes a particular arrangement of a beverage apparatus 10H in combination with a base 610H, according to principles of the disclosure. In the arrangement of FIG. 35, the beverage apparatus 10H and the base 610H can be of similar construct to that of FIG. 28. However, in contrast to the arrangement of FIG. 28, the base 610H can be provided with a positive contact pin 621 (i.e. pin 621A) on the upper left corner; a positive contact pin 621 (i.e. pin 621C) on the lower right corner; a negative contact pin 621 (i.e. pin 621B) on the upper right corner; and a negative contact pin 621 (i.e. pin 621D) on the lower left corner.

The bottle 10H can be provided with a positive contact 138, i.e. 138A, at the upper left corner position. The bottle 10H can be provided with a negative contact 138, i.e. 138B at the upper right position, as shown in FIG. 35.

In the arrangement of FIG. 35, the arrangement provides an advantage that the beverage apparatus 10H can be placed at any of the four possible rotational positions, and with all four of such possible rotational positions, electrical connection can be established between the base 610H and the bottle 10H.

With the arrangement shown in FIG. 35, with two of the rotational positions, a positive plate of the bottle 10H will "match up" with a positive plate of the base 610H, along with a negative plate of the bottle matching up with a negative plate of the base. However, in the two other positions, of the four possible positions, a positive contact plate of the bottle 10H will match up with a negative contact pin of the base 610H, along with a negative contact plate of the bottle 10H will match up with a positive contact pin of the base 610H.

Accordingly, as with the arrangement of FIG. 34, the arrangement of FIG. 35 presents the possible scenario in which polarities are flipped, i.e. (a) the positive contact plate of the bottle is on the negative pin of the base, AND (b) the negative contact plate of the bottle is on the positive pin of the base. In such scenario, as reflected in FIG. 35 at 3500, bridge rectifier(s) with diodes can be used to flip or reverse the polarities, i.e. so that the correct polarity current flow can be experienced by the bottle.

Figure 36:
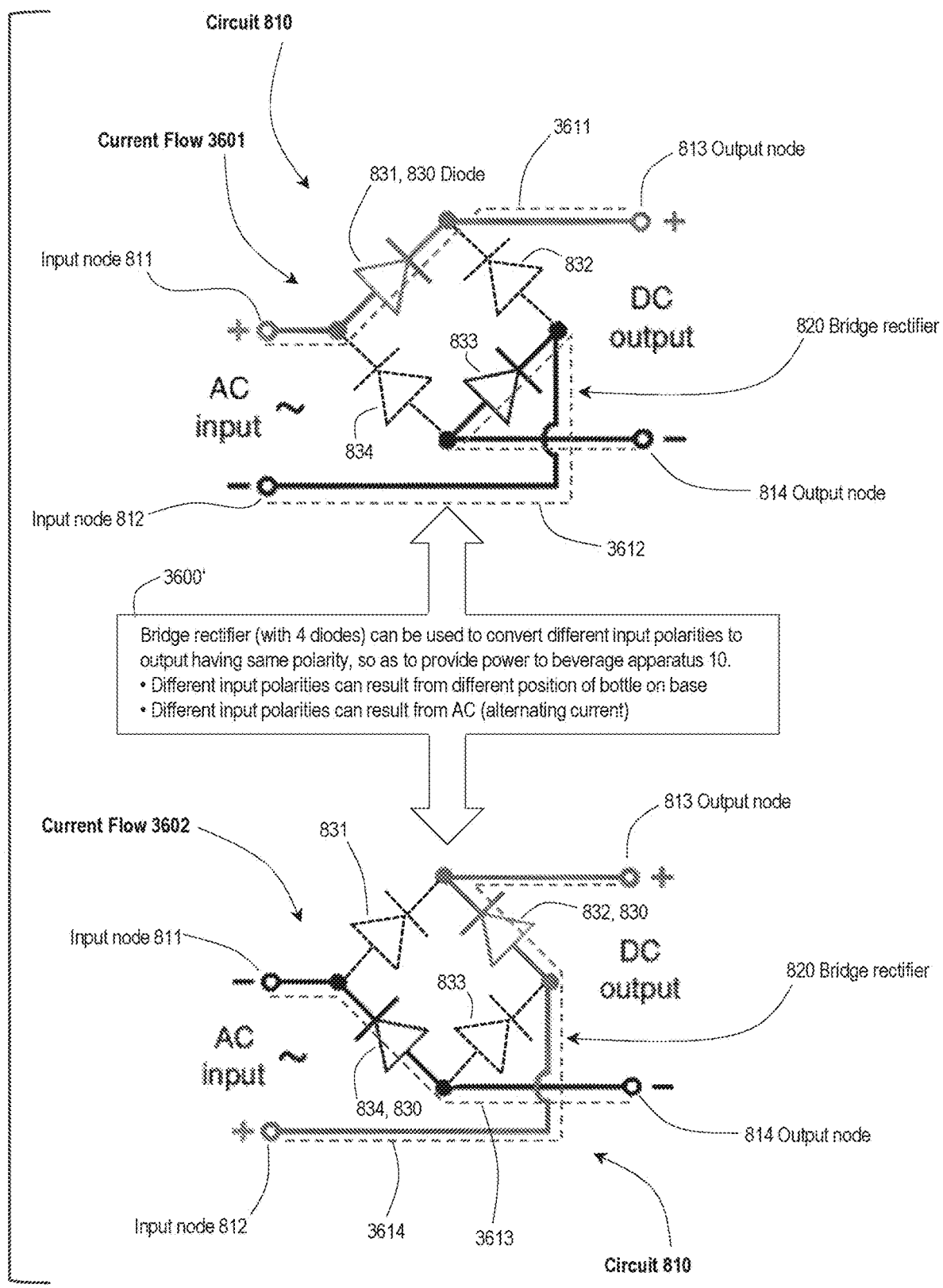
FIG. 36 is a schematic diagram showing two current flows of a circuit 810, according to principles of the disclosure.

FIG. 36 is a schematic diagram showing two current flows of a circuit 810, according to principles of the disclosure. The two current flows include a first current flow 3601 and a second current flow 3602. The circuit 810 can be disposed in the beverage apparatus 10, and specifically can be disposed in the controller 160, as shown in FIG. 16. Alternatively, circuit 810 can be disposed on a circuit board (or at some other location) and connected to the controller 160, for example.

As shown in FIG. 36, the circuit 810 can include a bridge rectifier 670. The bridge rectifier 670 can include a plurality of diodes 830. The diodes 830 can include a first diode 831, a second diode 832, a third diode 833, and a fourth diode 834. In operation, each diode can conduct current in only one direction. The circuit 810 can include input nodes 811 and 812. The circuit 810 can include output nodes 813, 814.

As noted at 3600', the bridge rectifier 820 (with 4 diodes 830) can be used to convert different input polarities to output having same polarity, so as to provide power to beverage apparatus 10. Different input polarities can result from different position of bottle or beverage apparatus 10 on base 610. Also, different input polarities can result from AC (alternating current) being a source of power. For example, in FIG. 35, the power source 650 can be an AC power source.

Accordingly, in the example of the current flow 3601, the positive current is input via input node 811 and the negative current is input via input node 812. As shown by the current flow arrow 3611 in FIG. 36, the positive current is allowed to flow through the diode 831, but is restricted or precluded from flowing through the diode 834 and the diode 832. Also, as shown by the current flow arrow 3612 in FIG. 36, negative current is allowed to flow through the diode 833, but is precluded from flowing through either diode 832 or diode 834.

In contrast, in the current flow 3602 in FIG. 36, the positive current is input via input node 812 and the negative current is input via input node 811. As shown by the current flow arrow 3614 in FIG. 36, the positive current is allowed to pass through the diode 832, but not to pass through diodes 831, 833. As shown by the current flow arrow 3613 in FIG. 36, the negative current is allowed to pass through the diode 834, but is not allowed to pass through diodes 831, 833.

Accordingly, the circuit 810 provides the functionality that regardless of the polarity input via nodes 811, 812, the circuit 810 will render the same output polarity as observed in nodes 813, 814. Thus, the circuit 810 can be used in the arrangements of FIGS. 32-35, for example, to reverse or rectify the current, as may be required depending on orientation that the bottle 10 is set upon the various bases 610. That is, the circuit 810 can be used to address the possible scenario described at tag 3200 in FIG. 32, for example.

Figure 37:
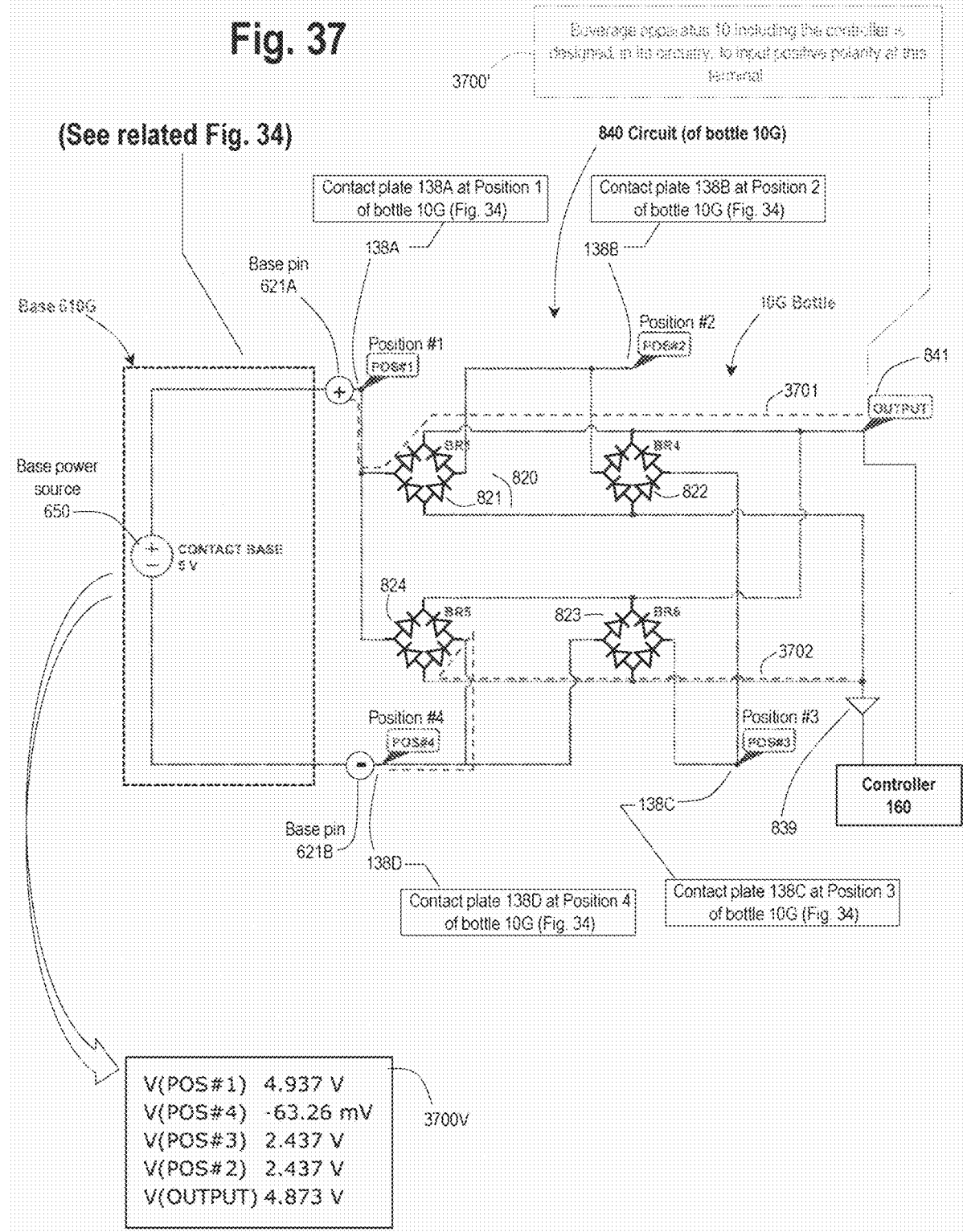
FIG. 37 is a schematic circuit diagram showing circuitry of a base 610G and bottle 10G, of FIG. 34, according to principles of the disclosure.

FIG. 37 is a schematic circuit diagram showing circuitry of a base 610G and bottle 10G, of FIG. 34, according to principles of the disclosure. More specifically, the diagram of FIG. 37 shows base pin 621A (of base 610G) in contact with contact plate 138A (of the bottle 10G). Also, the base pin 621B is in contact with the contact plate 138D. Physically, the arrangement of FIG. 34 can render such connections by the user flipping over the bottle 10G shown in FIG. 34, and rotating such bottle a quarter turn counter-clockwise.

In the arrangement of FIG. 37, the base 16G can include base power source 650. In this example, the base power source 650 provides DC power, which is output at 5 volts.

FIG. 37 shows circuit 840 of the bottle 10G. The circuit 840 can be physically in the form of a printed circuit on the circuit board 161 of FIG. 16, for example. In the example of FIG. 37, the circuit 840 is illustrated as being separate from the controller 160, and providing desired electrical power to the controller 160. However, in other embodiments, the circuit 840 can indeed be part of the controller 160.

In such arrangement, the circuit 840 can provide desired electrical power to the power consuming components of the controller 160 and provide desired electrical power to other components of the beverage apparatus, as may be desired. In this example embodiment, the bottle 10G is designed, in its circuitry, to receive positive polarity from the output 841 into the controller 160, as shown in FIG. 37 at 3700'.

The circuit 840 contains a plurality of bridge rectifiers 820 of construct as illustrated in FIG. 36. In particular, the bridge rectifiers 820 of circuit 840 can include bridge rectifier 821, bridge rectifier 822, bridge rectifier 823, and bridge rectifier 824.

The arrangement of FIG. 37 places the positive contact pin 621A, of the base 610G, in contact with the positive plate 138A of the bottle. Accordingly, with the arrangement of FIG. 37 as shown, the bridge rectifier 821 need not correct the positive current being input from the base 610G—to provide the positive current to be output via output 841. That is, as noted above, in this example, the bottle 10G is designed, in its circuitry, to receive positive polarity from the output 841 into the controller 160. Current flow 3701 shows such positive current flow. That is, as controlled by bridge rectifiers 821 and 821, positive current can flow from the positive base pin 621A to the output 841. Also, as controlled by bridge rectifiers 824 and 824, negative current can flow from the negative base pin 621B to the controller 160 as shown by current flow 3702. The circuit 840 of FIG. 37 can also include element 839 that represents the system ground. Such element 839 can also be described as the negative output rail of the charging circuit. The labeled "output" 841 can be described as the positive output rail of the charging circuit.

FIG. 37 also shows illustrative voltages at 3700V. The voltage at position 1, i.e. at the base pin 621A, can be 4.937 volts. The voltage at the output 841 can be 4.873 volts.

Figure 38:
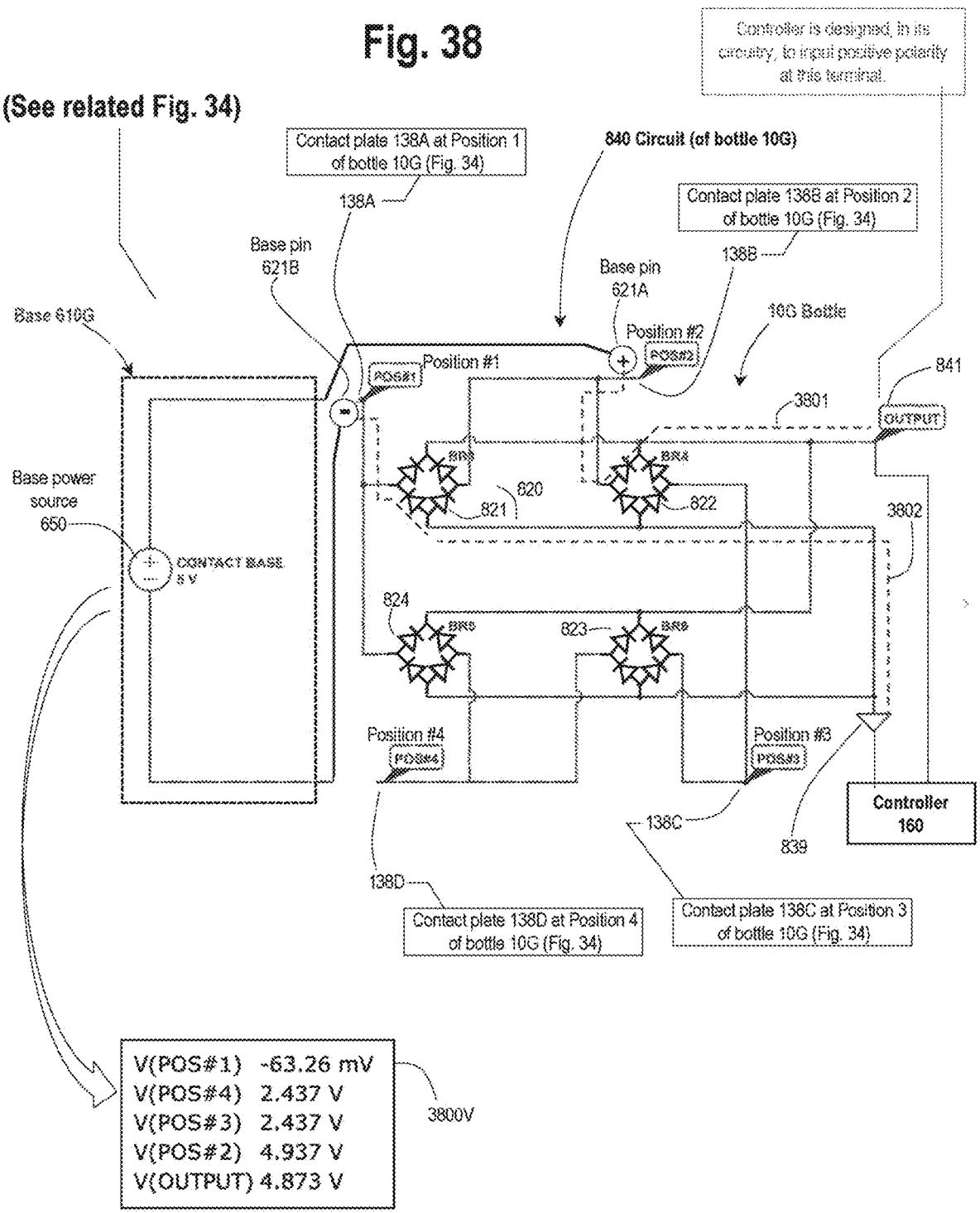
FIG. 38 is a schematic circuit diagram showing a further arrangement of circuitry of a base 610G and bottle 10G, of FIG. 34, according to principles of the disclosure.

Accordingly, FIG. 37 shows an arrangement in which the user places the bottle upon the base in such manner that the positive terminal of the base is indeed connected with a positive terminal of the bottle, and a negative terminal of the base is indeed connected with a negative terminal of the bottle. That is, FIG. 37 shows placement of the bottle 10G upon the base 610G such that the terminals are "positive to positive" and "negative to negative". In contrast, FIG. 38 shows an arrangement in which the terminals are not "positive to positive" and "negative to negative". It is appreciated that known technology relating to bridge rectifiers and diodes can be utilized in the systems and methods of the disclosure.

Accordingly, FIG. 38 is a schematic circuit diagram showing a further arrangement of circuitry of the base 610G and bottle 10G, of FIG. 34, according to principles of the disclosure. In the arrangement of FIG. 37 (as described above), the positive terminal (base pin 621A) of the base power source 650 can be connected to contact plate 138A of the bottle 10G.

In contrast to FIG. 37, in the arrangement of FIG. 38, the negative terminal (621B) of the base power source 650 is connected to the contact plate 138A of the bottle 10G. Also, base pin 621A (positive) is connected to contact plate 138B. However, as described below, the circuit 840 adjusts to such different arrangement. The circuit 840 (of the bottle 10G) of FIG. 38 can be the same as the circuit 840 of FIG. 37. As shown in FIG. 38, current flow 3801 shows positive current flow. That is, as controlled by bridge rectifier 822, positive current can flow from the positive base pin 621A, through the contact plate 138B, and to the output 841. Thus, the desired voltage is received at the output 841, i.e. the voltage for which the bottle is designed for in this example. Also, as controlled by bridge rectifier 821, negative current can flow from the negative base pin 621B, through the bottle's contact plate 138A, and to the controller 160 as shown by current flow 3802.

Accordingly, as illustrated by FIG. 38, the circuit 840 (in the bottle) can adjust (to the different position of the bottle on the base) so as to provide the needed positive polarity to the output 841 via current flow 3801, as well as the needed negative polarity to the controller 160 via current flow 3802. FIG. 38 also shows illustrative voltages at 3800V. In particular, note that voltage at position 1 is −63.26 mV (millivolt). Such was the same voltage as experienced at position 4 in the arrangement of FIG. 37. Also, in the arrangement of FIG. 38, position 2 observes voltage of 4.937 volts. Such is the same voltage as was observed at position 1 in the arrangement of FIG. 37. The output voltage is 4.873, as shown at 3800V in FIG. 38.

With further reference to the example of FIG. 34, DC input can be input from the base 610G. In the example, DC input is provided, rather than AC input. However, the methodology of the processing holds true even with AC input, i.e. in that no matter the input polarity, the output polarity remains constant as illustrated by FIGS. 37 and 38. With the disclosed arrangement, one bridge rectifier may be required per possible charge position, for a total of four bridge rectifiers. As shown in FIG. 36, each bridge rectifier requires four diodes, for a total of 16 diodes. Such extensive number of diodes can be challenging both from a cost perspective and with respect to circuit board area that is to be consumed by the bridge rectifiers with diodes.

As described above, the contact 138A at position 1, for example, in FIG. 34, can be either positive or negative—depending on how the bottle is oriented on the charging base. Additionally, it should be appreciated that the circuit 840 (FIGS. 37 and 38) of the bottle 10G is fairly complex, so as to handle the different possible positions of the bottle 10G on the base 610G. However, it is appreciated that in some implementations of the disclosure, the arrangement of FIGS. 37 and 38 may be desirable, despite the complexity.

In the arrangement of FIG. 34, for example, the base possesses two contacts 621A, 621B, one positive and one negative. The bottle 10G possesses a contact in each of its four corners. Such arrangement can lead to four possible positions for the bottle to be placed in. The polarity of the base will be constant (left position is positive, right position is negative). From an electrical standpoint, this means that there are four possible pairs of contacts, i.e. contact plates on the bottle, for charging. Such four possible pairs of contacts include: (1&2, 2&3, 3&4, 4&1). Each position on the bottle has a possibility to contact the positive and negative contact pin of the base. It is appreciated that such arrangement can create complexities when creating a charging circuit to accommodate all the possible positions, such as the charging circuit shown in FIG. 37. In accordance with at least some embodiments of the disclosure, FIG. 39 provides an arrangement that can address related challenges.

Figure 39:
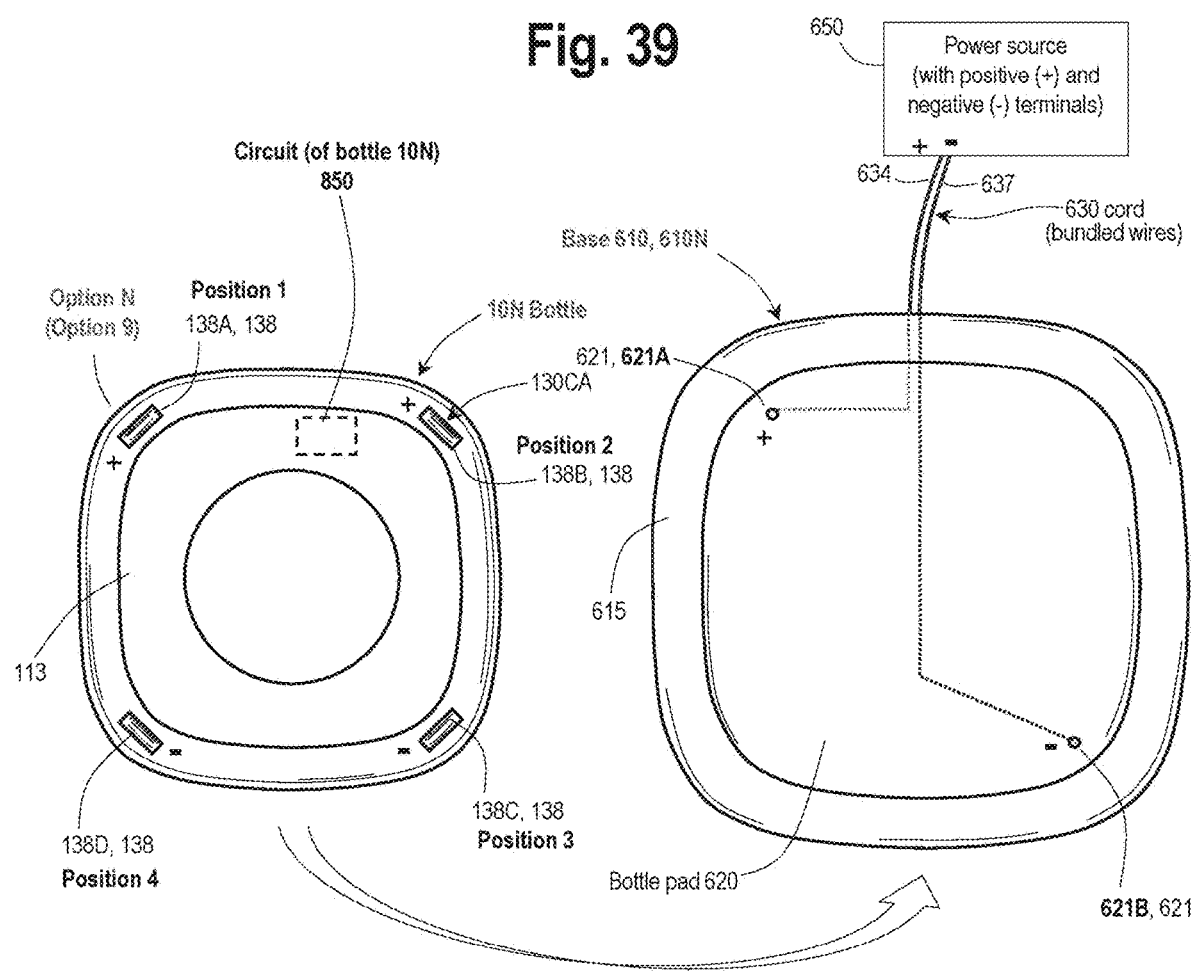
FIG. 39 is a schematic diagram showing an "option N" or option 9 that includes a particular arrangement of a beverage apparatus ION in combination with a base 610N, according to principles of the disclosure.

In accordance with a further embodiment of the disclosure, FIG. 39 is a schematic diagram showing an "option N" or option 9 that includes a particular arrangement of a beverage apparatus ION in combination with a base 610N, according to principles of the disclosure. In the arrangement of FIG. 39, the beverage apparatus ION and the base 610N can be of similar construct to that of FIG. 28. However, in contrast to the arrangement of FIG. 28, the base 610N can be provided with a positive contact pin 621 (i.e. pin 621A) in or on the upper left corner; and a negative contact pin 621 (i.e. pin 621B) in the lower right corner. The bottle ION can be provided with a respective positive contact plate 138 at the upper left corner position and the upper right corner position as shown, i.e. contact plates 138A and 138B, respectively.

The bottle ION can be provided with a respective negative contact plate 138 at the lower right corner position and the lower left corner position as shown, i.e. contact plates 138C and 138D, respectively. The base 610N can be provided with a power source 650 having positive and negative terminals, 634 and 637, respectively.

In the arrangement of FIG. 39, the arrangement provides an advantage that the beverage apparatus ION can be placed at any of the four possible rotational positions, and with all four of such possible rotational positions, electrical connection can be established between the base 610N and the bottle ION.

Accordingly, the arrangement of FIG. 39 presents the possible scenario in which polarities are flipped, i.e. (a) a positive contact plate of the bottle is on the negative pin of the base, AND (b) a negative contact plate of the bottle is on the positive pin of the base. In such scenario as described above, bridge rectifier(s) with diodes can be used to flip or reverse the polarities, i.e. so that the correct polarity current flow can be experienced by the bottle.

Accordingly, with the arrangement of FIG. 39, there are four (4) possible positions of the bottle on the charging base. However, as a result of the arrangement of the contacts on both the bottle and the base, there are only two (2) possible connection pairs. Such two connection pairs include: positions 1&3 of the bottle are connected to the base, or positions 2&4 of the bottle are connected to the base. This simplifies the charging circuit substantially, as just one bridge rectifier 820 can be used for all four positions in which the bottle can be placed upon the base. Relatedly, the circuit 850 of FIGS. 40 and 41 can be used in the bottle ION of FIG. 39.

Figure 40:
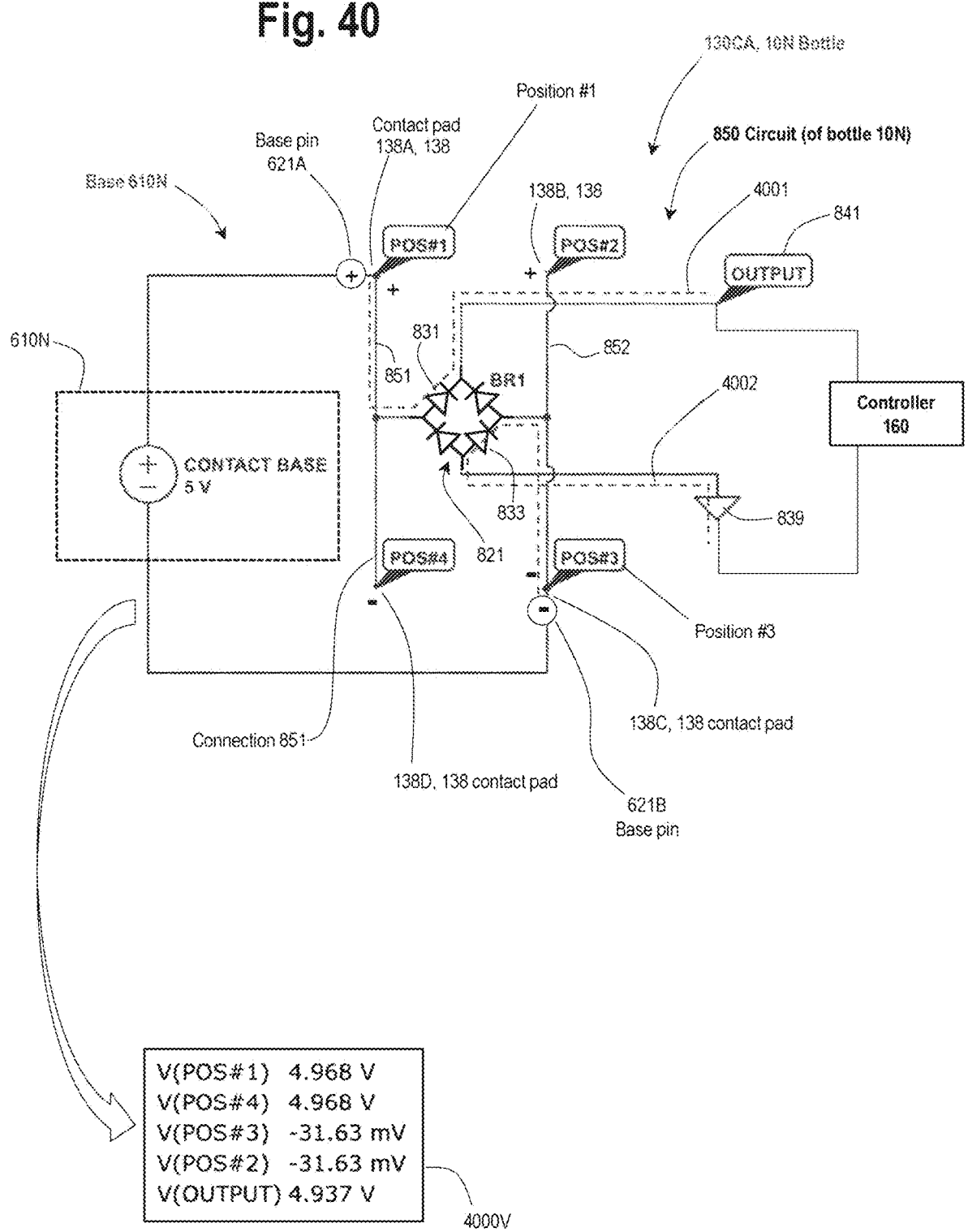
FIG. 40 is a schematic circuit diagram showing circuitry of a base 610N and bottle ION, of FIG. 39, according to principles of the disclosure.

FIG. 40 is a schematic circuit diagram showing circuitry of a base 610N and bottle ION, of FIG. 39, according to principles of the disclosure. In particular, FIG. 40 shows circuit 850 that can be used in a beverage apparatus or bottle 10 (specifically bottle ION as shown in FIG. 39). The circuit 850 includes contact pads 138 of the bottle ION. The contact pads 138 can include contact pad 138A, contact pad 138B, contact pad 138C, and contact pad 138D. Such contact pads 138 are shown on the bottle ION of FIG. 39. The output of the circuit 850 can be electrically connected or wired to the controller 160, as shown in FIG. 40. In some embodiments, some or all of the circuit 850 can be part of the controller 160.

FIG. 40 shows contact base 610N shown schematically. The contact base 610N can include base pin 621A (positive polarity) and base pin 621B (negative polarity). As shown in FIG. 40, the base pin 621A can be in electrical and physical contact with the contact pad 138A, and the base pin 621B can be in electrical and physical contact with the contact pad 138C. Such physical arrangement can be attained if the bottle ION of FIG. 39 was flipped over, so as to set upon base 610N, and then rotated a quarter turn counterclockwise.

As shown in FIG. 40, current flow 4001 shows positive current flow. That is, as controlled by bridge rectifier 821 and diode 831, positive current can flow from the positive base pin 621A, through the contact plate 138A, and to the output 841. Also, as controlled by bridge rectifier 821 and diode 833, negative current can flow from the negative base pin 621B (of the base 610N), through the contact plate 138C, and to the controller 160 as shown by current flow 4002.

Simulated voltage for the circuit 850 of FIG. 40 are shown at 4000V.

As can be seen from the diagrams of FIGS. 39 and 40 and circuit 850, the base 610N can be connected to position 1 and 3 of the bottle in both possible polarities. That is, bottle can be connected to the base with (1) the arrangement shown in FIG. 40, and (2) in a possible arrangement (flipped from that shown in FIG. 40) with base pin 621A contacting contact pad 138C, and pin 621B contacting contact pad 138A.

As can be seen from the diagrams of FIGS. 39 and 40, in this embodiment, it would be physically impossible for position 1 and 4 (i.e. contact pad 138A and 138D) to be connected at the same time to the charging base 610N. Accordingly, contact pad 138A and 138D can be connected on the bottle (by electrical connection or "leg" 851 of circuit 850) to simplify the circuit 850.

In similar manner, as can be seen from the diagrams of FIGS. 39 and 40, in this embodiment, it would be physically impossible for position 2 and 3 (i.e. contact pad 138B and 138C) to be connected at the same time to the charging base 610N. Accordingly, contact pad 138B and 138C can be connected on the bottle (by electrical connection or "leg" 852 of circuit 850) to simplify the circuit 850.

Figure 41:
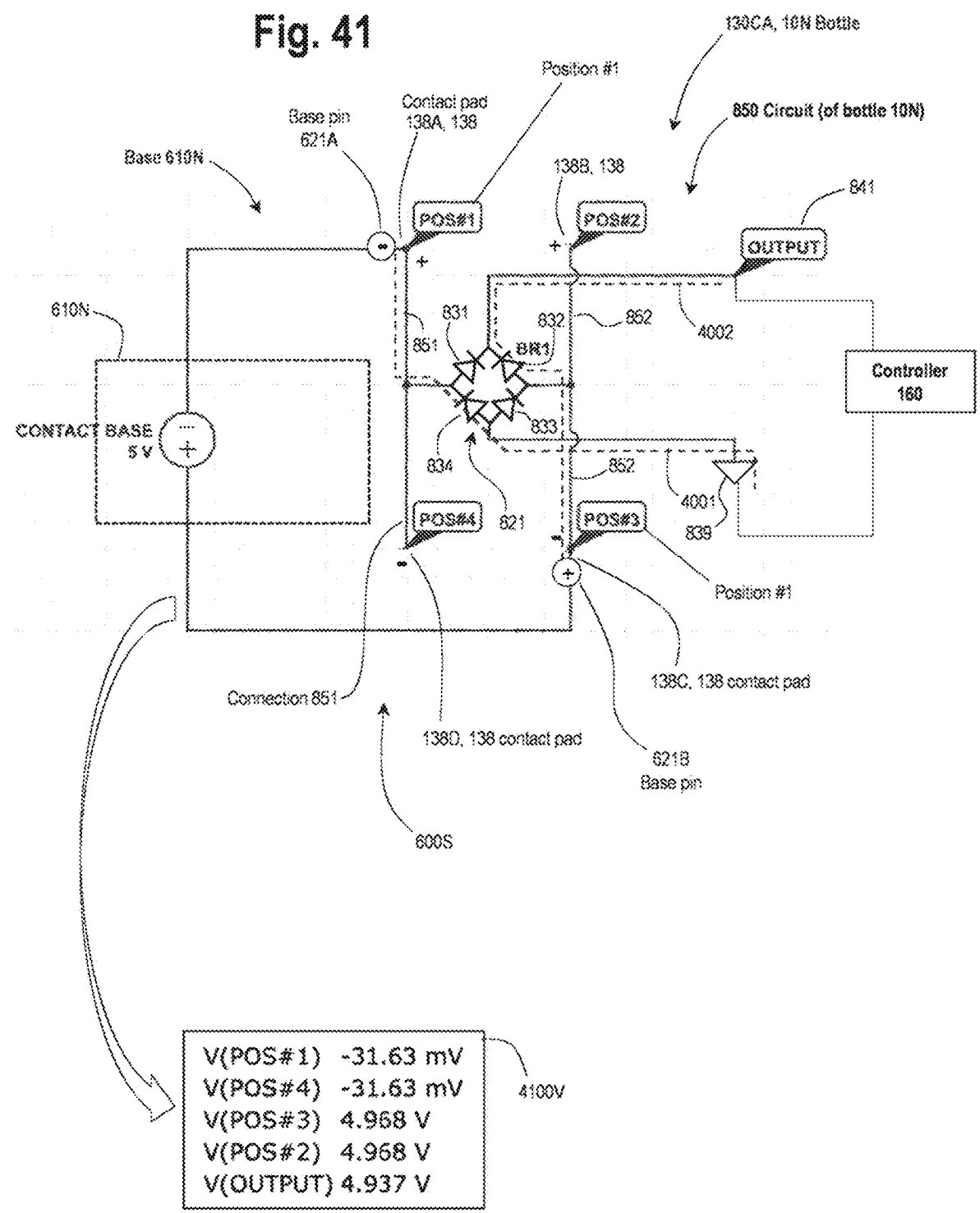
FIG. 41 is a further schematic circuit diagram showing circuitry of a base 610N and bottle ION, of FIG. 39, according to principles of the disclosure.

Accordingly, the arrangement of FIGS. 39-41 reduces the total number of components, required for charging, from 16 diodes, as described above, to the 4 diodes of FIG. 40. Such reduction in components can save a great deal of circuit board space, in both placement of components and connection of components, in the circuit.

Relatedly, FIG. 41 shows a further arrangement. The circuit diagram of FIG. 41 includes the same circuit 850 (in the bottle) of FIG. 40, but shows the base 610N connected with different polarities. That is, FIG. 41 is a further schematic circuit diagram showing circuitry of the base 610N and bottle ION, of FIG. 39, according to principles of the disclosure. In contrast to FIG. 40, in FIG. 41, the base pin 621B is positive polarity, at a value of 5 volts output by the base 610N. The base pin 621A is negative polarity. As shown in FIG. 41, current flow 4002 shows positive current flow. That is, as controlled by bridge rectifier 822 and diode 832, positive current can flow from the now positive base pin 621B, through the contact plate 138C, and to the output 841. Note that position 2 (pad 138B) is not connected. Also, as controlled by bridge rectifier 821 and diode 834, negative current can flow from the now negative base pin 621A (of the base 610N), through the contact plate 138A, and to the controller 160 as shown by current flow 4001.

Note that position 4 (pad 138D) is not connected. Simulated voltages for the circuit 850 of FIG. 41 are shown at 4100V. Accordingly, the arrangement of FIGS. 39-41 provides an efficient an effective arrangement by which a beverage apparatus 10 can be charged by a base 610.

Various features are described herein in the context of DC voltage. It is appreciated that AC voltage can be used in lieu of DC voltage as desired. That is, circuits described in FIGS. 32-41 above, for example, can provide the desired polarity of output regardless of polarity of input from an energy source, such as the power source 650. Relatedly, it is appreciated that AC power, such as from a wall outlet, changes polarity back and forth from negative to positive at a particular frequency. Accordingly, such AC input can be the source of energy in lieu of the DC input described herein, as desired.

In various disclosure set forth herein, the bottle is described as having a plurality of contact pads 138 and the base is described as having a plurality of base pins 621. However, it is appreciated that any suitable connection structure can be utilized. For example, the base 610 can be provided with contact pads or plates and the beverage apparatus or bottle 10 can be provided with pins, which contact the plates of the base, or other structure can be used.

Figure 42:
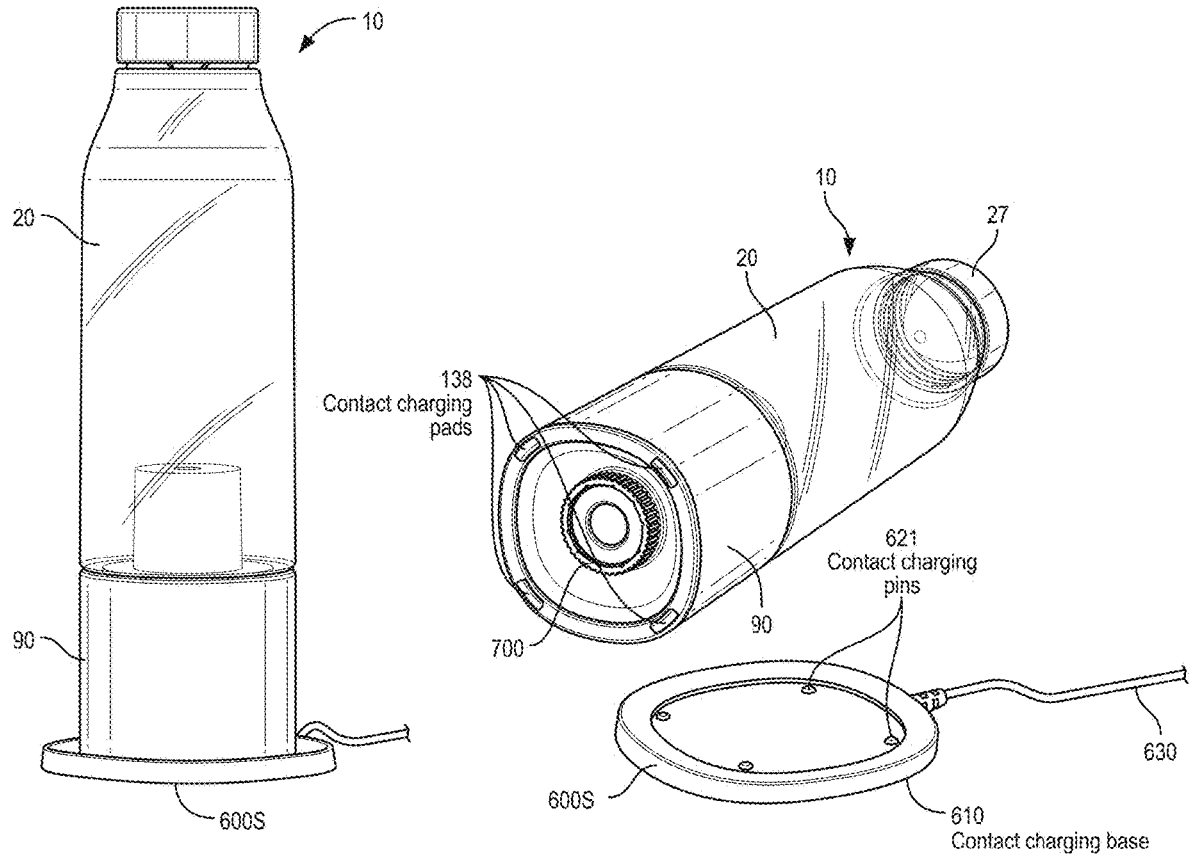
FIG. 42 is a diagram showing a bottle or beverage apparatus 10 both on a base 610 and off the base 610, according to principles of the disclosure.
Figure 43:
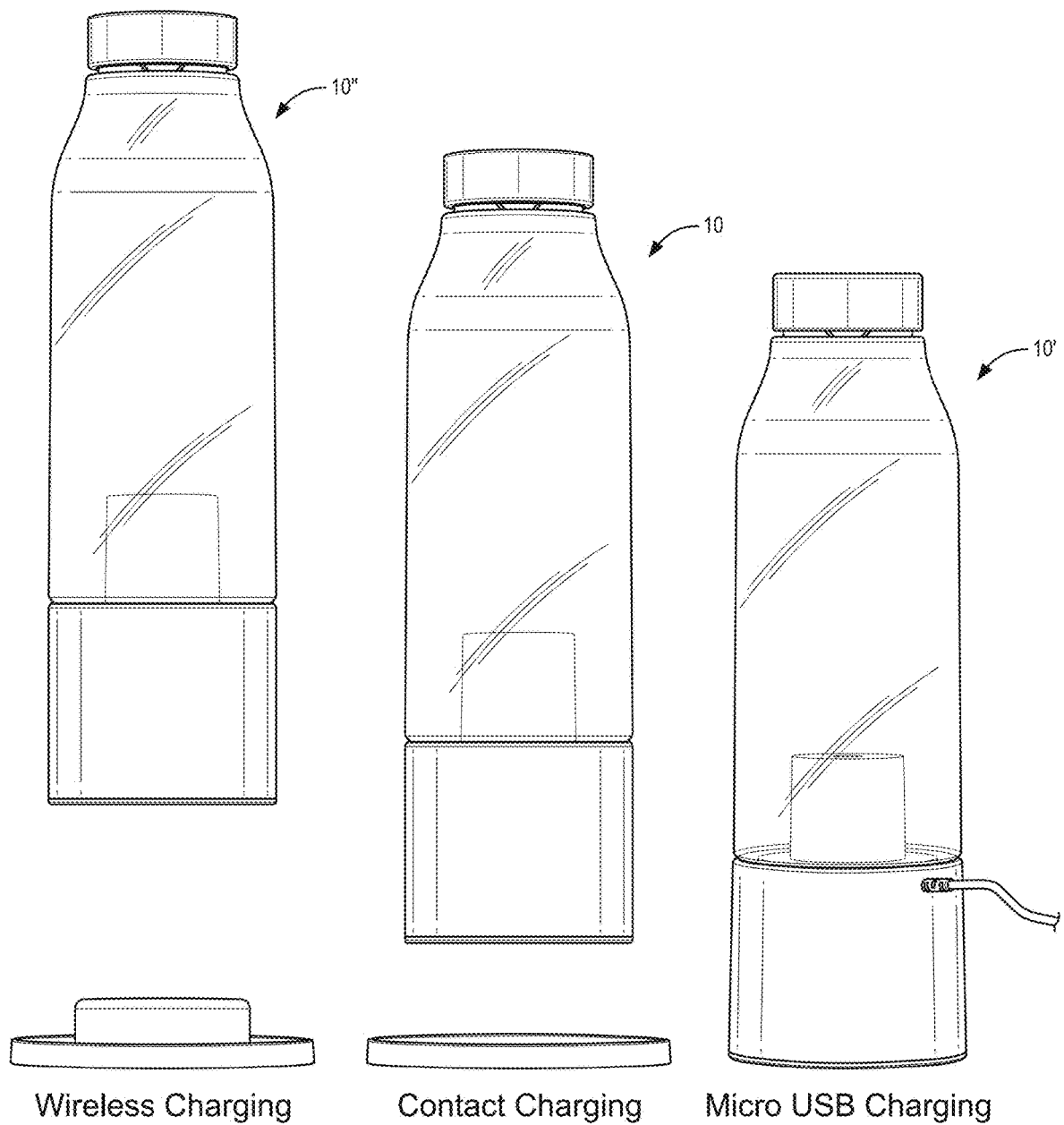
FIG. 43 is a diagram showing bottles and associated different charging options, according to principles of the disclosure.

FIG. 42 is a diagram showing a bottle or beverage apparatus 10 both on a base 610 and off the base 610, according to principles of the disclosure. A charge station or system 600S can include a charging base or charge base 610, as well as wires or other attachments or accoutrements that accompany the charge base 610 (such as wires 630). As shown in FIG. 42, the base and the bottle 10 can include connection elements similar or same as those shown in FIG. 39. Additionally, the bottle 10, as shown in FIG. 42, can include circuit 850 as shown in FIGS. 40 and 41, along with a controller that can include such circuit 850. The base 610 can be described as a contact charging base 610. The base 610 can be provided with power via a base power cord 630. The base power cord 630 can be provided with an adapter so as to plug into a 120 volt household circuit, for example. As shown, the bottle 10 can have a squircle shape. However, in other embodiments, the bottle 10 can have a round shape, a square shape, or some other shape as desired. The base 610 can possess the same shape as the bottle, so as to match with and mate with the bottle 10. FIG. 43 is a diagram showing different charging options, according to principles of the disclosure. As shown, the bottle 10 can be provided with contact charging functionality as described herein and shown in FIGS. 34 and 39, for example. Additionally, the bottle 10' can be provided with USB or micro USB (Universal serial bus) charging as also shown in FIGS. 8 and 16, for example. Additionally, a bottle 10" can be provided with wireless charging functionality. For example, wireless charging can, in lieu of the physical contacts described herein, use respective coils at the points of connection of a base and bottle. The coil on the base can be energized so as to energize a first coil. Energization of the first coil can create a magnetic field or inductive field that is experienced by a second coil in the bottle. As a result, the second coil can be energized so as to transfer energy from the first coil to the second coil. The transferred energy can then be used to charge the battery in the bottle, to operate the controller, and to perform other operations. Known wireless charging technology can be used with the systems and methods of the disclosure.

Figure 44:
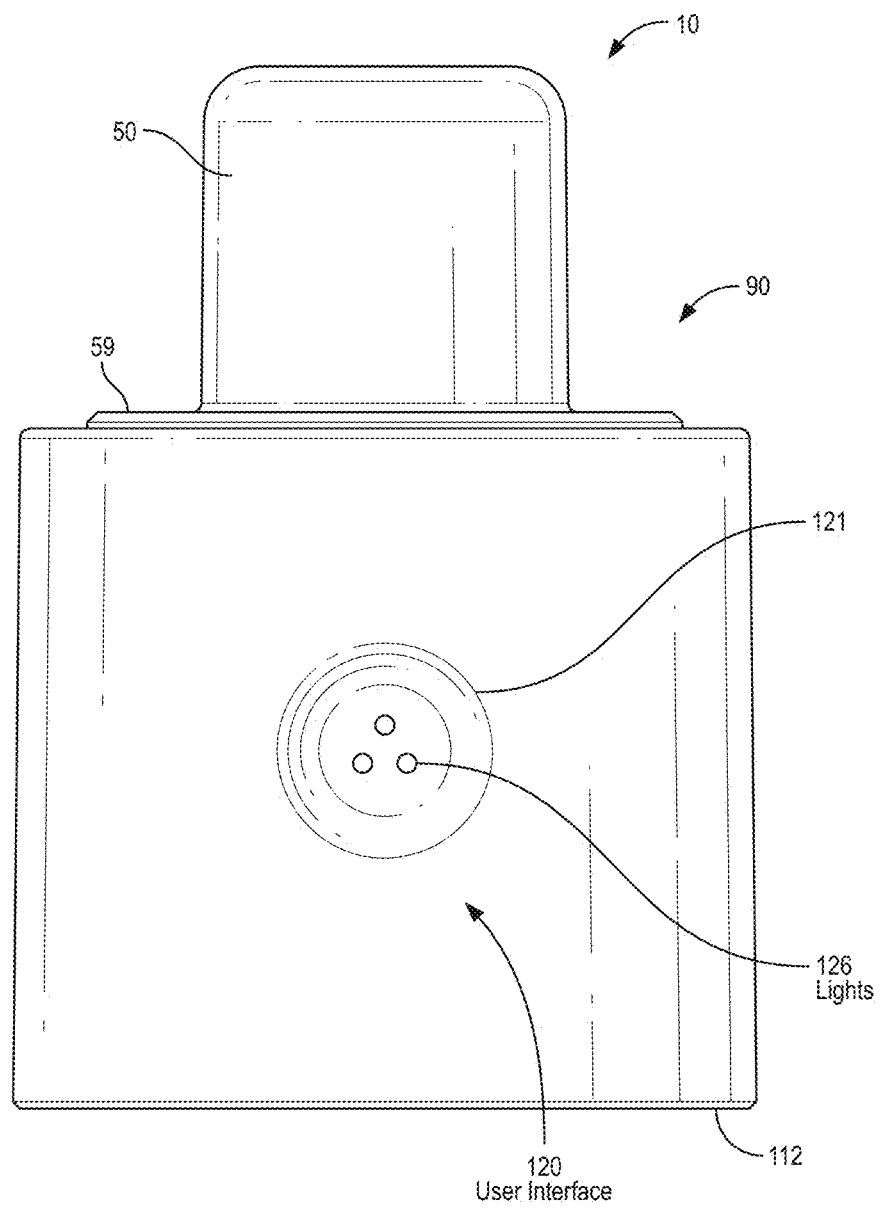
FIG. 44 is a front perspective view of a base assembly 90 with a first user interface, according to principles of the disclosure.

FIG. 44 is a front perspective view of a base assembly 90 with a first user interface 120, according to principles of the disclosure. For example, the base assembly shown in FIG. 44 could constitute the base assembly 90 of FIG. 2. As shown, the user interface 120 can include three lights 126 that are disposed on or adjacent to a button or additive button 121. The button 121 can be pressed by the user so as to control operation of the bottle 10. For example, a certain number of presses, sequence of presses, or pattern of presses can indicate to the controller 160 that a certain operation should be performed. FIG. 44 also illustrates a volcano or outer receptacle member 50, in accordance with at least one embodiment. FIG. 44 shows attachment collar 59 and skirt shoe 112.

Figure 45:
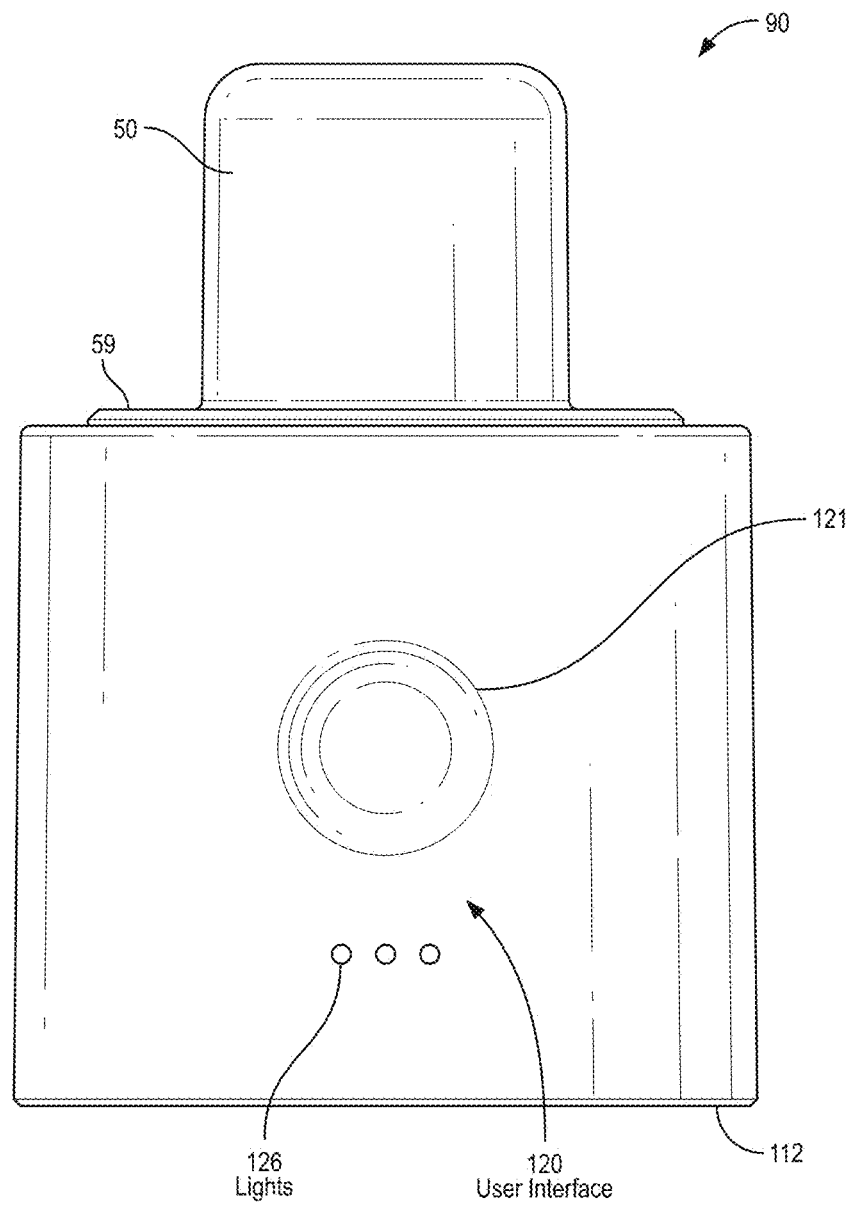
FIG. 45 is a front perspective view of a base assembly 90 with a second user interface, according to principles of the disclosure.

FIG. 45 is a front perspective view of a base assembly 90 with a second user interface, according to principles of a further embodiment of the disclosure. For example, the base assembly shown in FIG. 45 could constitute the base assembly 90 of FIG. 2. As shown in FIG. 45, the user interface 120 can include the button or additive button 121 and display lights 126. In this embodiment, the display lights 126 can be positioned below the button 121. It is appreciated that any number of buttons 126 can be utilized so as to communicate operational information, status information or other information to the user. Also, any number of buttons 121 can be provided on the base assembly 90 so as to control operations of the bottle 10.

Hereinafter, further aspects and features of embodiments of the disclosure will be described.

Figure 48A:
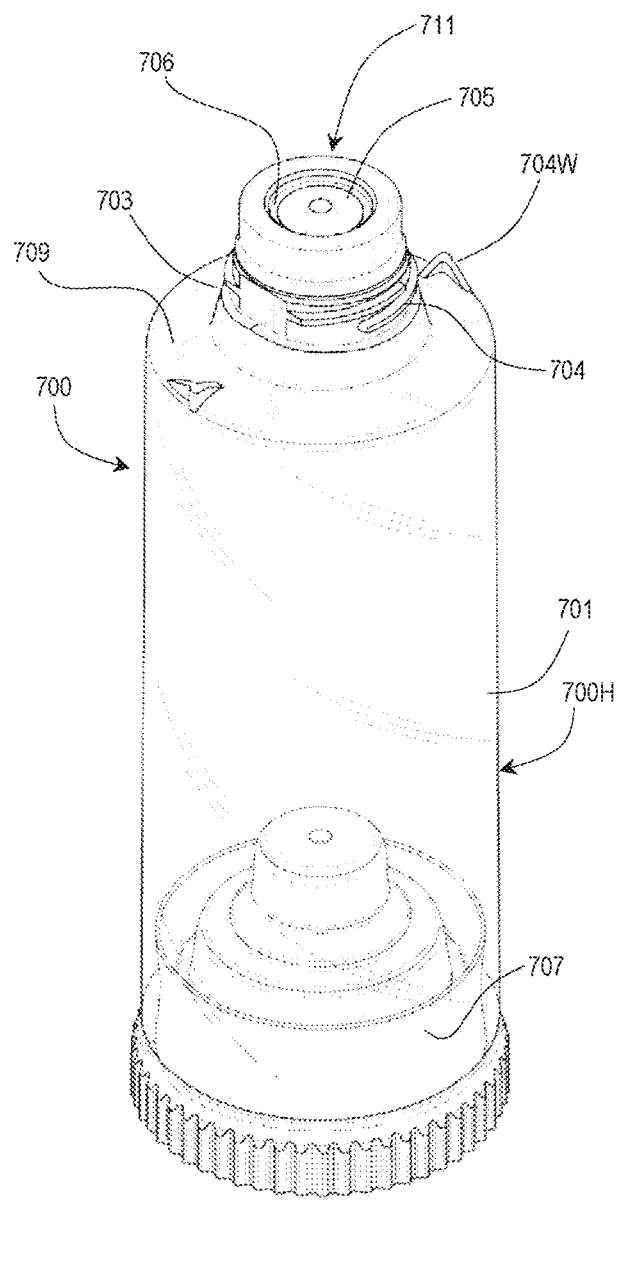
FIG. 48A is a top perspective view of the pod or vessel 700 according to principles of the disclosure.
Figure 48B:
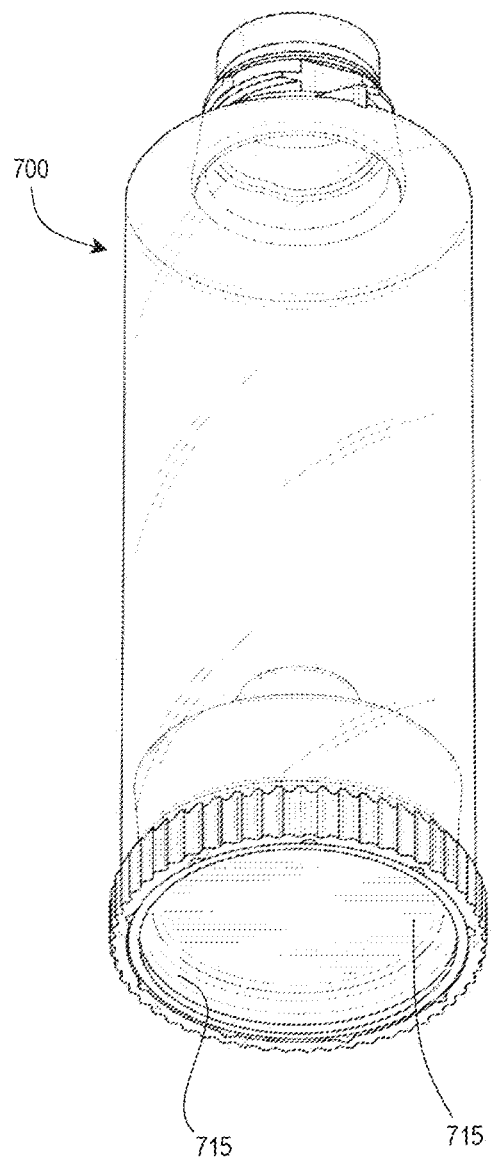
FIG. 48B is a bottom perspective view of the pod or vessel of FIG. 48A.

As described herein, the beverage apparatus 10, as shown in FIGS. 1, 2 and 10, for example, can include a pod 700. The pod 700, as shown in FIG. 10, can also be described as an additive vessel, vessel or vessel assembly 700, for example. An illustrative pod 700, which is similar or same in structure as the pod shown in FIG. 10, is shown in FIGS. 48A and 48B. FIG. 48A is a top perspective view of a pod or vessel 700 according to principles of the disclosure. FIG. 48B is a bottom perspective view of the pod or vessel of FIG. 48A.

The pod 700 can include a housing 700H. The housing 700H can include a pod body 701 and a neck 703. The pod body 701 and neck 703 can be connected by shoulder 709. The pod body 701 of the housing and the neck 703 of the housing can be constructed of a suitable material such as metal or plastic. The pod 700 can include a nozzle assembly 711. The nozzle assembly 711 can be part of or include a top cap 706 with one or more apertures that support an umbrella valve or valve 705 and/or allow for flow through the top cap 706. In some embodiments, the nozzle assembly 711 can be attached to the neck 703. In some embodiments, the pod 700 may not include a neck or neck structure. Accordingly, in some embodiments of the pod 700, the nozzle assembly 711 can be attached to the pod body 701. Accordingly, the nozzle assembly 711 can be attached to the housing 700H, be it the body of the housing, neck of the housing, shoulder of the housing, or some other component of the housing. The neck 703 can be considered to be part of the housing.

The housing 700H can include a vessel volume or internal volume 702, as shown in FIG. 10. The vessel volume 702 can be defined—at least in part—by the housing 700H, such as by a wall of the housing. The vessel volume 702 can be defined in part by a wall of the housing and a plunger 707, slidably disposed in the housing, or other structure. The vessel volume 702 can be defined by a pouch or sachet, in which additive is contained. In embodiments, parts of the pod 700 can be formed apart and joined together, such as by heat bonding. In embodiments, parts of the pod 700 can be integrally formed. Further details of the pod 700 are described below.

Figure 46:
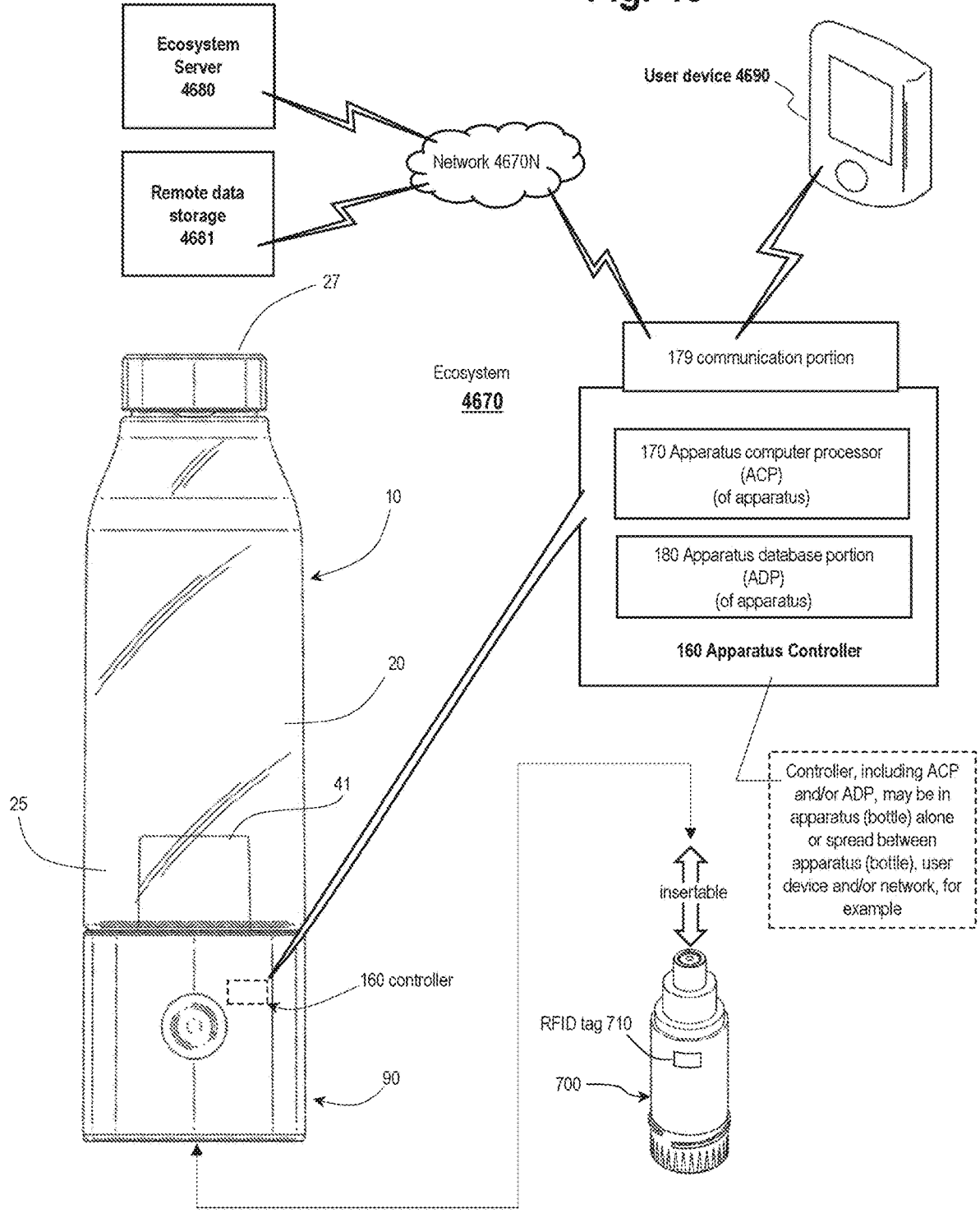
FIG. 46 is a schematic diagram showing an ecosystem 4670 that includes beverage apparatus 10, according to principles of the disclosure.

As shown in FIG. 8, for example, the beverage apparatus 10 can be provided with a display or user interface 120 that includes various user interface features, such as display lights 126. The interface 120 and/or other user interface features can be provided anywhere on the beverage apparatus 10 as may be desired. Any number of user interface features can be provided so as to afford desired user control or functionality, so as to effectively control and monitor status of the beverage apparatus 10, and so as to provide interface between the beverage apparatus 10 and the human user and/or user device 4690, as shown in FIG. 46. An additive button 121 can be provided on the beverage apparatus 10 to afford functionality as described herein. In accordance with at least one embodiment of the disclosure, a user can press the additive button 121 so as to dispense additive, from a pod, additive vessel or vessel 700, into the consumable liquid contained in the beverage apparatus 10.

The beverage apparatus 10 can include the display lights 126. When a user presses and/or holds the button 121, the pod 700 (as indicated by one or more display lights 126) can be manipulated in the bottle 10 so as to dispense the desired additive. It is appreciated that the disclosure is not limited to particular buttons, lights, and/or other user interface devices. Various user interface arrangements, features or functionality may be utilized so as to control dispensing of an additive from a pod and/or control other operations of the beverage apparatus 10. The lights 126 can provide the user with various status information or operational information regarding the beverage apparatus 10. Functionality and/or operational control, for example, that is provided via the interface 120 can also be provided via the user device 4690, such as a cell phone 4690, for example. The user device 4690 can communicate with the beverage apparatus 10 as otherwise described herein.

Hereinafter, further features of a controller 160 of the beverage apparatus 10 will be described.

As shown in FIG. 16, the beverage apparatus 10 can include an apparatus controller or controller 160. The apparatus controller 160 can include an apparatus computer processor (ACP) 170 and an apparatus database portion (ADP) 180. The ACP 170 can include one or more processors. The apparatus database portion 180 can include various computer memory that includes various databases, data records, memory portions and other memory architecture. Accordingly, the apparatus database portion 180 can be provided with computer readable instructions that the ACP 170 can read. Based on such instructions and/or other data, the ACP 170 can perform various operations and/or provide functionality as described herein.

The apparatus controller 160, with the ACP 170 and the apparatus database portion 180, can control or provide for operations of the beverage apparatus 10 and can provide the various features and functionality described herein. Various wires, communication paths and/or other conductive paths, such as wires or communication pathways 957 shown in FIG. 47 for example, can be utilized so as to provide connectivity between the apparatus controller 160, various motors or other drive mechanisms of the beverage apparatus 10 and/or other components of the beverage apparatus 10. Such wires, communication paths or other conductive paths can be in the form of insulated wires and/or structurally embedded wires or electrical conduits that are routed between components. Such wires or other conductive paths can be integrated into one or more components of the beverage apparatus 10, such as integrated into a circuit board or other supporting structure. Such wires or other conductive paths can provide for both communication between components and/or provide electrical power to (or between) components, for example.

FIG. 46 is a diagram showing an ecosystem 4670 that includes beverage apparatus 10, according to principles of the disclosure. Also, FIG. 47 is a schematic diagram of a beverage apparatus 10 with pod 700, according to principles of the disclosure.

As shown in FIG. 46, the ACP 170 can be in communication with the user device 4690 (or other user devices 4690) that is associated with the particular user of the beverage apparatus 10, other user devices, cloud network or network resources, and/or other systems and/or other networks 4670N. The controller 160 can be in communication with a remote data storage 4681, which can contain data used by the controller 160. For example, the beverage apparatus 10 can be in communication with a cell phone or other user device 4690, of the user, that is associated with the beverage apparatus 10. The apparatus database portion 180 can contain any of a wide variety of data utilized by and/or generated by the apparatus controller 160 and/or the ACP 170, such as described herein. The controller 160 can be in communication with a remote server or ecosystem server 4680. For example, the controller 160 can utilize the ecosystem server 4680 to perform a portion of needed processing. The ecosystem server 4680 can include a plurality of ecosystem servers 4680.

The beverage apparatus 10, as shown in FIG. 46, can also include an external communication portion or communication portion 179 that provides communication between the beverage apparatus 10 and various other components of the system or ecosystem 4670. For example, the communication portion 859 can provide communication with a user device such as the user cell phone 4690. The apparatus controller 160 and/or the ACP 170 can perform a wide variety of processing related to the dispensing of additives and other processing as otherwise described herein.

The controller or apparatus controller 160 can be fully provided within the beverage apparatus 10. Accordingly, the beverage apparatus 10 can operate fully independently, with all processing and data storage/retrieval performed onboard the beverage apparatus 10, without external input/output. On the other hand, processing and data storage/retrieval can be shared between the onboard apparatus controller 160 and external computing resources. Such external resources might include the ecosystem server or server 4680 or the user device 4690. The server 4680 can include processors and databases that can be utilized in conjunction with operation of the controller 160. The server 4680 can interface with numerous other beverage apparatuses 10 and user devices 4690 in the ecosystem 4670. Such numerous beverage apparatuses 10 and devices 4690 may be in the hundreds, thousands or millions. Additionally, the server 4680 itself can be dispersed over a cloud architecture or dispersed over other architecture that includes numerous processing resources and numerous database resources, which are served by or connected to a network 4670N, in a ecosystem 4670.

As shown in FIG. 46 and otherwise described herein, the beverage apparatus 10 can include a pod, additive vessel, or vessel 700. The vessel 700 can be removable, by the user in routine use, from the beverage apparatus 10 in accordance with one or more embodiments of the disclosure, as described herein. The vessel 700 can be replaced with another pod 700. The vessel 700 can be associated with or include a tag or RFID tag 710. The tag 710 can be mounted to or on a side of the vessel or mounted to some other location or position on the vessel 700. The tag 710 can be mounted on a lower or bottom surface of the vessel 700. The tag 710 can be mounted on an end cap 708 of the pod, and in particular on a bottom surface 715 of the end cap 708, as shown in FIG. 10. The vessel 700 is insertable into the beverage apparatus 10 and attachable to the beverage apparatus 10. The vessel 700 can dispense additive, which is contained in the vessel 700, as described herein. As shown in FIG. 47, the vessel 700 can include the tag or RFID tag 710 that is provided on a bottom surface of the vessel 700.

For example, the RFID tag 710 can be adhesively attached to the bottom surface of the pod 700.

As shown in FIGS. 16, 46 and 47 and otherwise described herein, the beverage apparatus 10 can include a controller or apparatus controller 160. The apparatus controller 160 can control operations of the beverage apparatus 10. The apparatus controller 160 can include the apparatus computer processor (ACP) 170. The apparatus controller 160 can also include the apparatus database portion (ADP) 180. The apparatus controller 160 can be in the form of a physical machine or control unit that is physically attached to a suitable structural component of the beverage apparatus 10. The apparatus controller 160 can be in electronic communication with a reader, an RFID reader, RFID transceiver or transceiver 941, i.e. such as through wiring. The apparatus controller 160 can be in communication with an RFID transceiver 941, which can be or include an RFID reader. The RFID transceiver 941 or other RFID component can be in electronic communication with an antenna 942, i.e. such as through wiring. In some embodiments, such components can be integrated together. For example, the apparatus controller 160 can include the RFID reader 941 and the antenna. The antenna 842 can be disposed in the structure of the beverage apparatus 10 so as to be sufficiently proximate to the RFID tag 710, i.e. so as to effectively provide communications between the antenna 942 and the RFID tag 710 of the pod or vessel 700. For example, the antenna 942 can be integrated into or provided upon or affixed to the lower support platform and/or bottom support platform of the beverage apparatus 10, such as support platform 161. The RFID transceiver 941 or reader 941 and the antenna 942, shown schematically in FIG. 47, can collectively constitute an RFID transceiver assembly 940 or RFID assembly 940.

FIG. 16 shows the controller 160 and provides further detail of the controller 160, including the apparatus computer processor (ACP) 170 and apparatus database portion 180, that can be provided in the beverage apparatus 10, according to principles of the disclosure. The ACP 170 can include a general processing portion 171. The general processing portion 171 can handle a variety of processing performed by the beverage apparatus 10 that is not performed by other specialized processing portions as described herein. The general processing portion 171 can coordinate, orchestrate, and/or control more specialized processing that is performed by the specialized processing portions.

Various specialized processing portions can be provided in the ACP 170. The ACP 170 can include a dispense processing portion 172. The dispense processing portion 172 can perform a wide variety of operations associated with dispense of an additive from a vessel 700 that is disposed in the beverage apparatus 10. Such operations associated with dispense of an additive from a vessel 700 are described herein.

The ACP 170 can also include a liquid level processing portion 173. The liquid level processing portion 173 can perform a wide variety of operations associated with determining liquid level of the beverage apparatus. In general, it is appreciated that the various processing portions of the ACP 170 can perform with each other and/or complement each other so as to provide functionality of the beverage apparatus 10.

The ACP 170 can also include an interface processing portion 174. The interface processing portion 174 can perform various operations relating to interface functionality of the beverage apparatus 10. For example, the interface processing portion 174 can observe operations of the beverage apparatus 10 and output representative data to the user via the interface 120. In general, the interface processing portion 174 can input data from or via the display or interface 120, such as data generated from interface with a user and data from operations of the ACP 170 based on such input data. The interface processing portion 174 can observe operations of the beverage apparatus 10 and output data via the interface 120 so as to represent, to the user, operations that are performed by the beverage apparatus 10. The interface processing portion 174 can provide similar functionality between the beverage apparatus 10 and a user via a user device 4690. Accordingly, the interface processing portion 174 can output data to the device 4690 so as to represent operations of the beverage apparatus 10. The interface processing portion 174 can input data from the user device 4690 that results from interface with the user. Such input data, from the user device 4690, can dictate or control operations of the beverage apparatus 10. As otherwise described herein, the ACP 170 and the controller 160 in general can be disposed fully within the beverage apparatus 10. Portions of the ACP 170/controller 160 can be disposed external to the beverage apparatus 10. That is, it is appreciated that some processing performed might be performed by a server 4680, the user device 4690 and/or other processing resource, for example, in communication with the ACP 170 and/or controller 160.

As shown in FIGS. 16, 46 and 47, the controller 160 can also include the apparatus database portion 180. The apparatus database portion 180 can include a general database 181. The general database 181 can store a wide variety of data that is used by or generated by the ACP 170. The apparatus database portion 180 can also include a user database 182. The user database 182 can include a wide variety of data regarding the particular user of the beverage apparatus 10 and data regarding other users that are associated with the beverage apparatus 10 in some manner. The user database 182 can include user preference information, user history information, use pattern information, use trend information, as well as other data regarding use of the beverage apparatus 10 by a user (or users). The user database 182 can include data regarding the user device 4690 and communication particulars of the user device 4690 such as communication credentials, for example.

The features described herein can be used with known technology as may be desired. For example, the features described herein can be used in conjunction U.S. patent application Ser. No. 15/694,659, filed Sep. 1, 2017 (U.S. Publication 2018/0099850 that published on Apr. 12, 2018), the entire disclosures of which are hereby incorporated by reference. For example, the features described herein can be used in conjunction with level sensing technology as described in such U.S. Publication 2018/0099850.

As described herein, information and data have been utilized herein interchangeably, unless otherwise provided by the particular context.

The apparatus data portion 180 can also include a liquid level database 183. The liquid level database 183 can store various data utilized by or generated by the liquid level processing, such as liquid level measured over time and rate of consumption of liquid. The apparatus data portion 180 can also include a bottle status database 184 that contains various data regarding status and operations of the beverage apparatus.

As described above with reference to FIGS. 2, 10, 11 and 48A for example, the inner receptacle member 60 can support the vessel 700 via threads 65 (of the receptacle member 60) engaging threads or engagement threads 704 (of vessel 700). As the inner receptacle member 60 moves up and down (by operation as described herein), so does the vessel 700. Accordingly, the inner receptacle member 60 movably supports the vessel 700. As described herein, the vessel 700 can include a one-way valve 705. As the vessel 700 is moved down, the one-way valve 705 permits flow of liquid to be sucked from the vessel 700 into a pumping chamber 68' (FIG. 10). At a top end of the chamber 68' (above the vessel 700) is the further or second one-way valve, i.e. the one-way valve 56A associated with the outer receptacle member 50. The one-way valve 56A permits liquid additive to flow from the pumping chamber 68' into the chamber 25 as the inner receptacle member 60 moves upward—so as to purge additive from the pumping chamber 68'.

Relatedly, additive can be pulled into the pumping chamber 68' by the inner receptacle member 60 and attached vessel 700 being pulled down, as shown in FIG. 10. That is, as the inner receptacle member 60 and the vessel is pulled down, the one way valve 56A blocks fluid flow from coming into the pumping chamber 60' from the chamber 25. As a result, a vacuum is created that draws liquid from the additive vessel 700 through the one way valve 705. That is, additive is drawn into the pumping chamber 68'. Accordingly, such manipulation provides for additive to be passed into the pumping chamber 68'- and such additive "queued" to be dispensed. Then, the inner receptacle member 60 with vessel 700 can be driven back to its starting position or upwards. As result, additive in the pumping chamber 68' is compressed and forced through the housing valve 56. That is, the additive is forced into the chamber 25. The one-way valve 705, of the pod 700, blocks the flow of fluid/additive from returning into the vessel 700. Positive pressure, accordingly, is produced in what can be described as a "compression stroke". Such compression stroke results in dispensing the contents of the pumping chamber or pump chamber 68' into the chamber 25. The process can be described as reciprocation of the inner receptacle member 60 with additive vessel 700. The process can be described as a single piston stroke, which includes downward movement of the inner receptacle member 60 (with pod 700) to draw additive into the pumping chamber 68' (from the pod) and upward movement of the member 60 to force additive out of the pumping chamber 68' and into the chamber 25.

The volume dispensed from the pumping chamber 68' during such a single piston stroke can be modulated linearly by modifying the piston stroke length, i.e. how much the piston moves up and down in the arrangement of FIG. 10. Multiple piston strokes can be used to dispense larger quantities. By design, the volume of the pumping chamber 68' can be configured to be as small as practically possible when the inner receptacle member 60 with vessel is in the starting position, to avoid wasting additive liquid when a depleted additive vessel 700 is withdrawn from the receptacle. The inner receptacle member 60 with vessel 700 can collectively be described as a piston or piston assembly.

As described above, actuation of the inner receptacle member 60 can be performed utilizing drive assembly 70, as shown in FIG. 12 for example. That is, the inner receptacle member 60 can be moved up and down by rotation of the main drive gear 73, as described above. Other drive arrangements can be utilized so as to actuate or motorized the inner receptacle member 60 within the outer receptacle member 50. That is, the disclosure is not limited to the drive assembly 70 with main drive gear 73. For example, the inner receptacle member 60 can include a rack of gears on an outer surface of the inner receptacle member 60. A rotatable gear could be engaged with such rack of gears on the outer surface. The rotatable gear could be motorized and controlled by a suitable motor, which is in turn controlled by the controller 160. Accordingly, a "rack and pinion" arrangement could be utilized so as to drive the inner receptacle member 60 up and down, i.e., so as to "pump" additive from the internal volume 702 of the vessel 700 into the pumping chamber 68', and subsequently into the chamber 25 for consumption—and to mix with liquid in the chamber 25. In addition, the inner receptacle member 60 could be pneumatically driven up and down. That is, an actuator or air cylinder could be connected to the inner receptacle member 60 and controlled utilizing a pneumatic device. Other types of actuators could be used so as to reciprocate the inner receptacle member 60 up and down, so as to provide the desired pumping action.

In accordance with at least some embodiments of the disclosure, the dispensing mechanism can be manually controlled, so that a dispense of additive can be performed by manual or physical operation of a human user. For example, a user might manually turn a shaft that is attached to a pinion gear, and the pinion gear actuate or drive a gear rack. The gear rack can be attached to or part of the inner receptacle member 60. Accordingly, the inner receptacle member 60 can be manually actuated by a "rack and pinion" arrangement, that is controlled by a user.

The vessel 700 can be attached to the inner receptacle member 60 using threads, as described above. The vessel 700 can be removably attached to the member 60 in other manners. For example, threads can be provided on the vessel 700 so as to mate or match with threads on the inner receptacle member 60 in any location of such two components. Accordingly, other thread arrangements can be provided in lieu of the particular thread arrangements described herein.

Hereinafter, various features relating to level sensing will be described according to principles of the disclosure. As described herein, a beverage apparatus can contain a consumable liquid that contains one or more additives. The consumable liquid can be contained in a chamber 25 or interior volume of the beverage apparatus. A controller 160 of the beverage apparatus can control dispensing of the additive, by a dispensing assembly, so as to maintain a targeted concentration of additive in the consumable liquid and/or so as to attain a desired concentration of the additive in the consumable liquid. The controller can utilize a variety of data in the dispensing of the additive. Such data can be input from a variety of sources. One type of data that may be input and utilized by the controller can include data that relates to a level or liquid level of the consumable liquid in the beverage apparatus or bottle.

For example, with reference to FIG. 47, a fluid sensor or fluid level sensor may be in the form of an ultrasonic device or ultrasonic sensor 953. The fluid level sensor can emit a sound wave. A portion of the sound wave can be returned as a result of encountering a top surface of the consumable liquid in the chamber. Accordingly, the fluid level sensor can use "round trip time" for the reflected sound wave or waves to measure the height of a fluid or water column within the chamber. Based on the height of the fluid column within the chamber, the controller can be provided with known data so as to determine, i.e. calculate based on diameter or shape for example, the fill volume of the chamber. According to principles of the disclosure, a function or lookup table can be used to match or "map" the observed height of the liquid in the beverage apparatus, i.e. the bottle, to the particular volume that corresponds to such liquid height. Various arrangements and processes can be used to sense level of liquid in a beverage apparatus/bottle of the disclosure.

Hereinafter, various features further features of a beverage apparatus 10 of the disclosure will be described including features relating to level sensing, i.e. liquid level sensing. The liquid level sensing described herein can be performed in the environment of any of the beverage apparatuses as described herein, as may be desired. For example, liquid level sensing can be performed in the environment of the beverage apparatus 10 shown, for example, in FIGS. 2, 46 and 47. For purposes of illustration of level sensing, FIG. 47 is a schematic diagram of a beverage apparatus 10 similar to the beverage apparatus 10 of FIG. 2.

As shown in FIG. 47, the beverage apparatus 10 can include a beverage chamber housing 20. The beverage chamber housing 20 can include a chamber 25 with an internal volume 25'. A consumable liquid with additive can be contained in the chamber 25. The beverage apparatus 10 can include a removable cap 27. A user can remove the removable cap 27 so as to fill the beverage apparatus 10 with liquid. In accordance with at least some embodiments, a dispensing assembly 40 can be described as including the dispense mechanism 70. The dispense mechanism 70 can be associated with or include vessel 700. As shown in FIG. 47, the vessel 700 can include a lower or bottom surface 715. A tag, RFID tag, or electronic tag 710 can be mounted on the bottom surface 715.

The apparatus controller 160 can include and/or be in communication with various sensors, mechanisms, devices, gadgets, systems, and/or apparatus, which can collectively be described as "elements" 951, as shown in FIG. 47. One element 951 can be an ultrasonic sensor 953, i.e. an ultrasonic device 953, as shown in FIG. 47. The ultrasonic sensor 953 can be connected to the controller 160 utilizing a suitable communication pathway 957. The communication pathway 957 can be in the form of a wire, cable, wireless link, embedded wire that is embedded in structure of the beverage apparatus 10, embedded cable, or other communication pathway. The communication pathway(s) 957 can be provided between any of the elements described herein and/or the controller 160 and can provide communications so as to provide control of a particular element and/or can provide power to a particular element. The beverage apparatus or bottle can include one or more power sources, such as one or more batteries, that can power the various components of the beverage apparatus. The controller can include a battery 954 as shown in FIG. 47. The battery 954 can provide power to the controller and can provide power to any other component of the beverage apparatus 10. In general, a beverage apparatus as described herein can be provided with one or more batteries or other power source. Such power source can be rechargeable. The controller can control power being applied to a particular component, so as to operate such component.

The beverage apparatus 10 can also include other elements 951. The other elements 951 can include a clock 952. The clock 952 can perform various operations associated with the passage of time. The clock 952 can, in a routine manner, track time including days, hours, minutes, seconds, milliseconds, etc. The clock 952 can also perform various related functions including stopwatch operations, determining a duration of time, determining when a particular time has been attained, determining a differential between two observed times, and other operations. In at least some embodiments of the disclosure, the controller 160 can also perform such operations. That is, in some embodiments, the clock 952 can be limited to simply outputting time values to the controller 160—and the controller 160 performing various operations based on such output time values. For example, a time value that is output by the clock 952 might be 10102020day101521 hour to denote Oct. 10, 2020 at 10:15:21 AM. It should be appreciated that the content, nature, and format of such data can be varied as desired. The clock 952 can be in the controller 160 and/or be a part of the controller 160.

The elements 951 can include an accelerometer 955. The accelerometer 955 can monitor acceleration of the beverage apparatus 10 in the x-y-z space and output representative data to the controller 160. The elements 951 can also include an angle position sensor or angle sensor 956. The angle sensor 956 can monitor an angle at which the beverage apparatus 10 is positioned. The accelerometer 955 can measure angle of the beverage apparatus 10. Each of the elements 951 can perform processing of data that is then output to the controller 160 and/or the elements 951 can output unprocessed or raw data to the controller 160. In the latter case, the controller 160 can process such raw data so as to generate requisite information. For example, the angle sensor 956 can, itself, perform processing to output an angle such as 51°. On the other hand, the angle sensor 956 can output raw data and the controller 160 determine the angle based on the raw data. According to at least one embodiment of the disclosure, the accelerometer can sense or determine angle of the beverage apparatus 10. In accordance with at least some embodiments, the angle sensor 956 can be or include the accelerometer 955. The accelerometer 955 can be or include an angle sensor 956.

Additionally, the elements 951 provided in the beverage apparatus 10 can include one or more temperature sensors. The temperature sensors can include a liquid temperature sensor 905 and an apparatus temperature sensor 906. The liquid temperature sensor 905 can be provided in or adjacent to the chamber 25 so as to be exposed to the consumable liquid in the beverage apparatus 10. Accordingly, a temperature of the consumable liquid in the beverage apparatus 10 can be determined by the liquid temperature sensor 905. The apparatus temperature sensor 906 can be provided within structure of the beverage apparatus 10 so as to measure an operating temperature of the beverage apparatus. The apparatus temperature sensor 906 or an additional temperature sensor can be provided on or exposed to an exterior wall of the beverage apparatus 10 so as to input an ambient temperature in which the beverage apparatus 10 is disposed. Multiple temperature sensors can be utilized so as to input both internal operating temperature of the beverage apparatus as well as ambient temperature of the beverage apparatus. Such various temperature sensing can be utilized in operation of the beverage apparatus as described herein. According to principles of the disclosure, temperature and/or temperature differentials can be considered in the processing of the disclosure.

As shown in FIG. 2, the inner receptacle member 60 and the pod 700, received into the member 60, can be centered in the beverage apparatus or bottle 10. However, the disclosure is not limited to such arrangement. For example, as shown in the schematic diagram of FIG. 47, the vessel 700 and structure into which the vessel 700 is received, as well the housing valve 56 and other dispensing structure, can be offset from center. In some embodiments, the skirt 113 can also be offset. In some embodiments, the skirt can be provided with flexibility so as to accommodate the off-center vessel 700 and inner receptacle member 60 into which the vessel 700 is received. Relatedly, it is appreciated that a beverage apparatus 10 of the disclosure is not limited to retaining and dispensing one pod. That is, a beverage apparatus 10 of the disclosure can retain two or more pods and respective dispensing assemblies, in accordance with at least some embodiments of the disclosure. A skirt 113 can be provided to include apertures for each of the pods and dispensing assemblies that are provided in the beverage apparatus.

As described herein, "operatively connected" can mean to be connected through wires, cables, wirelessly, or via other interface lines such that one or more controllers can control various functionality and/or operation of a component. Such functionality/operation of a component can include an on/off status, a disposition, an open/close status, and/or a position status, for example.

A user interface 120 and buttons of such user interface may be a part of a controller 160 of the beverage apparatus or as a separate component or components that are attached, via interface lines or communication pathways, to the controller.

In various processing described herein and illustrated by flowcharts or otherwise described, variables can be used in various processes. Such processes can include routines, subroutines, and steps, for example. The various variables can be passed between processes as may be needed in accord with the instructions provided to an apparatus computer processor. Such an apparatus computer processor can include the apparatus computer processor (ACP) as described herein and/or other processing components. The various variables can be global variables that are available to the various processes, such as between a calling process and a subroutine, for example.

Figure 23:
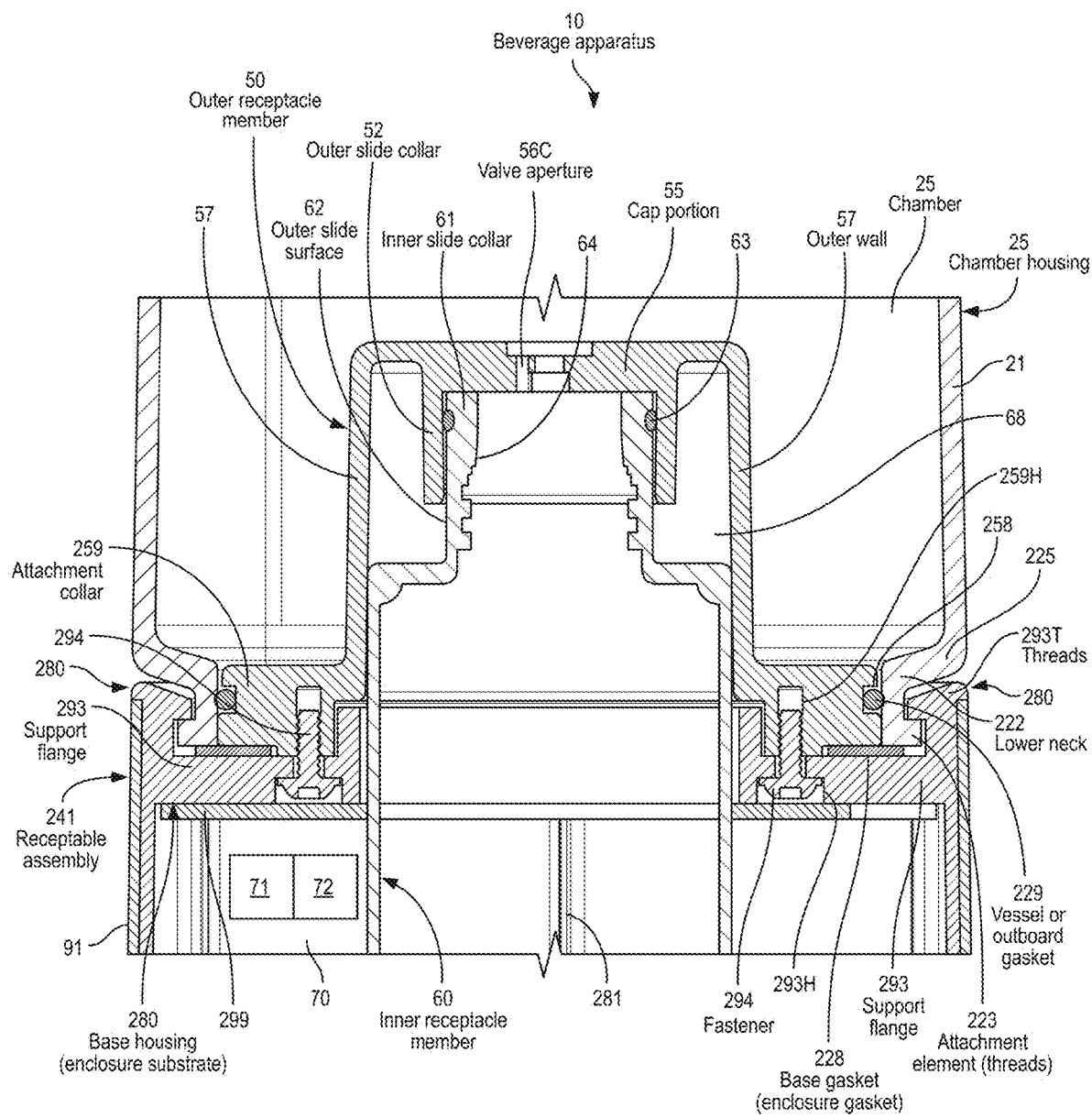
FIG. 23 is a schematic, perspective cross-sectional view of a beverage apparatus 10, according to principles of the disclosure.
Figure 24:
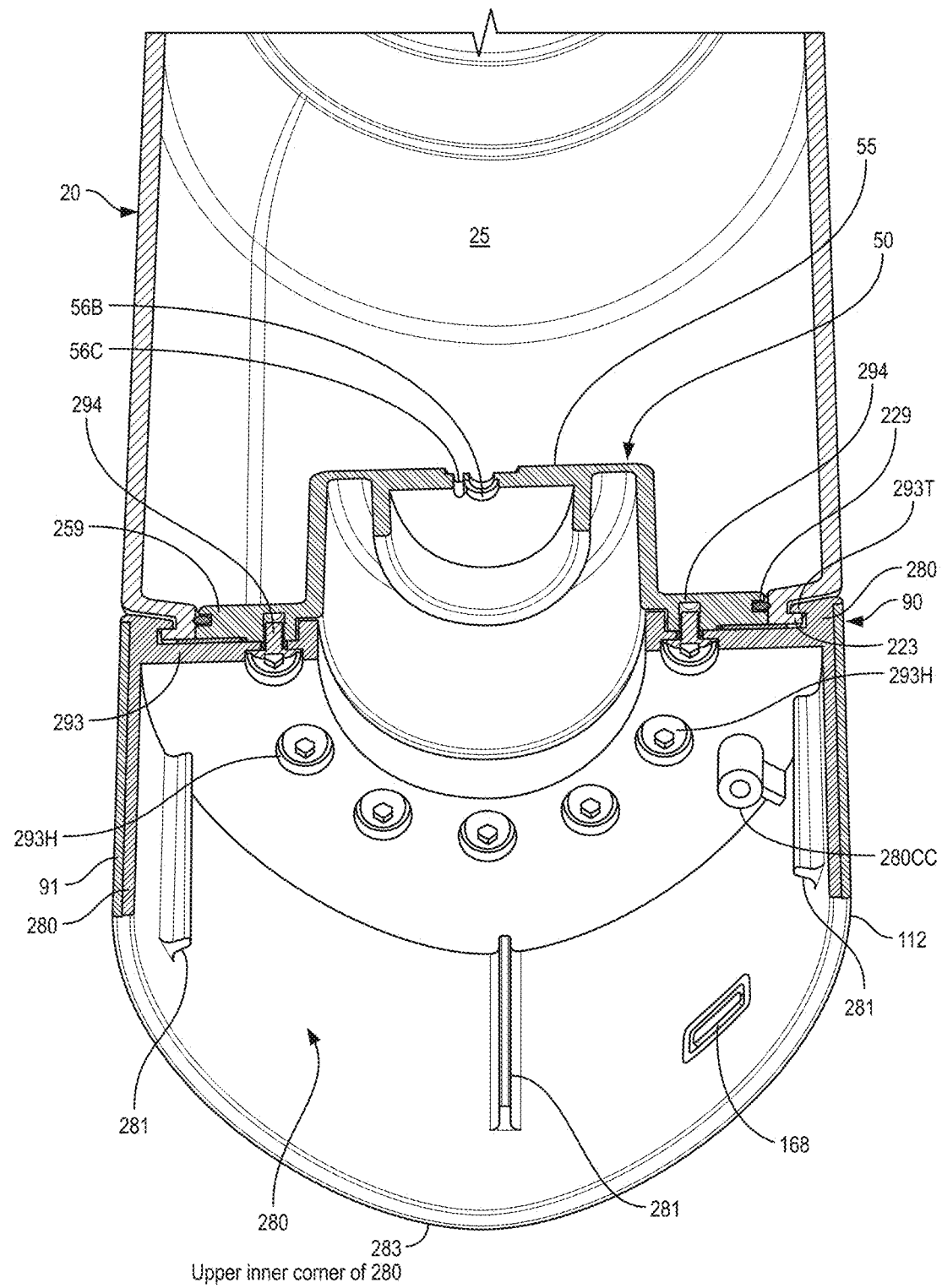
FIG. 24 is a cutaway cross-sectional view of a beverage apparatus 10 the same as or similar to the beverage apparatus 10 of FIG. 23, according to principles of the disclosure.

FIG. 49 is a top perspective view of a beverage apparatus 10 the same as or similar to the beverage apparatus of FIG. 2 or FIG. 23, for example. FIG. 50 is a bottom perspective view of a beverage apparatus 10 of FIG. 49, without pod, according to principles of the disclosure. FIG. 51 is a bottom perspective view of the beverage apparatus of FIG. 49, with pod 700, according to principles of the disclosure. FIG. 52 is a bottom view of the beverage apparatus of FIG. 49 (not to scale vis-à-vis FIG. 51), without pod 700, according to principles of the disclosure.

As shown, the beverage apparatus 10 includes a chamber housing 20 that is mounted onto a base assembly 90. The base assembly 90 can include a receptacle assembly 41. The receptacle assembly 41 can include an outer receptacle member 50, as described above. The outer receptacle member 50 can be described as having a "volcano" shape. FIG. 49 also illustratively shows attachment collar 259 (see FIGS. 23 and 24).

FIG. 51 shows that a pod 700 has been inserted into the receptacle assembly 41. As shown in FIG. 52, the base assembly can include threads 65, a plurality of wedges or securement wedges 65W, rotational stops to limit rotation of the pod 700 once the pod is threaded on a sufficient amount, and related structure, which are provided to secure the pod 700 into the receptacle assembly 41. FIG. 52 also shows a plurality of contact plates or contacts 138 that are provided to contact with a charging base, so as to charge the beverage apparatus 10. FIG. 51 also shows a bottom surface 715 of the pod 700. The bottom surface 715 can include an RFID tag 710. An RFID tag 710 can be mounted to the bottom surface 715. The RFID tag 710 can extend across the entirety of the bottom surface 715, such that the RFID tag 710 appears to be the bottom surface of the pod 700.

Figure 53:
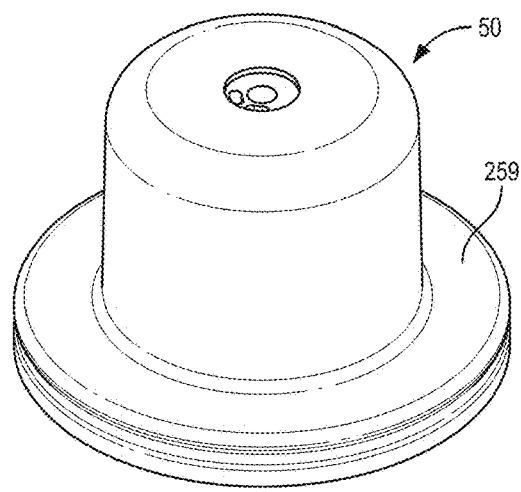
FIG. 53 is a perspective view of an outer receptacle member 50 with attachment collar 259, the same as to similar to the arrangement of FIG. 23, according to principles of the disclosure.
Figure 54:
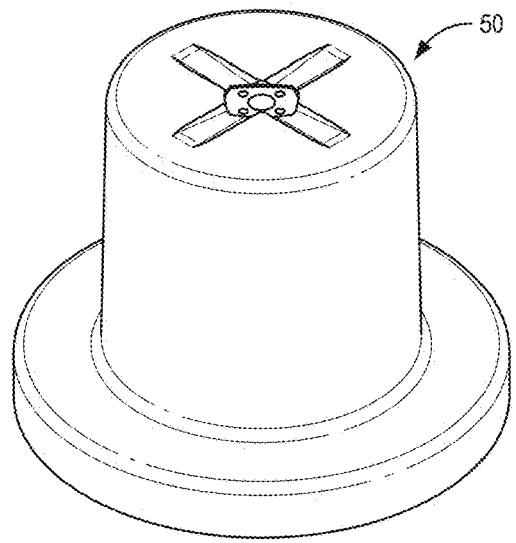
FIG. 54 is a perspective view of an outer receptacle member 50 of varied construct, according to principles of the disclosure.
Figure 55:
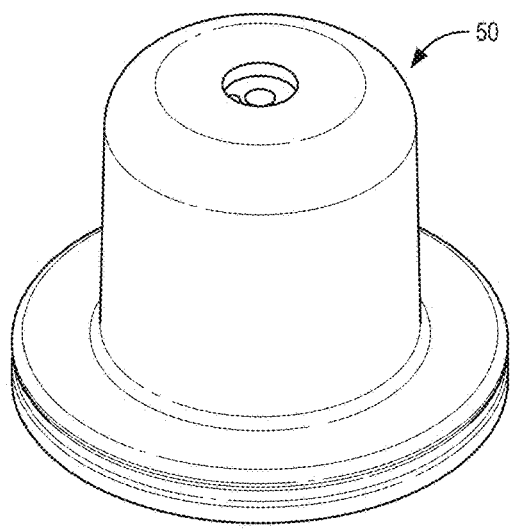
FIG. 55 is a perspective view of an outer receptacle member 50 of varied construct, according to principles of the disclosure.
Figure 56:
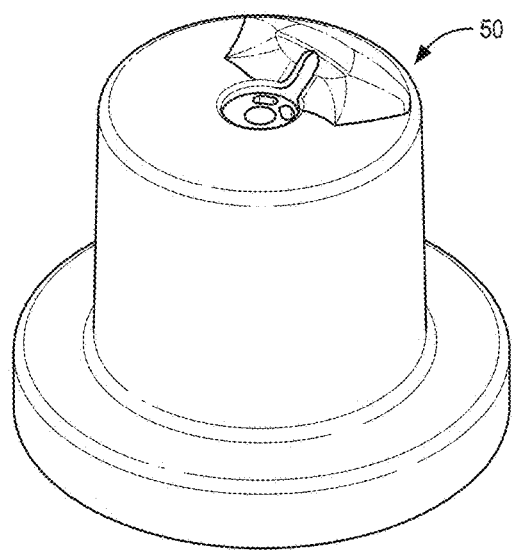
FIG. 56 is a perspective view of an outer receptacle member 50 of varied construct, according to principles of the disclosure.

As described above, FIG. 49 shows attachment collar 259 of the beverage apparatus 10. FIG. 53 is a perspective view of an outer receptacle member 50 with attachment collar 259, the same as or similar to the arrangement of FIG. 23 and FIG. 49, according to principles of the disclosure. This design has a flat top with the valve barely inset into the surface of the top. This inset makes it so that running a finger or sponge across the valve, for example an umbrella valve, will not cause the valve to be pulled out. The cleaning sponge can glide up the ramped sides of the valve top. FIG. 54 is a perspective view of an outer receptacle member 50 of varied construct, according to principles of the disclosure. This design provides radial jets. This construct has a slightly inset valve and is slightly cut out in four directions to provide directionality to the dispense of additive. FIG. 55 is a perspective view of an outer receptacle member 50 of varied construct, according to principles of the disclosure. This "caldera" design has a totally inset valve and a bowl around the valve to capture product, i.e. a dispensed additive, such that the product does not immediately go into solution with the water. FIG. 56 is a perspective view of an outer receptacle member 50 of varied construct, according to principles of the disclosure. This construct provides a ramp or groove. Product, i.e. dispensed additive, can flow through and along the groove in conjunction with dispersing into the liquid contained in the beverage apparatus.

According to principles of the disclosure, description is set forth herein that provides association or mapping of a first value or set of values to a second value or set of values. Such association can be performed through a relationship, equation, or through a lookup table, for example. Accordingly, processing as described herein as mapping first values or set of values to second value(s) or set of values using an equation can, instead, be performed in whole or in part by using a lookup table or other association mechanism.

According to principles of the disclosure, various patterns or schemes can be utilized such that the user can effectively communicate with the beverage apparatus 10, as may be desired. For example, one push of a particular button could dictate to the beverage apparatus 10 that one additive or an amount of additive should be released, where as two quick pushes of the particular button could dictate that another amount of additive would be dispensed. A push of a button and hold of that same button could also be input by the controller of the beverage apparatus, and dictate that a dispense or other operation should be performed, such as dispensing additive to attain a predetermined concentration, for example.

As described herein, the beverage apparatus 10 of the disclosure can include various mating parts. Such mating parts can provide attachment and stability relative to each other. It is appreciated that mating structure as described herein can be reversed as desired. For example, a groove on a first part that engages with a ridge on a second part can be reversed or flipped, i.e. such that the ridge is provided on the first part and the groove is provided on the second part.

Teachings of the incorporated by reference patent applications regarding user interface can be utilized in conjunction with the teachings described herein. Other features of the herein incorporated patent applications can also be utilized in conjunction with the teachings described herein.

In embodiments of the disclosure, a computer processor of the beverage apparatus 10 may provide information to the user regarding metrics associated with additives dispensed or other operation of the beverage apparatus or beverage system of the disclosure.

Features as disclosed herein may be described in context of particular units or dimensions. It is appreciated that alternative units or dimensions can be used as desired.

Additionally, conversion can be performed between units or dimensions as may be desired.

As described herein, a controller 160 can include an apparatus computer processor (ACP) 160. The processing components of the beverage apparatus and/or controller may be described as an apparatus computer processor (ACP), an apparatus processing portion (APP), a computer processor portion (CPP), a computer processing portion (CPP), a processor, processing portion, or similar language. The processing components can include or be in the form of a central processing unit (CPU) and include one or more processing components.

In this disclosure, quotation marks, such as with "first element", have been used to enhance readability and/or to parse out a term or phrase for clarity.

All documents referenced herein are hereby incorporated by reference in their entirety.

The terms dispersion, dispensing, dispense, and other similar terms have been used herein to convey manipulation of a liquid, fluid, or other material.

It will be appreciated that features, elements and/or characteristics described with respect to one embodiment of the disclosure may be variously used with other embodiments of the disclosure as may be desired.

The detailed description has set forth various embodiments of systems, apparatus, devices, and/or processes, for example, using block diagrams, flowcharts, and/or examples in accordance with the principles of the disclosure. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Particular embodiments of the subject matter have been described. In some cases, the actions described in accordance with one or more of the embodiments may be performed in a different order and still achieve desirable results. In addition, the processes described and/or depicted in the accompanying figures do not necessarily require the particular order described and/or shown, or sequential order, to achieve desirable results. In certain implementations, multitasking and parallel processing may be advantageous.

As used herein, "data" and "information" have been used interchangeably.

Any motorized structure as described herein may utilize gears, linkages, sprocket with chain, or other known mechanical arrangement so as to transfer requisite motion and/or energy from one mechanical component to another mechanical component.

Hereinafter, further aspects of implementation of the systems and methods of the disclosure will be described.

As described herein, at least some embodiments of the system of the disclosure and various processes, of embodiments, are described as being performed by one or more computer processors. Such one or more computer processors may be in the form of a "processing machine," i.e. a tangibly embodied machine. As used herein, the term "processing machine" is to be understood to include at least one processor that uses at least one memory. Such processing machine can be constituted by, integrated into, or a part of one or more systems as described herein. Such one or more systems can include one or more controllers. A processing machine of the disclosure can be in the form of a controller or constituted by a controller or controllers. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be described as a program, software program, code or software.

As noted herein, the processing machine, which may be constituted, for example, by the particular system and/or systems described herein, executes the instructions that are stored in the memory or memories to process data. This processing of data may be in response to commands by a user or users of the processing machine, in response to previous processing, in response to a request by another processing machine and/or any other input, for example.

As noted herein, the machine used to implement the disclosure may be in the form of a processing machine. The processing machine may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing one or more steps of the processes of the disclosure.

The processing machine used to implement the invention may utilize a suitable operating system. Thus, embodiments of the disclosure may include a processing machine running the Windows 10 operating system, the Windows 8 operating system, Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the disclosure as described herein, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner, such as over a network. Additionally, the memory may include two or more portions of memory in two or more physical locations.

To explain further, processing is described herein that can be performed by various components and various memories. However, it is appreciated that the processing performed by two distinct components as described herein may, in accordance with a further embodiment of the disclosure, be performed by a single component. Further, the processing performed by one distinct component as described herein may be performed by two distinct components. In a similar manner, the memory storage performed by two distinct memory portions as described herein may, in accordance with a further embodiment of the disclosure, be performed by a single memory portion. Further, the memory storage performed by one distinct memory portion as described herein may be performed by two memory portions.

As described herein, various technologies may be used to provide communication between the various processors and/or memories, as well as to allow the processors and/or the memories of the disclosure to communicate with any other entity or processor or component, i.e., so as to obtain further instructions or to access and use remote memory stores, for example. Such technologies used to provide such communication might include wires, a circuit board, connection element, network, the Internet, Intranet, Gxtranet, LAN, an Gthernet, or any client server system that provides communication, for example. Such communications technologies may use any suitable protocol such as TCP/IP, UDP, or OSI, for example.

As described above, a set of instructions is used in the processing of the disclosure on a processing machine, for example. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, can be converted to machine language using a compiler, assembler or interpreter. The machine language can be binary coded machine instructions that are specific to a particular type of processing machine, i.e., to a particular type of computer, for example. The computer understands the machine language.

A suitable programming language may be used in accordance with the various embodiments of the disclosure. Illustratively, the programming language used may include assembly language, Ada, APL, Basic, C, C++, COBOL, dBase, Forth, Fortran, Java, Modula-2, Pascal, Prolog, RGXX, Visual Basic, and/or JavaScript, for example. Further, it is not necessary that a single type of instructions or single programming language be utilized in conjunction with the operation of the systems and methods of the disclosure. Rather, any number of different programming languages may be utilized in any combination as is necessary or desirable.

Also, the instructions and/or data used in the practice of the disclosure may utilize any compression or encryption technique or algorithm, as may be desired. An encryption module might be used to encrypt data. Further, files or other data may be decrypted using a suitable decryption module, for example.

As described above, a system of the disclosure may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, as also described herein, the medium may be in the form of paper, paper transparencies, a compact disk, a DVD, an integrated circuit, a hard disk, a floppy disk, an optical disk, a magnetic tape, a RAM, a ROM, a PROM, a GPROM, a wire, a cable, a fiber, communications channel, a satellite transmissions or other remote transmission, as well as any other medium or source of data that may be read by the processors of the disclosure.

Further, the memory or memories used in the processing machine that implements the disclosure may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods of the disclosure, a variety of "user interfaces" may be utilized to allow a user to interface with the processing machine or machines that are used to implement the disclosure. As used herein, a user interface can include any hardware, software, or combination of hardware and software used by the processing machine that allows a user to interact with the processing machine. A user interface may be in the form of a dialogue screen for example. A user interface may also include any of a mouse, touch screen, screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface can be any device that provides communication between a user and a processing machine. The information provided by the user to the processing machine through the user interface may be in the form of a command, a selection of data, or some other input, for example.

As discussed herein, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the systems and methods of the disclosure, it is not necessary that a human user actually interact with a user interface used by the processing machine of the disclosure. Rather, it is also contemplated that the user interface of the disclosure might interact, i.e., convey and receive information, with another processing machine, rather than a human user. Accordingly, the other processing machine might be described as a user. Further, it is contemplated that a user interface utilized in the systems and methods of the disclosure may interact partially with another processing machine or processing machines, while also interacting partially with a human user.

It is appreciated that the various components of embodiments of the disclosure may be made from any of a variety of materials including, for example, metal, copper, stainless steel, steel, nickel, titanium, silver, aluminum, plastic, plastic resin, nylon, composite material, glass, Delrin, and/or ceramic, for example, or any other material as may be desired. Components of embodiments of the disclosure may be made of clear materials, transparent materials, opaque materials, colored materials, and BPA (Bisphenol A) free materials, for example, as may be desired. A beverage apparatus or bottle of the disclosure can be 8-12 inches high, or any other size as may be desired. The beverage apparatus or bottle of the disclosure can hold 500 milliliters (mL) (16.9 fl oz) to 625 mL (21.1 fl oz) or be of any other volume as may be desired.

A variety of production techniques may be used to make the apparatuses as described herein. For example, suitable casting and/or injection molding, plastic injection molding, metal injection molding, and other molding techniques, bending techniques, and other manufacturing techniques might be utilized. Also, components of the apparatuses may be integrally formed, as may be desired, in particular when using casting or molding construction techniques. Components of the apparatuses can be formed in pieces and joined together such as by bonding. For example, the charging contacts on the bottle, i.e. the connection assembly 130 or parts of the connection assembly 130, can be constructed using metal injection molded technology. Such can allow for options in geometry of the skirt 113 and other structure, for example.

For example, attachment mechanisms that can be used (in attachment of components of the disclosure) include ultrasonic welding, adhesive, glue, glue in conjunction with O-rings, clips, clips in conjunction with O-rings, and other attachment mechanisms. Such clips can include the locking member 112C as shown in FIG. 18, for example.

The various apparatuses and components of the apparatuses, as described herein, may be provided in various sizes, shapes, and/or dimensions, as desired. It will be appreciated that features, elements and/or characteristics described with respect to one embodiment of the disclosure may be variously used with other embodiments of the disclosure as may be desired.

It will be appreciated that the effects of the present disclosure are not limited to the above-mentioned effects, and other effects, which are not mentioned herein, will be apparent to those in the art from the disclosure and accompanying claims.

Although the preferred embodiments of the present disclosure have been disclosed for illustrative purposes, those skilled in the art will appreciate that various modifications, additions and substitutions are possible, without departing from the scope and spirit of the disclosure and accompanying claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

It will be understood that when an element or layer is referred to as being "onto" another element or layer, the element or layer can be directly on another element or layer or intervening elements or layers.

Examples include "attached onto", secured onto", and "provided onto". In contrast, when an element is referred to as being "directly onto" another element or layer, there are no intervening elements or layers present. As used herein, "onto" and "on to" have been used interchangeably.

It will be understood that when an element or layer is referred to as being "attached to" another element or layer, the element or layer can be directly attached to the another element or layer or intervening elements or layers. In contrast, when an element is referred to as being "attached directly to" another element or layer, there are no intervening elements or layers present. It will be understood that such relationship also is to be understood with regard to: "secured to" versus "secured directly to"; "provided to" versus "provided directly to"; "connected to" versus "connected directly to" and similar language.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper", "top", "bottom", "left", "right" and the like, may be used herein for ease of description to describe the relationship of one element or feature to another element(s) or feature(s) as illustrated in the figures. It will be understood that spatially relative terms are intended to encompass different orientations of structures in use or operation, in addition to the orientation depicted in the figures. For example, if a device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein should be interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to diagrams and/or cross-section illustrations, for example, that are schematic illustrations of idealized embodiments (and intermediate structures) of the disclosure.

As such, variations from the shapes of the illustrations as a result, for example, of manufacturing techniques and/or tolerances, are to be expected. Thus, embodiments of the disclosure should not be construed as limited to the particular shapes of components illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect and/or use such feature, structure, or characteristic in connection with other ones of the embodiments.

Embodiments are also intended to include or otherwise cover methods of using and methods of manufacturing any or all of the elements disclosed herein.

First Set of Illustrative Embodiments

Embodiment 1. A beverage apparatus, the beverage apparatus being hand-holdable by a user of the beverage apparatus to be portable, the beverage apparatus comprising:
  a chamber housing that includes a chamber, and the chamber defining an internal volume for storing a consumable liquid in the chamber;
  a dispensing assembly including:
    a receptacle assembly that includes an inner receptacle member and an outer receptacle member, and the inner receptacle member slidably retained in the outer receptacle member; and
    the inner receptacle member for retaining a vessel with additive, and the inner receptacle member extending into the chamber so as to be surrounded by the internal volume; and
    a drive assembly operatively controllable by a controller to output, by engaging the inner receptacle member, the additive from the vessel into the consumable liquid; and
  the controller, and the controller controls the drive assembly so as to control the output of additive.

Embodiment 2. The beverage apparatus of embodiment 1, the outer receptacle member extending into the chamber so as to be surrounded by the internal volume.

Embodiment 3. The beverage apparatus of embodiment 1, the outer receptacle member including an annular outer slide collar, and the inner receptacle member including an annular inner slide collar, and the outer slide collar slidably receiving the inner slide collar.

Embodiment 4. The beverage apparatus of embodiment 3, the outer receptacle member further including an outer wall and a cap portion, and the cap portion forming a cap of the outer receptacle member, and the cap portion connected to and supported by the outer wall, and the cap portion connected to and supporting the outer slide collar.

Embodiment 5. The beverage apparatus of embodiment 4, the cap portion including a valve for controlling output of the additive into the consumable liquid, and the valve including a one-way valve.

Embodiment 6. The beverage apparatus of embodiment 5, the one way valve including an umbrella valve.

Embodiment 7. The beverage apparatus of embodiment 4, the outer wall extending down from the cap portion, and the outer slide collar extending down from the cap portion.

Embodiment 8. The beverage apparatus of embodiment 3, the inner slide collar including an outer slide surface and an inner slide surface, and the outer slide surface slidably engaging with the outer slide collar, and the inner slide surface for engaging with the vessel.

Embodiment 9. The beverage apparatus of embodiment 8, the inner slide surface including threads for engaging with the vessel.

Embodiment 10. The beverage apparatus of embodiment 1, the outer receptacle member further including an attachment flange, and
  the beverage apparatus further a base housing that includes a support flange, and
  the attachment flange connected to the support flange by an attachment mechanism.

Embodiment 11. The beverage apparatus of embodiment 10, the attachment mechanism includes a plurality of screws.

Embodiment 12. The beverage apparatus of embodiment 10, further including a base gasket and a side gasket, and the chamber housing including a neck, and
  the base gasket disposed between the attachment flange and the support flange; and
  the side gasket disposed between the attachment flange and the neck of the chamber housing.

Embodiment 13. The beverage apparatus of embodiment 12, the neck including a first attachment element that is removably engaged with a second attachment element of the base housing.

Embodiment 14. The beverage apparatus of embodiment 13, the first attachment element is a first screw thread and the second attachment is a second screw thread that is threadably engaged with the first screw thread so as to secure the chamber housing onto the receptacle assembly by screwing the chamber housing onto the base housing.

Embodiment 15. The beverage apparatus of embodiment 14, the base housing is part of the receptacle housing.

Embodiment 16. The beverage apparatus of embodiment 1, the inner receptacle member extending into the chamber so as to be surrounded by the internal volume on four sides around the inner receptacle member; and the outer receptacle member extending into the chamber so as to be surrounded by the internal volume on four sides around the outer receptacle member.

Embodiment 17. The beverage apparatus of embodiment 1, the drive assembly including a motor and gear assembly, the motor driving the gear assembly to cause the inner receptacle member to reciprocate, and the outer receptacle member including a housing one-way valve.

Embodiment 18. The beverage apparatus of embodiment 1, the beverage apparatus including the vessel, and the vessel including a vessel one-way valve; and the vessel further including a plunger such that a vessel volume, of the vessel, is variable.

Second Set of Illustrative Embodiments

Embodiment 1. A beverage apparatus, the beverage apparatus being hand-holdable by a user of the beverage apparatus to be portable, the beverage apparatus comprising:

a chamber housing that includes a chamber, and the chamber defining an internal volume for storing a consumable liquid in the chamber;

a controller that includes a processor and a database portion, and the processor performing processing based on instructions in the database portion;

a dispensing assembly including:
   a receptacle assembly that includes a receptacle member with a bay; and the receptacle assembly for retaining a vessel, with additive, in the bay, and the receptacle member and bay extending into the chamber so as to be surrounded by the internal volume; and
   a dispense mechanism controlled by the controller to perform dispensing of the additive from the vessel into the consumable liquid.

Embodiment 2. The beverage apparatus of embodiment 1, the receptacle assembly includes a housing valve, and the housing valve selectively allowing passage of liquid from the bay into the chamber.

Embodiment 3. The beverage apparatus of embodiment 2, the dispense mechanism includes a motor, and the dispense mechanism pushes liquid: (1) from the bay, (2) through the housing valve, and (3) into the chamber.

Embodiment 4. The beverage apparatus of embodiment 3, the housing valve is an umbrella valve.

Embodiment 5. The beverage apparatus of embodiment 2, the housing valve is an umbrella valve.

Embodiment 6. The beverage apparatus of embodiment 1, the receptacle member is an inner receptacle member, and the receptacle assembly includes the inner receptacle member and an outer receptacle member, and the inner receptacle member slidably retained in the outer receptacle member.

Embodiment 7. The beverage apparatus of embodiment 6, the dispense mechanism including a motor with gear that drives the inner receptacle member so that the inner receptacle member slides in the outer receptacle member.

Embodiment 8. The beverage apparatus of embodiment 6, the bay is defined by an inner surface of the inner receptacle member, the inner receptacle member is positioned in and reciprocates within the outer receptacle member, and the bay is positioned in both the inner receptacle member and the outer receptacle member.

Embodiment 9. The beverage apparatus of embodiment 6, the outer receptacle includes an outer wall that forms a portion of the chamber.

Embodiment 10. The beverage apparatus of embodiment 6, the outer receptacle member including an outer slide collar, the outer slide collar including an inner slide surface, and the inner slide surface slidably engaging with the inner receptacle member.

Embodiment 11. The beverage apparatus of embodiment 10, further including an annular gasket about the inner receptacle member, and the annular gasket providing a seal between the inner slide surface, of the outer slide collar 52, and the inner receptacle member 60.

Embodiment 12. The beverage apparatus of embodiment 1, the dispense mechanism includes a motor, and the dispense mechanism reciprocates a portion of the receptacle member to dispense the additive.

Embodiment 13. The beverage apparatus of embodiment 12, the receptacle assembly including a housing valve to provide for additive to pass into the chamber.

Embodiment 14. The beverage apparatus of embodiment 1, the dispensing assembly positioned in a base assembly of the beverage apparatus 10, and the base assembly including a skirt.

Embodiment 15. The beverage apparatus of embodiment 14, the receptacle assembly including an inner receptacle assembly, and the dispensing includes reciprocation of the inner receptacle member.

Embodiment 16. The beverage apparatus of embodiment 15, the skirt being constructed of flexible material such that the skirt is configured to reciprocate with the inner receptacle member.

Embodiment 17. The beverage apparatus of embodiment 16, the skirt is attached to the inner receptacle member and to a lower portion of the beverage apparatus 10.

Third Set of Illustrative Embodiments

Embodiment 1. A beverage apparatus, the beverage apparatus being hand-holdable by a user of the beverage apparatus to be portable, the beverage apparatus comprising:
   a chamber housing that includes a chamber, and the chamber defining an internal volume for storing a consumable liquid in the chamber;
   a controller that includes a processor and a database portion, and the processor performing processing based on instructions in the database portion;
   a base assembly, and the base assembly including:
      an enclosure that provides an outer cover of the base assembly;
      an inner receptacle member with a bay, and the bay for retaining a vessel with additive;
      a skirt shoe; and
      a skirt constructed of flexible material, and the skirt including an inner attachment edge portion 118 and an outer attachment edge portion 119, the inner attachment edge portion being supported by a lower edge of the inner receptacle member, and the outer attachment edge portion being supported by the skirt shoe.

Embodiment 2. The beverage apparatus of embodiment 1, the inner receptacle member reciprocating up and down so as to dispense the additive in the vessel, and the skirt being constructed of the flexible material so as to provide for the reciprocating.

Embodiment 3. The beverage apparatus of embodiment 2, the base assembly further including a skirt ring 115, and the lower edge of the inner receptacle member being attached to the skirt ring, and a lower edge of the skirt ring being attached to the inner attachment edge portion 118.

Embodiment 4. The beverage apparatus of embodiment 3, wherein the lower edge of the skirt ring is bonded to the inner attachment edge portion 118 by adhesive.

Embodiment 5. The beverage apparatus of embodiment 4, the skirt including a bottom button, and the bottom button the depressable by a user so as to activate an internal switch in the base assembly, and the internal switch controlling operations of the base assembly.

Embodiment 6. The beverage apparatus of embodiment 5, the bottom button is positioned on a curved, outer, upper portion of the skirt.

Embodiment 7. The beverage apparatus of embodiment 3, the base assembly further including a shoe support, the shoe support including an annular structure that is supported within an enclosure; and
   the shoe support engaged with and supporting the skirt shoe.

Embodiment 8. The beverage apparatus of embodiment 7, the shoe support including an interior diameter portion, and the interior diameter portion engaged with the skirt ring.

Embodiment 9. The beverage apparatus of embodiment 2, the base assembly further including a shoe support, the shoe support including an annular structure that is supported within the enclosure; and the shoe support engaged with and supporting the skirt shoe.

Embodiment 10. The beverage apparatus of embodiment 7, the shoe support also engaged with and supporting the skirt.

Embodiment 11. The beverage apparatus of embodiment 1, the skirt shoe including a lower attachment flange, and such lower attachment flange defining a lower, outer peripheral extent of the base assembly.

Embodiment 12. The beverage apparatus of embodiment 1, the skirt shoe including an annular chamfer, and the annular chamfer positioned underneath the outer attachment edge portion 119.

Embodiment 13. The beverage apparatus of embodiment 12, the base assembly further including a plurality of electrical connections that are exposed to an exterior of the beverage apparatus, and the electrical connections each electrically connected to at least one internal component of the beverage apparatus.

Embodiment 14. The beverage apparatus of embodiment 13, the electrical connections each including a contact plate.

Embodiment 15. The beverage apparatus of embodiment 14, each of the contact plates being positioned in the annular chamfer.

Embodiment 16. The beverage apparatus of embodiment 14, the electrical connections further including a connecting rod and a contact tab, the connecting rod serving to connect the contact plate with a respective contact tab, and the contact an electrical communication with the at least one internal component of the beverage apparatus.

Embodiment 17. The beverage apparatus of embodiment 13, wherein each of the electrical connections extend up through or adjacent to the skirt shoe 112.

Embodiment 18. The beverage apparatus of embodiment 1, base assembly is in the shape of a squircle.

Fourth Set of Illustrative Embodiments

Embodiment 1. A beverage apparatus, the beverage apparatus being hand-holdable by a user of the beverage apparatus to be portable, the beverage apparatus comprising:
- a chamber housing that includes a chamber, and the chamber defining an internal volume for storing a consumable liquid in the chamber;
- a controller that includes a processor and a database portion, and the processor performing processing based on instructions in the database portion;
- a vessel that contains additive;
- a base assembly attached at a lower end of the chamber housing, and the base assembly including:
  - an inner receptacle member with a bay, and the bay for retaining the vessel, and the controller configured to control dispensing of the additive by actuating the inner receptacle member;
  - an enclosure that surrounds the inner receptacle member;
  - an annular skirt shoe that is supported by the enclosure substrate; and
  - a skirt that covers at least a portion of a bottom of the beverage apparatus, and the skirt shoe supporting the skirt.

Embodiment 2. The beverage apparatus of embodiment 1, the skirt surrounding the vessel, with the vessel retained in the bay.

Embodiment 3. The beverage apparatus of embodiment 1, the skirt shoe housing a plurality of connection assemblies, each connection assembly providing electrical communication between an exterior of the beverage apparatus and the controller.

Embodiment 4. The beverage apparatus of embodiment 3, each of the connection assemblies extending up through or adjacent the skirt shoe.

Embodiment 5. The beverage apparatus of embodiment 4, the skirt shoe having a plurality of connection fins, the connection fins serving to support the skirt shoe, the connection fins attached to a shoe support.

Embodiment 6. The beverage apparatus of embodiment 5, the shoe support including a plurality of apertures, and each of the apertures receiving a respective connection fin.

Embodiment 7. The beverage apparatus of embodiment 6, each of the apertures is in the form of a slit.

Embodiment 8. The beverage apparatus of embodiment 4, each connection assembly including a pad assembly, a contact tab, and a connecting portion, and the connecting portion connecting the pad assembly to the contact tab.

Embodiment 9. The beverage apparatus of embodiment 8, the connecting portion is a rod or shaft that extends up through the skirt shoe.

Embodiment 10. The beverage apparatus of embodiment 8, the base assembly further including a support platform positioned in the enclosure, and the support platform including a spring finger, and the spring finger engaging with the contact tab.

Embodiment 11. The beverage apparatus of embodiment 10, the support platform supporting electrical components including a least a portion of the controller, and the electrical components being in electrical communication with the spring finger, so that electrical energy can be communicated from the pad assembly to the electrical components.

Embodiment 12. The beverage apparatus of embodiment 8, the skirt shoe including a chamfer that extends around the skirt shoe, the pad assembly positioned in the chamfer.

Embodiment 13. The beverage apparatus of embodiment 1, the chamber housing including first threads, the base assembly including second threads, and the first threads engaging with the second threads so as to attach the chamber housing with the base assembly.

Embodiment 14. The beverage apparatus of embodiment 1, the controller configured to control dispensing of the additive including the controller controlling reciprocation of the inner receptacle member and vessel.

Embodiment 15. The beverage apparatus of embodiment 14, the base assembly including a one way valve, the one way valve provided to dispense additive into the chamber.

Embodiment 16. The beverage apparatus of embodiment 1, base assembly is in the shape of a squircle.

Fifth Set of Illustrative Embodiments

Embodiment 1. A beverage apparatus, the beverage apparatus being hand-holdable by a user of the beverage apparatus so as to be portable, the beverage apparatus comprising:
- a chamber housing that includes a chamber, and the chamber defining an internal volume for storing a consumable liquid in the chamber;
- a controller that includes a processor and a database portion, and the processor performing processing based on instructions in the database portion;
- a battery that powers the controller;

a base assembly attached at a lower end of the chamber housing, and the base assembly including:
an inner receptacle member with a bay, and the bay for retaining a vessel, with additive, in the bay, and the controller configured to control dispensing of the additive into the chamber; and
a plurality of connection assemblies that include a first connection assembly and a second connection assembly, and the connection assemblies providing a charging assembly for charging the battery on a charge base, and
each of the connection assemblies in electrical communication with the battery and/or the controller.

Embodiment 2. The beverage apparatus of embodiment 1, the plurality of connection assemblies including a third connection assembly and a fourth connection assembly.

Embodiment 3. The beverage apparatus of embodiment 2, the connection assemblies are equally spaced about a bottom surface of the base assembly.

Embodiment 4. The beverage apparatus of embodiment 3, the bottom surface is an annular chamfer, and the chamfer extends about a lower end of the base assembly, and the chamfer is concentric with a vertical axis of the bottle apparatus.

Embodiment 5. The beverage apparatus of embodiment 4, the chamfer is a lower surface of a skirt shoe, and the skirt shoe supporting a skirt, and the skirt forming a portion of the bottom surface.

Embodiment 6. The beverage apparatus of embodiment 2, the plurality of connection assemblies including a third connection assembly and a fourth connection assembly; and the first connection assembly is electrical connection with the fourth connection assembly; and the second connection assembly is electrical connection with the third connection assembly.

Embodiment 7. The beverage apparatus of embodiment 6, the connection assemblies are equally spaced about a bottom surface of the base assembly.

Embodiment 8. The beverage apparatus of embodiment 6, the plurality of connection assemblies collectively forming a charging circuit, and the charging circuit includes a bridge rectifier that includes a least one diode.

Embodiment 9. The beverage apparatus of embodiment 8, the at least one diode is four diodes.

Embodiment 10. The beverage apparatus of embodiment 8, the first connection assembly is wired to the fourth connection assembly by a first leg;
the second connection assembly is wired with the third connection assembly by a second leg; and
the first leg and the second leg are separated by a bridge rectifier.

Embodiment 11. The beverage apparatus of embodiment 10, the bridge rectifier including four diodes to control current flow.

Embodiment 12. The beverage apparatus of embodiment 6, the beverage apparatus in combination with the charge base.

Embodiment 13. The beverage apparatus of embodiment 12, the charge base including a plurality of contact elements, each of the contact elements in physical contact with a respective connection assembly.

Embodiment 14. The beverage apparatus of embodiment 13, the plurality of contact elements includes a positive contact element and a negative contact element, and the contact elements consist of the two contact elements such that there are only the two contact elements on the charge base.

Embodiment 15. The beverage apparatus of embodiment 13, each of the contact elements are contact pins.

Embodiment 16. The beverage apparatus of embodiment 14, the base assembly is in the shape of a squircle, and the contact elements are located on two opposing corners of such squircle shape.

Embodiment 17. The beverage apparatus of embodiment 1, the beverage apparatus further including:
an enclosure that surrounds the inner receptacle member;
an annular skirt shoe that is supported by the enclosure substrate; and
a skirt that covers at least a portion of a bottom of the beverage apparatus, and the skirt shoe supporting the skirt.

Embodiment 18. The beverage apparatus of embodiment 17, the skirt surrounding the inner receptacle member, and the skirt connected to the inner receptacle member so as to, upon the inner receptacle member reciprocating, reciprocate with the inner receptacle member.

It will be readily understood by those persons skilled in the art that the present disclosure is susceptible to broad utility and application. Many embodiments and adaptations of the present disclosure other than those herein described, as well as many variations, modifications and equivalent arrangements, will be apparent from or reasonably suggested by the present disclosure and foregoing description thereof, without departing from the substance or scope of the disclosure.

Accordingly, while the present disclosure has been described here in detail in relation to its exemplary embodiments, it is to be understood that this disclosure is only illustrative and exemplary of the present disclosure and is made to provide an enabling disclosure of the invention. Accordingly, the foregoing disclosure is not intended to be construed or to limit the present invention or otherwise to exclude any other such embodiments, adaptations, variations, modifications and equivalent arrangements.

What is claimed is:

1. A beverage apparatus, the beverage apparatus being hand-holdable by a user of the beverage apparatus to be portable, the beverage apparatus comprising:
a chamber housing that includes a chamber, and the chamber defining an internal volume for storing a consumable liquid in the chamber;
a controller that includes a processor and a database portion, and the processor performing processing based on instructions in the database portion;
a base assembly, and the base assembly including:
an enclosure that provides an outer cover of the base assembly;
an inner receptacle member with a bay, and the bay for retaining a vessel with additive;
a skirt shoe; and
a skirt constructed of flexible material, and the skirt including an inner attachment edge portion and an outer attachment edge portion, the inner attachment edge portion being supported by a lower edge of the inner receptacle member, and the outer attachment edge portion being supported by the skirt shoe.

2. The beverage apparatus of claim 1, the inner receptacle member reciprocating up and down so as to dispense the additive in the vessel, and the skirt being constructed of the flexible material so as to provide for the reciprocating.

3. The beverage apparatus of claim 2, the base assembly further including a skirt ring, and the lower edge of the inner receptacle member being attached to the skirt ring, and a lower edge of the skirt ring being attached to the inner attachment edge portion.

4. The beverage apparatus of claim 3, wherein the lower edge of the skirt ring is bonded to the inner attachment edge portion by adhesive.

5. The beverage apparatus of claim 4, the skirt including a bottom button, wherein the bottom button is arranged to be depressable by a user so as to activate an internal switch in the base assembly, and wherein the internal switch is arranged to control operations of the base assembly.

6. The beverage apparatus of claim 5, the bottom button is positioned on a curved, outer, upper portion of the skirt.

7. The beverage apparatus of claim 3, the base assembly further including a shoe support, the shoe support including an annular structure that is supported within an enclosure; and the shoe support engaged with and supporting the skirt shoe.

8. The beverage apparatus of claim 7, the shoe support including an interior diameter portion, and the interior diameter portion engaged with the skirt ring.

9. The beverage apparatus of claim 2, the base assembly further including a shoe support, the shoe support including an annular structure that is supported within the enclosure; and the shoe support engaged with and supporting the skirt shoe.

10. The beverage apparatus of claim 7, the shoe support also engaged with and supporting the skirt.

11. The beverage apparatus of claim 1, the skirt shoe including a lower attachment flange, and such lower attachment flange defining a lower, outer peripheral extent of the base assembly.

12. The beverage apparatus of claim 1, the skirt shoe including an annular chamfer, and the annular chamfer positioned underneath the outer attachment edge portion.

13. The beverage apparatus of claim 12, the base assembly further including a plurality of electrical connections that are exposed to an exterior of the beverage apparatus, and the electrical connections each electrically connected to at least one internal component of the beverage apparatus.

14. The beverage apparatus of claim 13, the electrical connections each including a contact plate.

15. The beverage apparatus of claim 14, each of the contact plates being positioned in the annular chamfer.

16. The beverage apparatus of claim 14, the electrical connections further including a connecting rod and a contact tab, the connecting rod serving to connect the contact plate with a respective contact tab, and the contact an electrical communication with the at least one internal component of the beverage apparatus.

17. The beverage apparatus of claim 13, wherein each of the electrical connections extend up through or adjacent to the skirt shoe.

18. The beverage apparatus of claim 1, base assembly is in the shape of a squircle.

* * * * *